US008429680B2

(12) United States Patent
Yamazaki et al.

(10) Patent No.: US 8,429,680 B2
(45) Date of Patent: Apr. 23, 2013

(54) DISK DEVICE INCLUDING DISK CONVEYANCE MECHANISM AND DISK INSTALLMENT MECHANISM

(75) Inventors: Takuto Yamazaki, Nara (JP); Yukio Morioka, Osaka (JP); Norikatsu Yoshida, Hyogo (JP); Yuji Ariyoshi, Osaka (JP); Shinichi Maeda, Osaka (JP); Hitoshi Higaki, Osaka (JP); Tatsuro Nishi, Osaka (JP)

(73) Assignee: Panasonic Corporation, Osaka (JP)

( * ) Notice: Subject to any disclaimer, the term of this patent is extended or adjusted under 35 U.S.C. 154(b) by 58 days.

(21) Appl. No.: 13/074,050

(22) Filed: Mar. 29, 2011

(65) Prior Publication Data

US 2011/0283300 A1  Nov. 17, 2011

(30) Foreign Application Priority Data

Mar. 30, 2010  (JP) ................................. 2010-078337

(51) Int. Cl.
*G11B 17/04*  (2006.01)

(52) U.S. Cl.
USPC ........................................ 720/623; 720/621

(58) Field of Classification Search .......... 720/617–626, 720/661, 695–717
See application file for complete search history.

(56) References Cited

U.S. PATENT DOCUMENTS

| | | | |
|---|---|---|---|
| 5,582,070 A * | 12/1996 | Dominguez | 74/411 |
| 5,596,561 A * | 1/1997 | Toyoguchi | 720/625 |
| 5,959,956 A | 9/1999 | Takishima | |
| 7,228,552 B2 * | 6/2007 | Morikawa | 720/619 |
| 2005/0198656 A1 * | 9/2005 | Yamamoto et al. | 720/616 |
| 2007/0271574 A1 * | 11/2007 | Yoguchi et al. | 720/623 |
| 2010/0050191 A1 * | 2/2010 | Taka et al. | 720/601 |

FOREIGN PATENT DOCUMENTS

| | | |
|---|---|---|
| JP | 9-7268 | 1/1997 |
| JP | 2004-348782 | 12/2004 |
| JP | 2008-181603 | 8/2008 |
| KR | 10-2009-0070047 | * 7/2009 |

OTHER PUBLICATIONS

English translation of KR 10-2009-0070047.*

* cited by examiner

*Primary Examiner* — Nathan Danielsen
(74) *Attorney, Agent, or Firm* — Wenderoth, Lind & Ponack, LLP.

(57) ABSTRACT

There is provided a disk device having a buffer portion capable of relatively moving at least a rack at the beginning of meshing with a drive gear in an opposite direction to a moving direction of a slide cam member moved by conveyance of a disk, when the disk is conveyed to a replayable position by a disk conveyance mechanism and the slide cam member moves so that the drive gear and the rack are meshed with each other.

7 Claims, 39 Drawing Sheets

DISK DEVICE INCLUDING DISK CONVEYANCE MECHANISM AND DISK INSTALLMENT MECHANISM

BACKGROUND OF THE INVENTION (1) Field of the Invention

The present invention relates to a disk device, particularly to a disk device for consecutively performing a disk conveyance operation for conveying a disk to a replayable position, and a disk installment operation for installing the disk conveyed to the replayable position onto a turntable so as to bring the disk into a replayable clamping state.

(2) Description of Related Art

Conventionally, there have been known devices in which a disk conveyance operation and a disk installment operation are performed by one drive source as this type of disk device. This type of disk device is provided with for example a drive gear driven by a drive source, first transmission means for driving disk conveyance means by the drive gear, and second transmission means for driving disk installment means by the drive gear. The second transmission means is formed by a slide cam member having a rack to be meshed with the drive gear. The disk device is formed so as to move the slide cam member by rotating the drive gear with drive force of the drive source, and switch between a first operation of disk conveyance and a second operation of disk installment by utilizing this movement of the slide cam member.

In the disk device formed as above, in a case where the first operation of the disk conveyance and the second operation of the disk installment are consecutively performed, the drive source is continuously driven, and hence the drive gear is rotated before the drive gear and the rack are meshed with each other. Therefore, at the time of switching the first operation to the second operation, in a case where there is a difference between a speed of moving the slide cam member so as to cause the drive gear and the rack to be meshed with each other and a rotation speed of the drive gear, an excessive load is imposed on those members from an instant when the drive gear and the rack are meshed with each other to the time when the first operation and the second operation are performed at the same time. Thus, there arise problems such as breakage of those members.

For example, Patent Document 1 (Japanese Unexamined Patent Publication No. 9-7268) and Patent Document 2 (Japanese Unexamined Patent Publication No. 2004-348782) disclose methods for prohibiting breakage or the like of buffer means in a case where drive transmission is performed by meshing between a drive gear and a rack.

Patent Document 1 discloses a disk device in which cutouts are provided at both ends of a rack in the longitudinal direction, and at a terminal end of drive transmission, a part of the rack to be meshed with a drive gear can be elastically deformed so as to move away from the drive gear.

Patent Document 2 discloses a disk device in which, when excessive force is applied to a meshing part between a rack and a drive gear, meshing between the rack and the drive gear is released.

Additionally, Patent Document 3 (Japanese Unexamined Patent Publication No. 2008-181603) discloses a method for preventing breakage or the like of a drive gear caused by stopping movement of a rack to be meshed with the drive gear while continuously transmitting drive force of a drive source to the drive gear at the time of finishing an ejecting operation of a disk tray.

Patent Document 3 also discloses a disk device in which a sub-rack is slidably provided at an end on the downstream side in the moving direction of a rack, and a drive gear is meshed only with the sub-rack at the same time as stoppage of ejection of a disk tray. In the disk device of Patent Document 3, by meshing the drive gear with the sub-rack at the same time as the stoppage of the ejection of the disk tray, rotation force of the drive gear is not transmitted to the stopped rack but transmitted only to the sub-rack. Thus, even when stoppage of the drive gear is delayed, a load imposed on the drive gear is reduced by sliding of the sub-rack.

However, in the disk device of Patent Document 1, as the buffer means in a case where the drive transmission is performed by the meshing between the drive gear and the rack, an end of the rack itself is elastically deformable. Accordingly, the drive gear and the rack are not continuously meshed with each other, and thus not applicable as the buffer means in a case where the second operation is consecutively performed after the first operation. In the disk device of Patent Document 2, the meshing itself between the rack and the drive gear can be released. Thus, in a case where excessive force is applied, the meshing between the rack and the drive gear is sometimes released during the disk conveyance operation and the disk installment operation. Therefore, in the disk device of Patent Document 2, the second operation cannot be performed consecutively after the first operation. Accordingly, in such devices of Patent Document 1 and Patent Document 2, buffering is not performed at the time of switching from the first operation to the second operation. Thus, the problems such as occurrence of the breakage of the drive gear or the rack cannot be solved.

In the disk device of Patent Document 3, the sub-rack is formed to absorb and reduce impact force. However, the sub-rack rotates a pinion until a drive motor is stopped at the time of the stoppage of the ejection of the disk tray. Therefore, the breakage or the like of the drive gear and the rack at the time of finishing the ejecting operation of the disk tray can be prevented but the sub-rack is not applicable as drive transmission means at the time of switching transmission when the disk conveyance operation and the disk installment operation are consecutively performed. That is, in the disk device of Patent Document 3, the drive gear is meshed only with the sub-rack at the same time as the stoppage of the ejection of the disk tray at the end of drive of the rack by the drive gear. The buffer means by this sub-rack is operated at the time of stoppage of the drive transmission, and the drive gear is only stopped by stoppage of the drive force of the drive source after the buffering operation. In order to consecutively perform the first operation of the disk conveyance and the second operation of the disk installment by one drive source, there is a need for continuously driving the drive gear without stopping the drive force of the drive source at the time of switching the operations, and moving the slide cam member. Since the disk device of Japanese Unexamined Patent Publication No. 2008-181603 does not continuously drive the drive gear at the time of switching, the disk device is not applicable as it is. Accordingly, even with the disk device of Patent Document 3, the problems such as occurrence of the breakage of the drive gear or the rack cannot be solved.

SUMMARY OF THE INVENTION

In order to solve the above described problems, an object of the present invention is to provide a disk device capable of prohibiting breakage of parts such as a drive gear at the time of consecutively performing a disk conveyance operation and a disk installment operation.

In order to achieve the above object, the present invention is configured as follows.

According to the present invention, there is provided a disk device comprising:

a disk conveyance mechanism which conveys a disk to a replayable position;

a disk installment mechanism which installs the disk conveyed to the replayable position onto a turntable so as to bring the disk into a replayable clamping state;

a drive source which generates drive force driving the disk conveyance mechanism and the disk installment mechanism; and a transmission route switching mechanism which switches a transmission route of the drive force so that the drive force generated by the drive source is transmitted to the disk conveyance mechanism or the disk installment mechanism, wherein the disk installment mechanism has:

a drive gear rotated by transmitting the drive force generated by the drive source;

a slide cam member having a rack to be meshed with the drive gear, the slide cam member being moved by rotating the drive gear in a state that the drive gear and the rack are meshed with each other; and a buffer portion which is able to relatively move the rack at least starting to mesh with the drive gear in an opposite direction with respect to a moving direction of the slide cam member moved by conveyance of the disk, when the disk is conveyed to the replayable position by the disk conveyance mechanism and the slide cam member moves so that the drive gear and the rack are meshed with each other.

With the disk device according to the present invention, since the buffer portion is provided, damage to the parts such as the drive gear at the time of consecutively performing the disk installment operation after the disk conveyance operation can be prohibited.

DETAILED DESCRIPTION OF PREFERRED EMBODIMENTS

Figure 1:
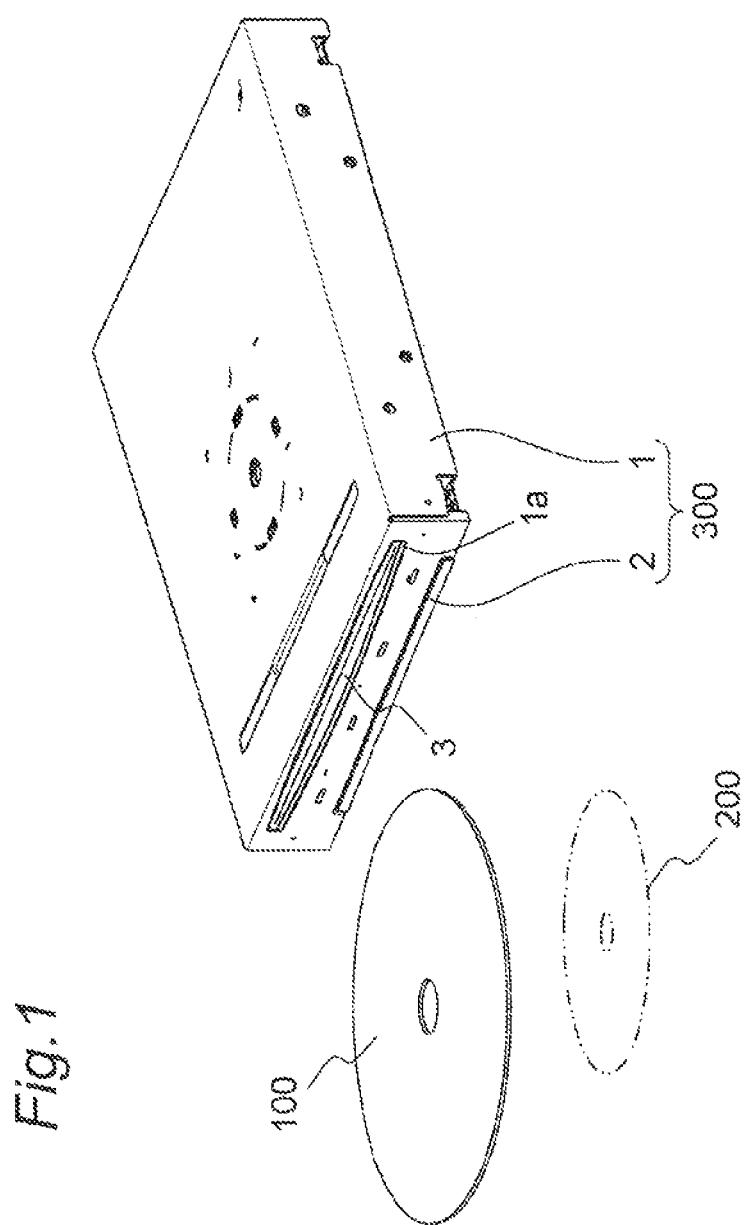
FIG. 1 is a perspective outer appearance view showing a main body of a disk device according to a first embodiment of the present invention and a disk.

According to a first aspect of the present invention, there is provided a disk device comprising:

a disk conveyance mechanism which conveys a disk to a replayable position;

a disk installment mechanism which installs the disk conveyed to the replayable position onto a turntable so as to bring the disk into a replayable clamping state;

a drive source which generates drive force driving the disk conveyance mechanism and the disk installment mechanism; and a transmission route switching mechanism which switches a transmission route of the drive force so that the drive force generated by the drive source is transmitted to the disk conveyance mechanism or the disk installment mechanism, wherein the disk installment mechanism has:

a drive gear rotated by transmitting the drive force generated by the drive source;

a slide cam member having a rack to be meshed with the drive gear, the slide cam member being moved by rotating the drive gear in a state that the drive gear and the rack are meshed with each other; and a buffer portion which is able to relatively move the rack at least starting to mesh with the drive gear in an opposite direction with respect to a moving direction of the slide cam member moved by conveyance of the disk, when the disk is conveyed to the replayable position by the disk conveyance mechanism and the slide cam member moves so that the drive gear and the rack are meshed with each other.

According to a second aspect of the present invention, there is provided the disk device as defined in the first aspect, further comprising:

a trigger member rotated by being contacted with and pressed by the disk conveyed by the disk conveyance mechanism, the trigger member moving the slide cam member so that the drive gear and the rack are meshed with each other by rotation of the trigger member, wherein the transmission route switching mechanism switches the transmission route of the drive force from a state that the drive force of the drive source is transmitted to the disk conveyance mechanism to a state that the drive force is transmitted to the disk installment mechanism, when the slide cam member is moved by the trigger member.

According to a third aspect of the present invention, there is provided the disk device as defined in the first aspect, wherein the buffer portion has:

an auxiliary rack body slidably provided to the slide cam member;

a buffer rack provided to the auxiliary rack body so as to form the rack with a main body rack provided to the slide cam member; and an elastic member which biases the auxiliary rack body so that a rack tooth to be meshed first with a tooth of the drive gear is a rack tooth of the buffer rack, and when the slide cam member moves so that the drive gear and the buffer rack are meshed with each other, the auxiliary rack body slides in the opposite direction to the moving direction of the slide cam member against bias force of the elastic member, so that a speed difference caused at beginning of meshing between the drive gear and the buffer rack is absorbed and shock is reduced.

According to a fourth aspect of the present invention, there is provided the disk device as defined in the third aspect, wherein the buffer rack is formed so that a thickness of the rack tooth to be meshed first with the tooth of the drive gear is a sum of a thickness of a rack tooth other than the rack tooth to be meshed first and a thickness of a rack tooth formed to the main body rack facing the rack tooth other than the rack tooth to be meshed first.

According to a fifth aspect of the present invention, there is provided the disk device as defined in the fourth aspect, wherein the auxiliary rack body slides by an integral-multiple of a stroke of an arrangement pitch for the teeth of the rack.

According to a sixth aspect of the present invention, there is provided the disk device as defined in the second aspect, wherein the slide cam member includes a first slide cam portion to be pressed by the trigger member, and a second slide cam portion in which the rack is formed, both the first and second slide cam portions are coupled by the buffer portion, and the buffer portion is able to relatively move the second slide cam portion in an opposite direction to a moving direction of the first slide cam portion moved by conveyance of the disk at beginning of meshing between the rack of the second slide cam portion and the drive gear.

According to a seventh aspect of the present invention, there is provided the disk device as defined in the sixth aspect, wherein the buffer portion is formed by an elastic member.

Before the description of the present invention proceeds, it is noted that like parts are designated by like reference numerals throughout the accompanying drawings.

First Embodiment

Figure 2:
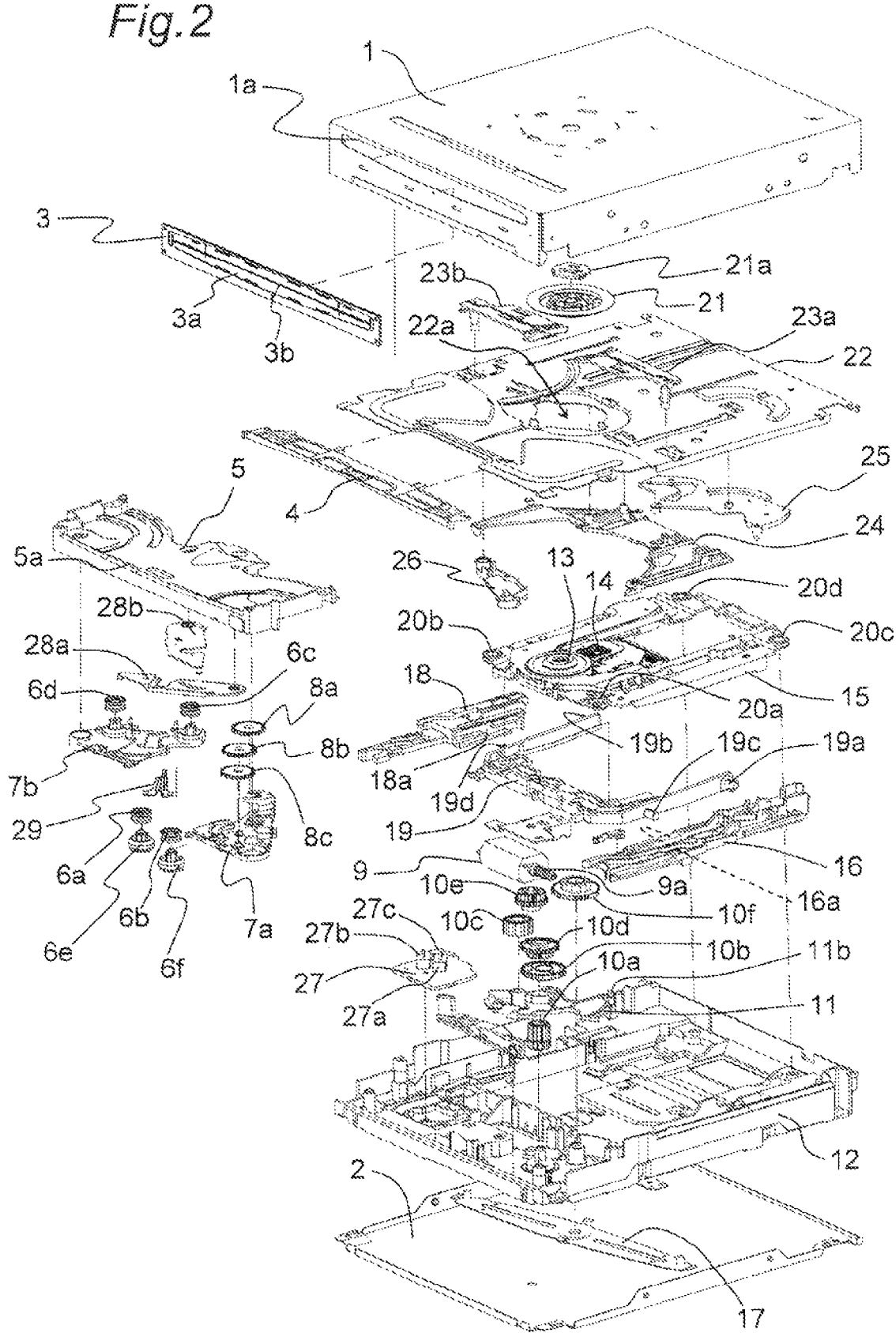
FIG. 2 is an exploded perspective view of the disk device of FIG. 1.
Figure 3:
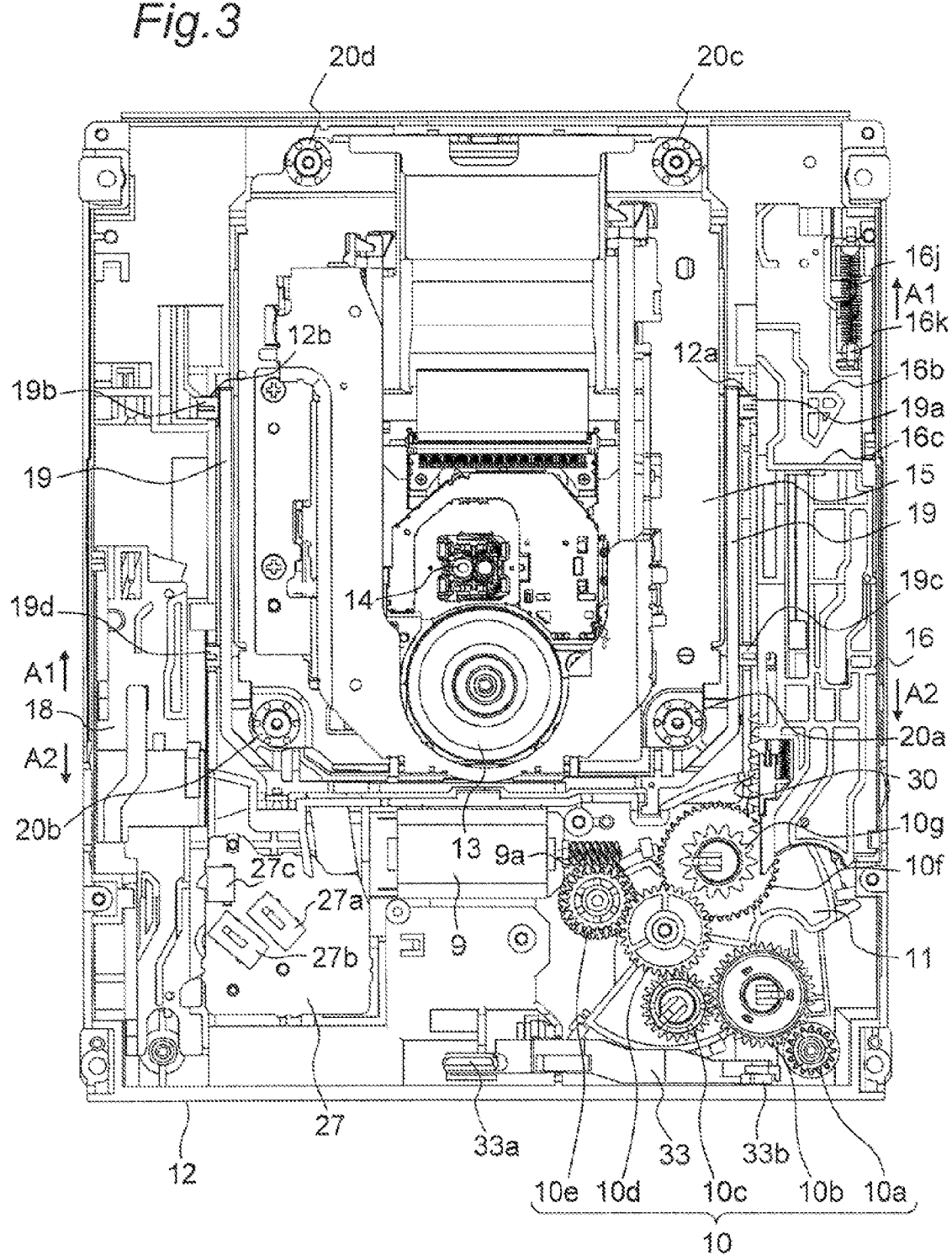
FIG. 3 is a top view showing attachment states of parts to be attached to a mechanical chassis.

Hereinafter, a disk device according to a first embodiment of the present invention will be described. FIG. 1 is a perspective outer appearance view showing the disk device according to the first embodiment and a disk. FIG. 2 is an exploded perspective view of the disk device of FIG. 1. FIG. 3 is a top view showing attachment states of parts to be attached to a mechanical chassis provided in the disk device of FIG. 1. For convenience, the upper side of FIG. 1 indicates the upper side of the disk device, and the lower side of FIG. 1 indicates the lower side of the disk device. However, the present invention is not limited thereto. For example, the disk device may be tilted by 90°. That is, the disk device is not limited to be horizontally arranged as shown in FIG. 1 but may be arranged perpendicularly or the like.

In FIG. 1, the disk device is provided with an upper cover 1 and a lower cover 2 forming a casing 300 serving as an outer shell of the device. An opening portion 1a for disk insertion and ejection is provided in a front surface of the upper cover 1. The opening portion 1a is closed by an anti-dust cover 3. The anti-dust cover 3 is provided with an elastic sheet 3a made of felt or the like. A slit 3b through which a large-diameter-disk 100 and a small-diameter disk 200 can pass is formed substantially in a center (at a position facing the opening portion 1a) of the elastic sheet. A front end of the large-diameter disk 100 or the small-diameter disk 200 is inserted into the casing 300 through the slit 3b and the opening portion 1a while elastically deforming the anti-dust cover 3, so that a disk conveyance mechanism arranged in the casing 300 and described later is driven and the large-diameter disk 100 or the small-diameter disk 200 is conveyed to a replayable position. The large-diameter disk 100 indicates for example a disk having a standard diameter of 12 cm. The small-diameter disk 200 indicates for example a disk having a standard diameter of 8 cm. Hereinafter, when matters regarding both the large-diameter disk and the small-diameter disk are described and there is no particular need for distinguishing those disks, each of those disks will be referred to as the "disk".

An upper guide 4 for guiding the upper side of the disk and a roller base 5 for guiding the lower side of the disk with a guide portion 5a are provided in the vicinity of the opening portion 1a inside the casing 300. The roller base 5 rotatably retains a pair of roller arms 7a, 7b functioning as a guide and a drive force transmission portion for conveying the disk into the casing 300 (refer to FIG. 4). A pair of rubber rollers 6a, 6b is rotatably provided to the roller arm 7a. A pair of rubber rollers 6c, 6d is fixed to the roller arm 7b. The rubber roller 6a is integrated with a roller gear 6e (refer to FIG. 2). The rubber roller 6b is integrated with a roller gear 6f.

Figure 7:
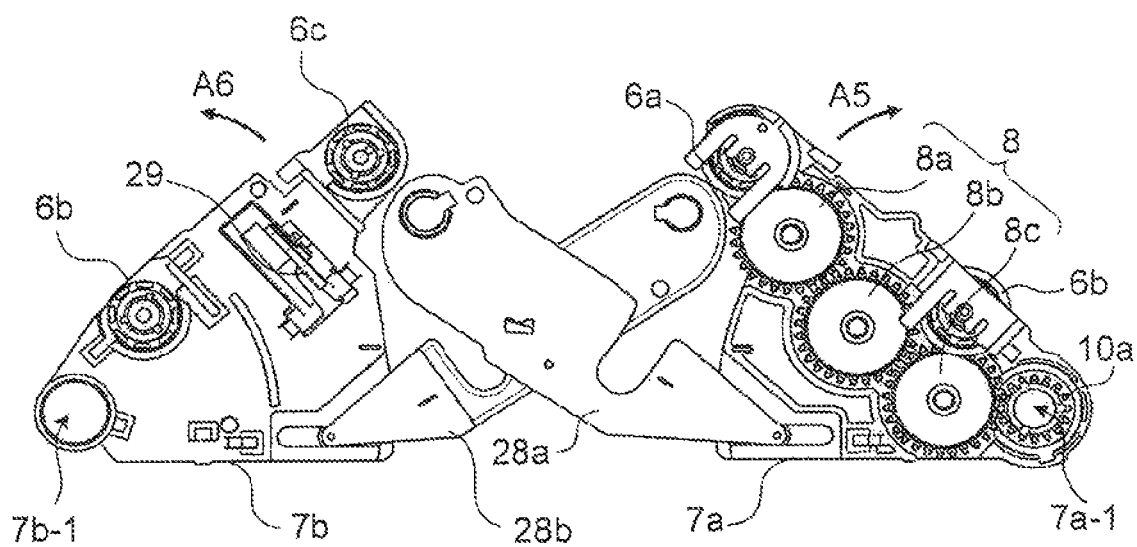
FIG. 7 is a top view showing an attachment state of a pair of roller arms and a pair of link arms.

A gear row 8 formed by gears 8a to 8c is provided to the roller arm 7a (refer to FIG. 7). The gear 8c is meshed with a gear 10a in a gear row 10 formed by gears 10a to 10e shown in FIG. 3. The gear 10e is meshed with a worm gear 9a provided in a motor 9 serving as one example of a drive source. Accordingly, drive force of the motor 9 is transmitted to the gear row 8 via the worm gear 9a, the gears 10e, 10d, 10c, 10b, and 10a in the gear row 10. Since a gear 10f is meshed with a lower portion of the gear 10d, the drive force is transmitted at the same time, and a pinion 10g is coaxially integrated with this gear 10f. The pinion 10g is capable of being meshed with a rack 30 provided to a slide cam member 16 to be described later. However, in an initial state that the disk is not inserted, the pinion 10g is not meshed with the rack 30. The gear 10c is rotatably and axially supported on a clutch plate 11. The clutch plate 11 is rotatably provided with the up and down direction (also called as the thickness direction) as a rotation axis thereof. As described later, rotation of the clutch plate 11 is performed by sliding of the slide cam member 16 in an arrow A2 direction. By the rotation of the clutch plate 11, the gear 10c moves, meshing with the gear 10b is released, and the drive force is transmitted only to the gear 10f and the coaxial pinion 10g. The roller base 5, the gear row 8, the motor 9, and the gear row 10 are rotatably or slidably retained on the mechanical chassis 12 arranged in the casing 300 according to need.

As shown in FIG. 2, a turntable 13 on which the disk is mounted and a traverse base 15 having an optical pickup 14 are arranged inside the casing 300. The turntable 13 is integrated with a spindle motor (not shown) for generating rotation force to rotate the disk. The traverse base 15 is rotatable in the up and down direction and floated and supported on the mechanical chassis 12 with fixed elasticity. By rotation of the traverse base 15, the disk conveyed to the replayable position can be installed onto the turntable 13.

As shown in FIG. 3, on the right side of the mechanical chassis 12, the slide cam member 16 is provided slidably in an arrow A1 or A2 direction. On the left side of the mechanical chassis 12, a slide cam member 18 is provided slidably in the arrow A1 or A2 direction. The slide cam member 16 and the slide cam member 18 are coupled by a link arm 17 (refer to FIG. 2) which is rotatably supported on a lower part of the mechanical chassis 12, and formed to slide in the opposite directions to each other by rotation of the link arm 17. An intermediate chassis 19 for supporting the traverse base 15 is axially supported by pins 19a, 19b and thus rotatably provided in the mechanical chassis 12. Pins 19c, 19d to be engaged with raising and lowering cams 16a, 18a (refer to FIG. 2) formed to the slide cam members 16, 18 are provided to the intermediate chassis 19. The slide cam members 16, 18 slide in the opposite directions to each other, so that the pins 19c, 19d move along the raising and lowering cams 16a, 18a and thus are raised or lowered, and the intermediate chassis 19 is rotated taking the pins 19a, 19b as a rotation axis.

A front part of the traverse base 15 (on the side of the opening portion 1a) is fixed to a front part of the intermediate chassis 19 at one point on the left side and at one point on the right side via floating rubbers 20a, 20b. A rear part of the traverse base 15 is floated and supported on the mechanical chassis 12 via floating rubbers 20c, 20d. The intermediate chassis 19 is rotated taking the pins 19a, 19b as the rotation axis, so that the traverse base 15 is rotated taking the floating rubbers 20d, 20c as a rotation axis. In accordance with this rotating operation of the traverse base 15, the turntable 13 is raised or lowered.

Above the turntable 13, an upper base 22 is arranged so as to cover an upper part of the traverse base 15. An opening portion 22a is provided in the upper base 22 at a position facing the turntable 13. To the upper base 22, a pair of facing clamper lifters 23a, 23b sandwiching the opening portion 22a is provided slidably in the direction in which the clamper lifters are brought close to or away from each other. Above the turntable 13, a clamper 21 for clamping the disk onto the turntable 13 is provided.

When the pair of clamper lifters 23a, 23b is placed close to each other, the clamper 21 is supported on ends of the clamper lifters 23a, 23b. At this time, the clamper 21 is in a non-contact state with the disk mounted on the turntable 13. When the pair of clamper lifters 23a, 23b moves in the direction in which the clamper lifters are brought away from each other from this state, the clamper 21 moves close to the turntable 13 through the opening portion 22a.

A metal yoke 21a is provided in the clamper 21. A magnet provided in the turntable 13 attracts the metal yoke 21a with magnetic force in a state that the disk is mounted on the turntable 13, so that the disk is nipped between the clamper 21 and the turntable 13. Thereby, the disk is installed onto the turntable 13 and brought into a replayable clamping state. When the pair of clamper lifters 23a, 23b moves in the direction in which the clamper lifters are brought close to each other from this clamping state, the clamper 21 pressed by the pair of clamper lifters 23a, 23b due to the movement moves away from the turntable 13 against the magnetic force. Thereby, the clamping state is cancelled.

A centering member 24 for centering the disk toward the replayable position is slidably provided on a lower surface of the upper base 22. A trigger lever 25 serving as one example of a trigger member rotated by being contacted with and pressed by the disk conveyed to the replayable position is rotatably provided on the lower surface of the upper base 22 (refer to FIGS. 9 and 10). A guide lever 26 for stably retaining the disk inserted into the casing 300 between the turntable 13 and the clamper 21 is rotatably provided on the lower surface of the upper base 22. The upper base 22 is fixed to the mechanical chassis 12. The mechanical chassis 12 is nipped between the upper cover 1 and the lower cover 2 and thus fixed.

A substrate 27 onto which detection switches 27a to 27c are disposed is attached to the mechanical chassis 12 (refer to FIG. 3). The detection switch 27a detects the disk inserted through the opening portion 1a. As shown in FIG. 7, the detection switch 27a is operated by a disk detection lever 29 provided to the roller arm 7b. The detection switch 27b detects that loading is finished at the time of the ejection of the disk. The detection switch 27b is operated by a lower surface of the roller arm 7b rotating at the time of inserting and ejecting the disk. The detection switch 27c detects that the disk is conveyed to the replayable position and installment thereof is completed. The detection switch 27c is operated by the slide cam member 18. The substrate 27 is provided at a position facing the roller arm 7b attached to the roller base 5.

Figure 8A:
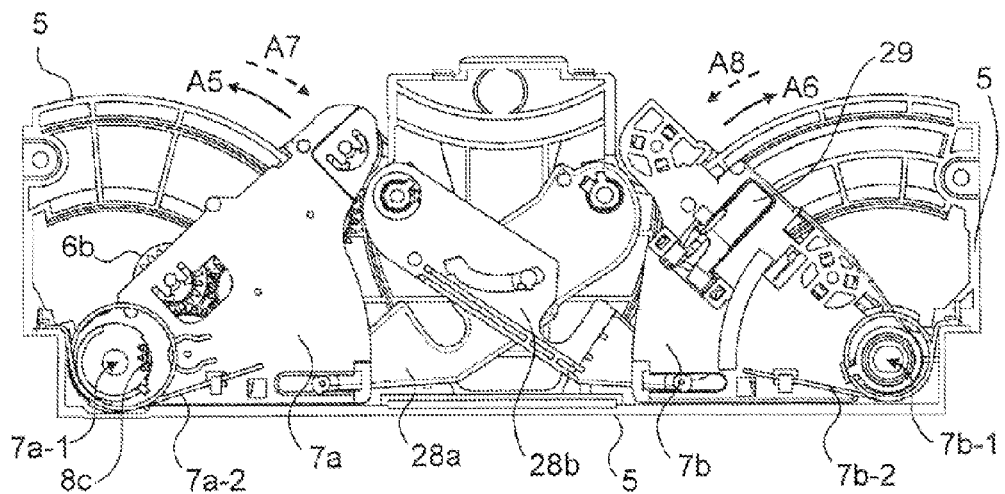
FIG. 8A is a bottom view showing a state that the pair of roller arms is rotated in the direction in which the roller arms are brought close to each other.
Figure 8B:
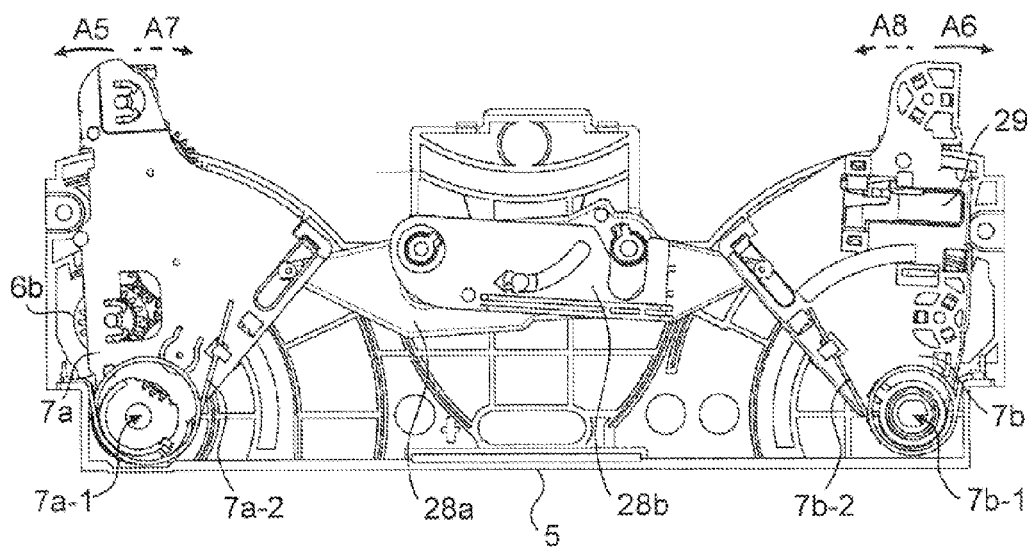
FIG. 8B is a bottom view showing a state that the pair of roller arms is rotated in the direction in which the roller arms are brought away from each other.

As shown in FIGS. 7, 8A, and 8B, link arms 28a, 28b are rotatably provided to the roller base 5. The link arms 28a, 28b are engaged with the roller arms 7a, 7b so as to rotate the roller arms 7a, 7b in synchronization with each other. The roller arm 7a is provided rotatably in an arrow A5 direction and an arrow A7 direction about a rotation shaft 7a-1. This roller arm 7a is biased in the arrow A7 direction by a torsion coil spring 7a-2. The roller arm 7b is provided rotatably in an arrow A6 direction and an arrow A8 direction about a rotation shaft 7b-1. This roller arm 7b is biased in the arrow A8 direction by a torsion coil spring 7b-2.

It is noted that in the first embodiment, the disk conveyance mechanism for conveying the disk to the replayable position is formed by the gear row 10, the gear row 8, the rubber rollers 6a to 6d, the roller gears 6e, 6f, the roller arms 7a, 7b, and the link arms 28a, 28b. In the first embodiment, a disk installment mechanism for installing the disk conveyed to the replayable position onto the turntable 13 so as to bring the disk into the replayable clamping state is formed by the gears 10d to 10f, the pinion 10g, the slide cam member 16, the link arm 17, the slide cam member 18, the intermediate chassis 19, the traverse base 15, the floating rubbers 20a to 20d, the clamper 21, the upper base 22, and the clamper lifters 23a, 23b. In the first embodiment of the present invention, a transmission route switching mechanism for switching a transmission route of the drive force so that the drive force generated by the drive source is transmitted only to one of the disk conveyance mechanism and the disk installment mechanism is formed by the clutch plate 11, the slide cam member 16 for driving this clutch plate, and the trigger lever 25. The motor 9 serving as the drive source and the worm gear 9a serve as common constituent parts relating to drive of the mechanisms, and there are some parts such as the gear row 10 part of which is used for the drive of a plurality of mechanisms. It is noted that the disk conveyance mechanism, the disk installment mechanism, and the transmission route switching mechanism of the present invention are not limited to the above described configurations, needless to say.

Next, with reference to FIG. 3, the configuration of the disk device will be described further in detail. FIG. 3 is the top view showing a state that parts excluding those parts relating to the upper cover 1, the lower cover 2, the roller base 5 and parts relating to the upper base 22 are attached to the mechanical chassis 12 in the entire configuration shown in FIG. 2.

As shown in FIG. 3, the turntable 13 and the optical pickup 14 are arranged on the traverse base 15 substantial in a center of the disk device. The intermediate chassis 19 in a substantially U shape is arranged so as to surround the front part and both side parts of the traverse base 15. The slide cam member 16 is arranged on the right side of the intermediate chassis 19. The slide cam member 18 is arranged on the left side of the intermediate chassis 19. The slide cam member 16 and the slide cam member 18 are arranged slidably in the front and rear direction (the arrow A1 and A2 directions) which is the same as the disk conveying direction. In the initial state that the disk is not conveyed, the slide cam member 16 is biased in the arrow A1 direction by a spring 16j extended between the mechanical chassis 12 and the slide cam member 16. The slide cam member 18 connected to the slide cam member 16 via the link arm 17 is biased in the arrow A2 direction. The pins 19c, 19d provided at both ends of the front part of the intermediate chassis 19 are slidably engaged with the raising and lowering cams 16a, 18a formed to the slide cam members 16, 18 (refer to FIG. 2). The pins 19a, 19b provided at both ends of a rear part of the intermediate chassis 19 are rotatably retained on bearing portions 12a, 12b formed to the mechanical chassis 12. With this configuration, the slide cam members 16, 18 slide in the opposite directions to each other, so that the intermediate chassis 19 is rotated taking the pins 19a, 19b as the rotation axis and the front part of the intermediate chassis 19 is raised or lowered.

Sliding of the slide cam members 16, 18 in the opposite directions to each other is performed by transmitting the drive force of the motor 9 to the pinion 10g via the worm gear 9a, and the gears 10e, 10d, 10f in a state that the rack 30 of the slide cam member 16 and the pinion 10g are meshed with each other. The trigger lever 25 is rotated by being pressed by the disk conveyed to the replayable position on the turntable 13, and the slide cam member 16 is pressed by the trigger lever 25 and thus slightly slides in the arrow A2 direction, so that the pinion 10g is meshed with the rack 30.

That is, when the disk is conveyed to the replayable position with the drive of the motor 9, by an action of the trigger lever 25 and transmission switching of the drive force of the motor 9, the slide cam members 16, 18 slide in the opposite directions to each other. Thereby, the intermediate chassis 19 and the traverse base 15 are raised, and the disk is installed onto the turntable 13 and thus brought into the replayable clamping state.

Figure 4:
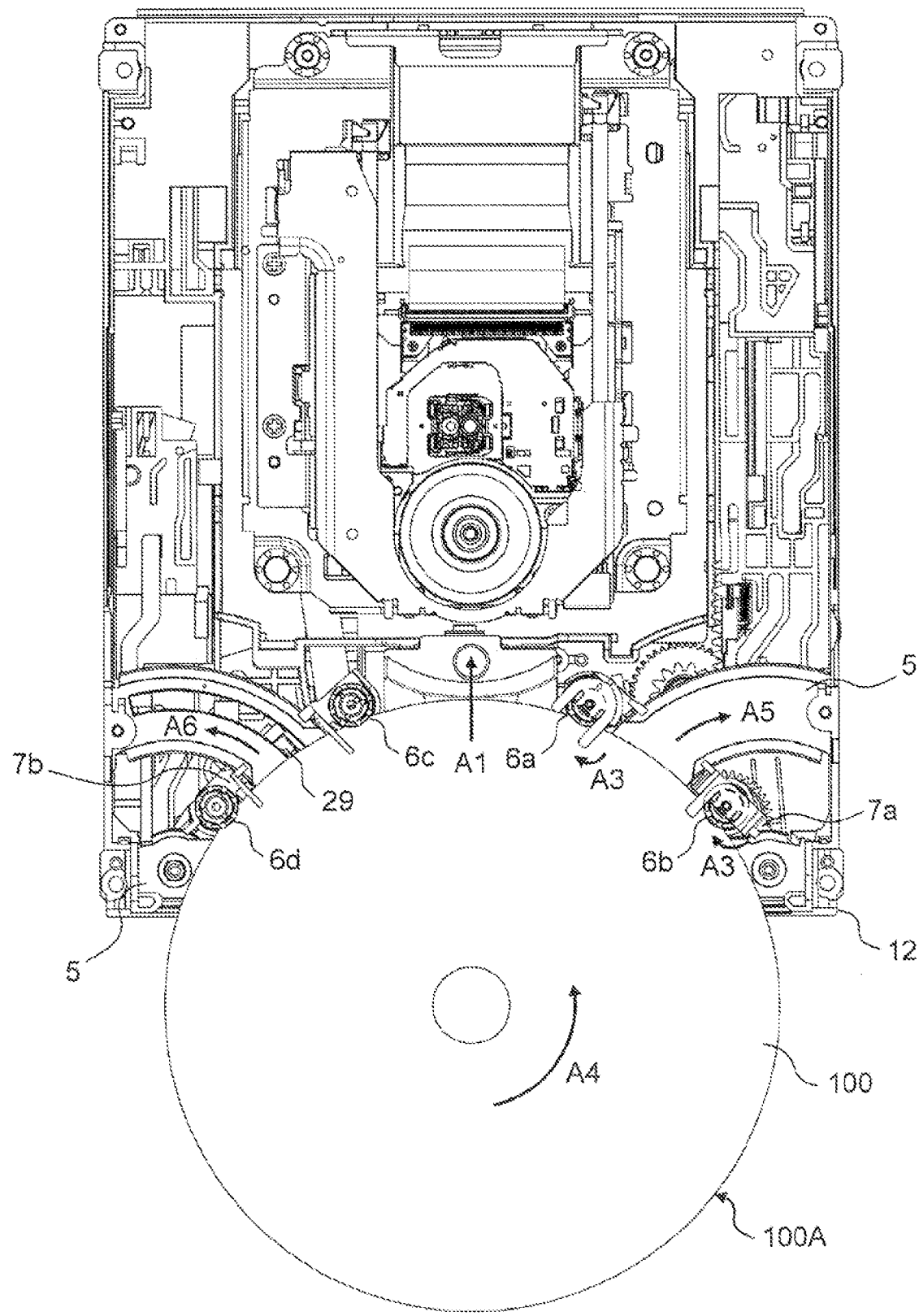
FIG. 4 is a top view showing a state immediately after a large-diameter disk is inserted into the disk device of FIG. 1.
Figure 5:
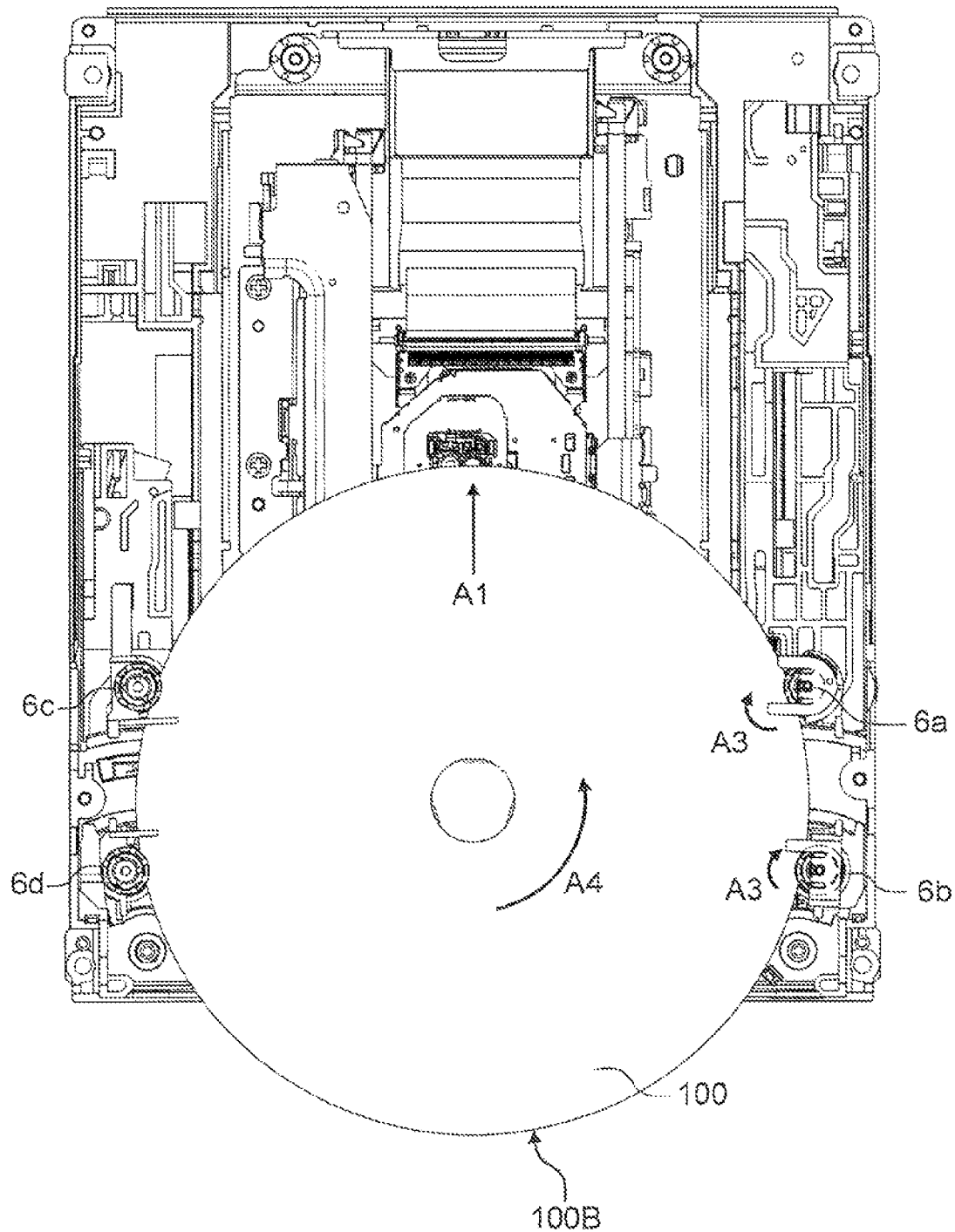
FIG. 5 is a top view showing a state that the large-diameter disk inserted into the disk device of FIG. 1 is being conveyed to a replayable position.
Figure 6:
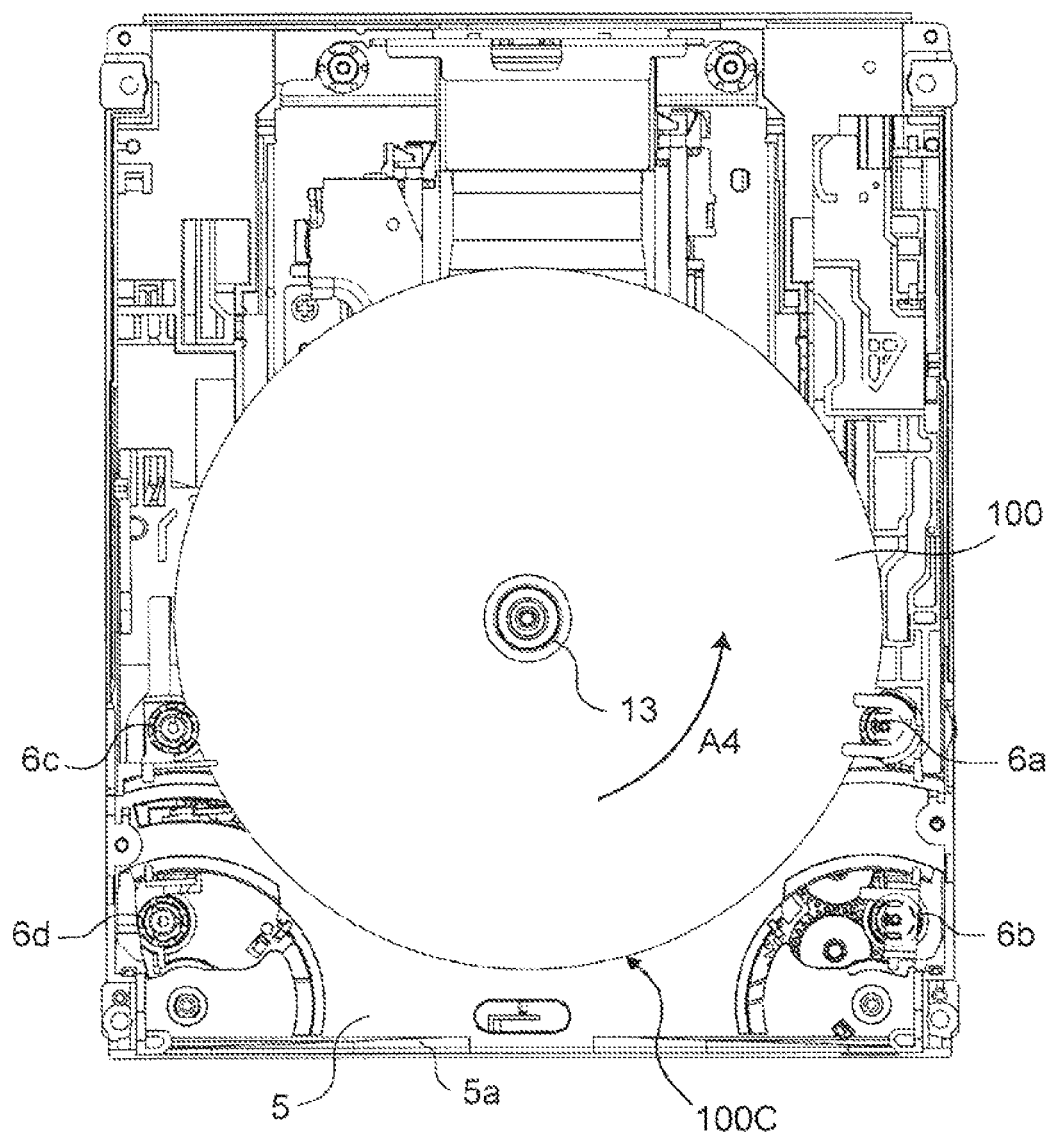
FIG. 6 is a top view showing a state that the large-diameter disk inserted into the disk device of FIG. 1 is already conveyed to the replayable position.

Next described with reference to FIGS. 4 to 8B is a conveyance operation of the large-diameter disk 100 for conveying the large-diameter disk 100 inserted into the casing 300 to the replayable position. FIGS. 4 to 6 are top views showing conveying states of the large-diameter disk. FIG. 7 is a top view showing an attachment state of the pair of roller arms 7a, 7b and the pair of link arms 28a, 28b. FIGS. 8A and 8B are bottom views showing a state that the pair of roller arms 7a, 7b is rotated in the direction in which the roller arms are brought close to or away from each other.

FIG. 4 shows a state immediately after the large-diameter disk 100 is inserted into the casing 300. At this time, the large-diameter disk 100 is contacted with the pair of rubber rollers 6a, 6b on the right side and the pair of rubber rollers 6c, 6d on the left side. At this time, the disk detection lever 29 provided to the roller arm 7b is rotated by being pressed by the large-diameter disk 100, so that the detection switch 27a is operated so as to detect that the large-diameter disk 100 is inserted through the opening portion 1a. When the detection switch 27a is operated, the motor 9 starts driving. The drive force of the motor 9 is transmitted to the rubber rollers 6a, 6b via the gear row 10 and the gear row 8. Thereby, the rubber rollers 6a, 6b are rotated in an arrow A3 direction, and by rotation drive force and friction force of the rubber roller 6b and friction force of the non-rotated rubber roller 6d facing the rubber roller 6b while sandwiching the large-diameter disk 100, the large-diameter disk 100 is rotated in an arrow A4 direction taking the rubber roller 6d (in more detail, a contact point with the large-diameter disk 100) as a rotation axis. By this rotation in the arrow A4 direction, the large-diameter disk 100 is conveyed in the arrow A1 direction.

When the large-diameter disk 100 is conveyed in the arrow A1 direction from the state shown in FIG. 4, the large-diameter disk 100 extends a gap between the rubber roller 6b and the rubber roller 6d. Thereby, against bias force of the torsion coil springs 7a-2, 7b-2 described with reference to FIG. 8, the roller arm 7a is rotated in the arrow A5 direction, and the roller arm 7b is rotated in the arrow A6 direction. That is, the pair of roller arms 7a, 7b is rotated in the directions in which the roller arms are brought away from each other (opening directions). By the rotation of the roller arms 7a, 7b, the rubber rollers 6a, 6c are once brought away from a peripheral part of the disk 100. After that, when the large-diameter disk 100 is further conveyed in the arrow A1 direction and a center part of the disk 100 having the maximum diameter in the left and right direction of the disk 100 passes through the gap between the rubber rollers 6b, 6d, the roller arm 7a is rotated in the arrow A7 direction, and the roller arm 7b is rotated in the arrow A8 direction by the bias force of the torsion coil springs 7a-2, 7b-2 described with reference to FIG. 8. That is, the pair of roller arms 7a, 7b is rotated in the directions in which the roller arms are brought close to each other (closing directions). Thereby, the rubber rollers 6a, 6c are contacted with the peripheral part of the disk 100 again and brought into the state shown in FIG. 5.

FIG. 5 shows a state that all the rubber rollers 6a to 6d are contacted with the large-diameter disk 100. FIG. 6 shows a state that the large-diameter disk 100 is conveyed to the replayable position. The large-diameter disk 100 passes through a disk position 100B shown in FIG. 5 in a process of conveyance from a disk position 100A immediately after insertion into the casing 300 (refer to FIG. 4) to a disk position 100C serving as the replayable position (refer to FIG. 6). At this disk position 100B, rotation force for the large-diameter disk 100 is switched to be transmitted from the rubber rollers 6a, 6c instead of the rubber rollers 6b, 6d. That is, from this disk position 100B to the disk position 100C, the large-diameter disk 100 is rotated in the arrow A4 direction taking the rubber roller 6c as a rotation center by rotation drive force of the rubber roller 6a. By this rotation in the arrow A4 direction taking the rubber roller 6c as the rotation center, the large-diameter disk 100 is further conveyed in the arrow A1 direction. The large-diameter disk 100 is conveyed to the disk position 100C shown in FIG. 6. At this position, the conveyance operation of the disk 100 is finished. This conveyance is detected, so that an installment operation for clamping the disk 100 onto the turntable 13 to be described later is performed. When the detection switch 27c detects that the installment operation is completed, the motor 9 stops driving. Thereby, the conveyance operation and the installment operation of the large-diameter disk 100 are completed.

Next, an ejection operation of the large-diameter disk 100 will be described. It is noted that the large-diameter disk 100 is placed at the disk position 100C shown in FIG. 6, the clamping state is cancelled, and the large-diameter disk is nipped by the rubber rollers 6a, 6c.

Firstly, the motor 9 is already reversely driven for canceling the clamping state, and the rubber rollers 6a, 6b are rotated in the opposite direction to that of the conveyance operation of the large-diameter disk 100. Thereby, the large-diameter disk 100 is rotated in the opposite direction to the arrow A4 direction taking the rubber roller 6c as the rotation center. By this rotation in the opposite direction to the arrow A4 direction, the large-diameter disk 100 is conveyed in the opposite direction to the arrow A1 direction (that is, the arrow A2 direction).

When the large-diameter disk 100 reaches the disk position 100B shown in FIG. 5 by the conveyance in the opposite direction to the arrow A1 direction, the rotation force of the large-diameter disk 100 is switched to be transmitted from the rubber rollers 6b, 6d instead of the rubber rollers 6a, 6c. Thereby, the large-diameter disk 100 is rotated in the opposite direction to the arrow A4 direction taking the rubber roller 6d as the rotation center. By this rotation in the opposite direction to the arrow A4 direction, the large-diameter disk 100 is further conveyed in the opposite direction to the arrow A1 direction. When the detection switch 27b detects that the large-diameter disk 100 is conveyed to the disk position 100A shown in FIG. 4 by this conveyance in the opposite direction to the arrow A1 direction, the motor 9 stops driving. Thereby, the ejection operation of the large-diameter disk 100 is completed.

It is noted that the large-diameter disk 100 ejected to the disk position 100A shown in FIG. 4 can be taken out by fingers of a user. At this time, with nipping force and friction force of the rubber rollers 6a to 6d as well as elastic force and friction force of the anti-dust cover 3, the large-diameter disk 100 is retained without popping out from the opening portion 1a to the exterior of the casing 300.

Figure 9:
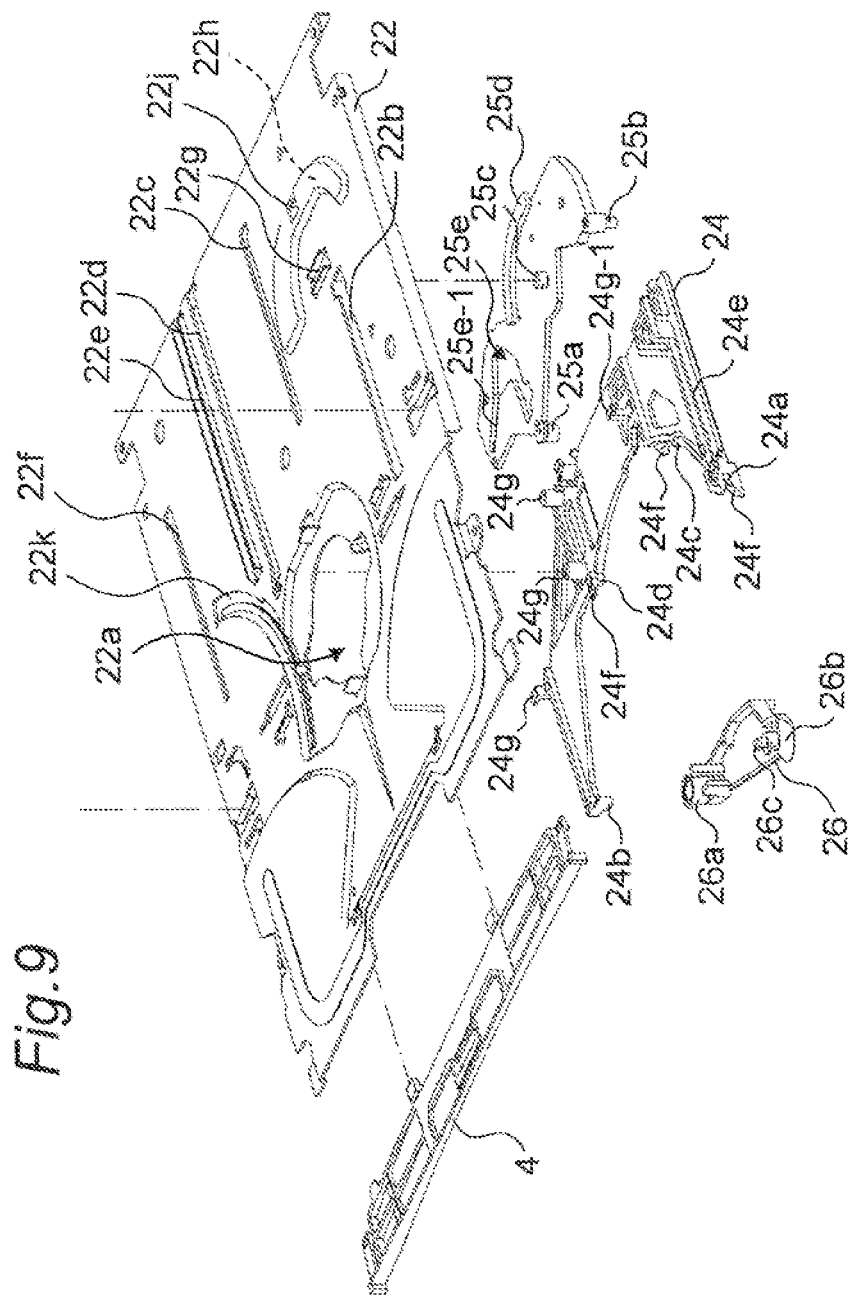
FIG. 9 is an exploded perspective view showing a configuration of parts relating to an upper base.
Figure 10:
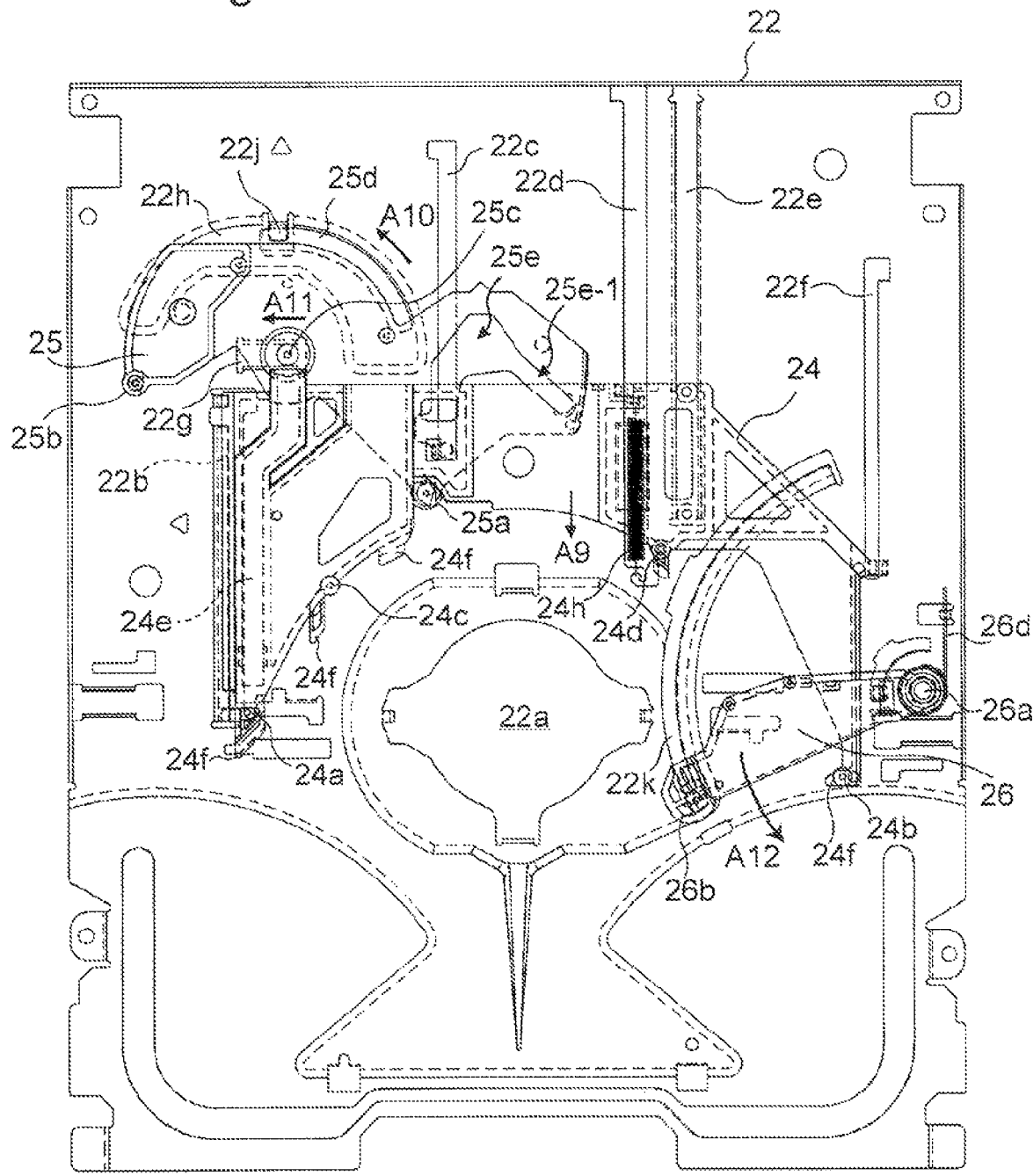
FIG. 10 is a bottom view showing a state that the parts of FIG. 9 are attached to the upper base.

Next, with reference to FIGS. 9 and 10, configurations of the centering member 24, the trigger lever 25, and the guide lever 26 slidably or rotatably attached on the lower surface of the upper base 22 will be described further in detail. FIG. 9 is an exploded perspective view showing configurations of parts relating to the upper base 22. FIG. 10 is a bottom view showing a state that the parts shown in FIG. 9 are attached to the upper base 22.

The centering member 24 is provided with positioning contact portions 24a, 24b to be contacted with the large-diameter disk 100 so as to center the large-diameter disk, and positioning contact portions 24c, 24d to be contacted with the small-diameter disk 200 so as to center the small-diameter disk. The centering member 24 is also provided with a guide cam 24e serving as one example of a guide portion to be engaged with the trigger lever 25 so as to rotate the trigger lever 25, and a plurality of position regulating guides 24f for regulating a position of the disk in the thickness direction. The guide cam 24e has a first straight cam portion 24e-1 and a second straight cam portion 24e-3 provided in parallel to the disk conveying direction, and a tilt cam portion 24e-2 provided in a crossing direction to the disk conveying direction to couple the first straight cam portion 24e-1 and the second straight cam portion 24e-3.

The centering member 24 is provided with a plurality of sliding guides 24g such as pins and claw pieces. The sliding guides 24g are engaged with guide holes 22b to 22f formed in the upper base 22, so that the centering member 24 is slidable in the disk conveying direction along the lower surface of the upper base 22. As shown in FIG. 10, the centering member 24 is biased in an arrow A9 direction (disk ejecting direction) by a spring 24h extended between the centering member and the upper base 22. Thereby, the centering member 24 imparts bias force in the arrow A9 direction to the disk inserted into the casing 300, so as to center the disk.

The trigger lever 25 is rotated by being contacted with the disk conveyed to the replayable position, so as to impart initial sliding to the slide cam member 16. The slide cam member 16 drives the disk installment mechanism by this initial sliding. The trigger lever 25 is provided with a disk contact portion (also called as the detection portion) 25a to be contacted with the disk, a slide cam pressing portion 25b to be engaged with the slide cam member 16 so as to press the slide cam member 16 in the arrow A2 direction (refer to FIG. 3), and a rotation shaft portion 25c serving as a rotation center of the trigger lever 25.

The rotation shaft portion 25c of the trigger lever 25 is engaged with an elongated circular axial hole 22g formed in the upper base 22, and also engaged with the guide cam 24e of the centering member 24. Thereby, the trigger lever 25 is rotated in an arrow A10 direction or the opposite direction thereof about a crossing part of the axial hole 22g and the guide cam 29e.

The trigger lever 25 is provided with an arc shape convex portion 25d so that the trigger lever can be rotated while being retained by the upper base 22. The upper base 22 is provided with a concave portion 22h in which the arc shape convex portion 25d is arranged, and an engagement claw portion 22j to be engaged with the arc shape convex portion 25d so that the arc shape convex portion 25d is not disengaged with the concave portion 22h. The concave portion 22h is formed so as to be larger than the arc shape convex portion 25d so that the trigger lever 25 can be rotated even when the rotation shaft portion 25c moves in an arrow A11 direction or the opposite direction thereof in the axial hole 22g.

There is formed in the trigger lever 25 a hole 25e through which a sliding guide 24g-1 serving as one of the plurality of sliding guides 24g of the centering member 24 passes. A link groove 25e-1 is formed in this hole 25e.

The guide lever 26 is provided to retain the disk inserted into the casing 300 at a height between the turntable 13 and the clamper 21. The guide lever 26 is provided with a rotation shaft 26a rotatably and axially supported on the upper base 22, and a positioning guide 26b for retaining the height of the disk.

In order to stabilize a position in the height direction of the guide lever 26 itself, the guide lever 26 is provided with an engagement claw piece 26c to be engaged with an arc shape hole 22k formed in the upper base 22. The guide lever 26 is biased in an arrow A12 direction by a torsion coil spring 26d, and normally retained in the state shown in FIG. 10. The disk inserted into the casing 300 is contacted with the positioning guide 26b and conveyed to the replayable position while rotating the guide lever 26 in the opposite direction to the arrow A12 direction against bias force of the spring 26d.

Next, with reference to FIGS. 11 to 22, the disk conveyance operation and the disk installment operation will be described.

Figure 11:
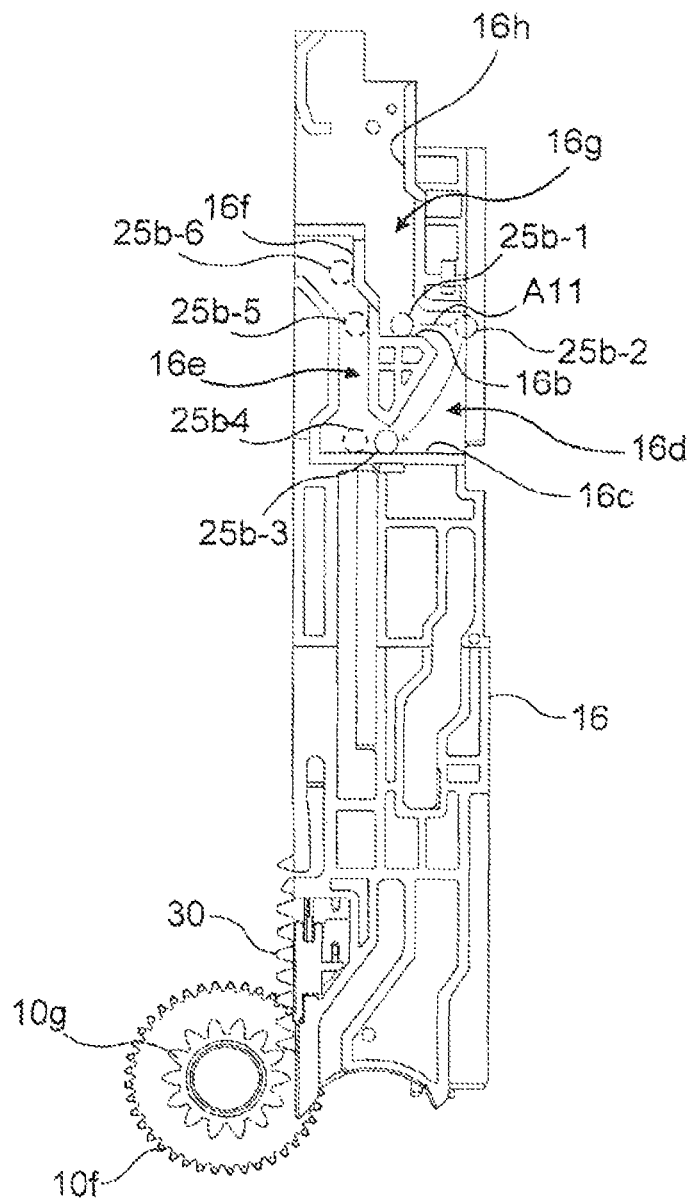
FIG. 11 is a top view showing a relative movement trajectory of a slide cam pressing portion of a trigger lever relative to engagement portions formed in a slide cam member at the time of inserting the large-diameter disk.

Firstly, with reference to FIGS. 11 to 16, operations of the parts in the case where the large-diameter disk 100 is inserted into the casing 300 will be described. FIG. 11 is a top view showing a relative movement trajectory of the slide cam pressing portion 25b of the trigger lever 25 relative to engagement portions formed to the slide cam member 16 at the time of inserting the large-diameter disk. FIGS. 12 to 16 are top views showing positional relationships among the slide cam member 16, the centering member 24, the trigger lever 25, and the guide lever 26 when the large-diameter disk 100 inserted into the casing 300 is conveyed to the replayable position. It is noted that in these figures, part of the parts is transparently shown for convenience.

As shown in FIG. 11, the slide cam member 16 is provided with a first engagement portion 16b and a second engagement portion 16c as the engagement portions to which the slide cam pressing portion 25b of the trigger lever 25 is engaged. The first engagement portion 16b is a part to be pressed by the slide cam pressing portion 25b when the trigger lever 25 is rotated by being pressed by the small-diameter disk 200. The second engagement portion 16c is a part to be pressed by the slide cam pressing portion 25b when the trigger lever 25 is rotated by being pressed by the large-diameter disk 100. The slide cam member 16 is provided with cam portions 16d to 16f. The cam portion 16d is formed so as to connect the first engagement portion 16b and the second engagement portion 16c. The cam portion 16d is a part for guiding movement of the slide cam pressing portion 25b from the first engagement portion 16b to the second engagement portion 16c when the large-diameter disk 100 is inserted into the casing 300 and the rotation shaft portion 25c of the trigger lever 25 moves. The cam portion 16e is a part for moving the slide cam pressing portion 25b so as to bring the slide cam pressing portion away from the second engagement portion 16c when the large-diameter disk 100 is installed onto the turntable 13 after being conveyed to the replayable position. The cam portion 16f is a part for bringing the positioning contact portions 24a, 24b and the like of the centering member 24 away from the large-diameter disk 100. The positional relationships between the parts are changed as shown in FIGS. 12 to 16, so that the slide cam pressing portion 25b of the trigger lever 25 follows the trajectory of positions 25b-1 to 25b-6.

When the large-diameter disk 100 is inserted into the casing 300, firstly, the vicinity of the front end of the large-diameter disk 100 is contacted with the positioning guide 26b of the guide lever 26, so that the height in the thickness direction of the large-diameter disk 100 is determined.

Figure 12:
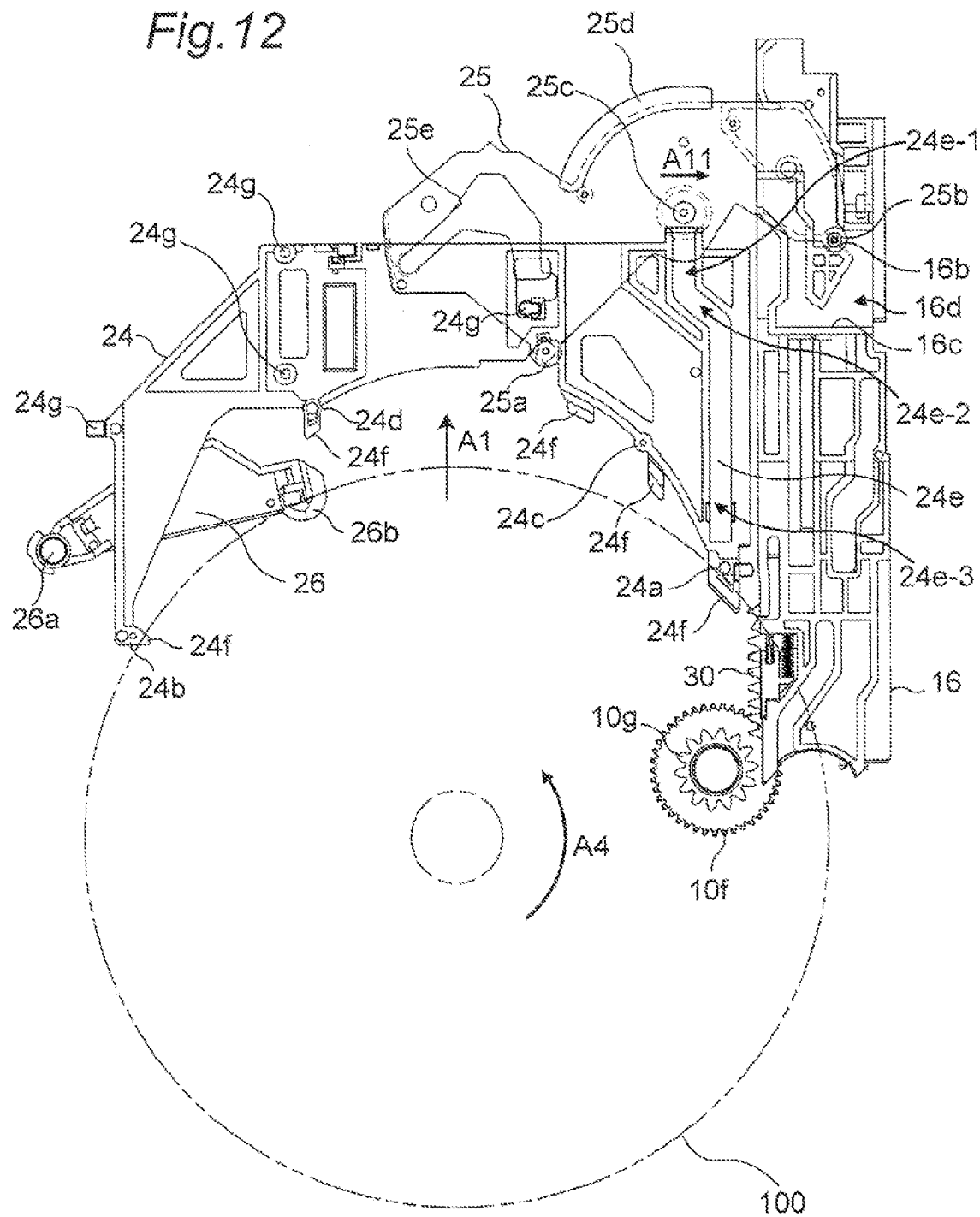
FIG. 12 is a top view showing a state that the large-diameter disk is contacted with a positioning contact portion of a centering member.

Next, as described with reference to FIG. 4, the large-diameter disk 100 is conveyed in the arrow A1 direction while being rotated in the arrow A4 direction. Thereby, the guide lever 26 is pressed by the large-diameter disk 100 and rotated about the rotation shaft 26a against the bias force of the torsion coil spring 24h, and as shown in FIG. 12, the large-diameter disk 100 is contacted with the positioning contact portions 24a, 24b of the centering member 24. The peripheral part of the large-diameter disk 100 is contacted with both the positioning contact portions 24a, 24b, so that the large-diameter disk 100 is centered. That is, the center of the large-diameter disk 100 is positioned so as to be placed on a straight line parallel to the disk conveying direction in plan view, the straight line running through the center of the turntable 13.

It is noted that in the state shown in FIG. 12, the disk contact portion 25a of the trigger lever 25 is in an initial state in which the disk contact portion is not contacted with the large-diameter disk 100, and the slide cam pressing portion 25b is placed at the position 25b-1 at which the slide cam pressing portion is contacted with the first engagement portion 16b of the slide cam member 16 as shown in FIG. 11. In the state shown in FIG. 12, the rotation shaft portion 25c of the trigger lever 25 is not guided by the guide cam 29e of the centering member 24.

Figure 13:
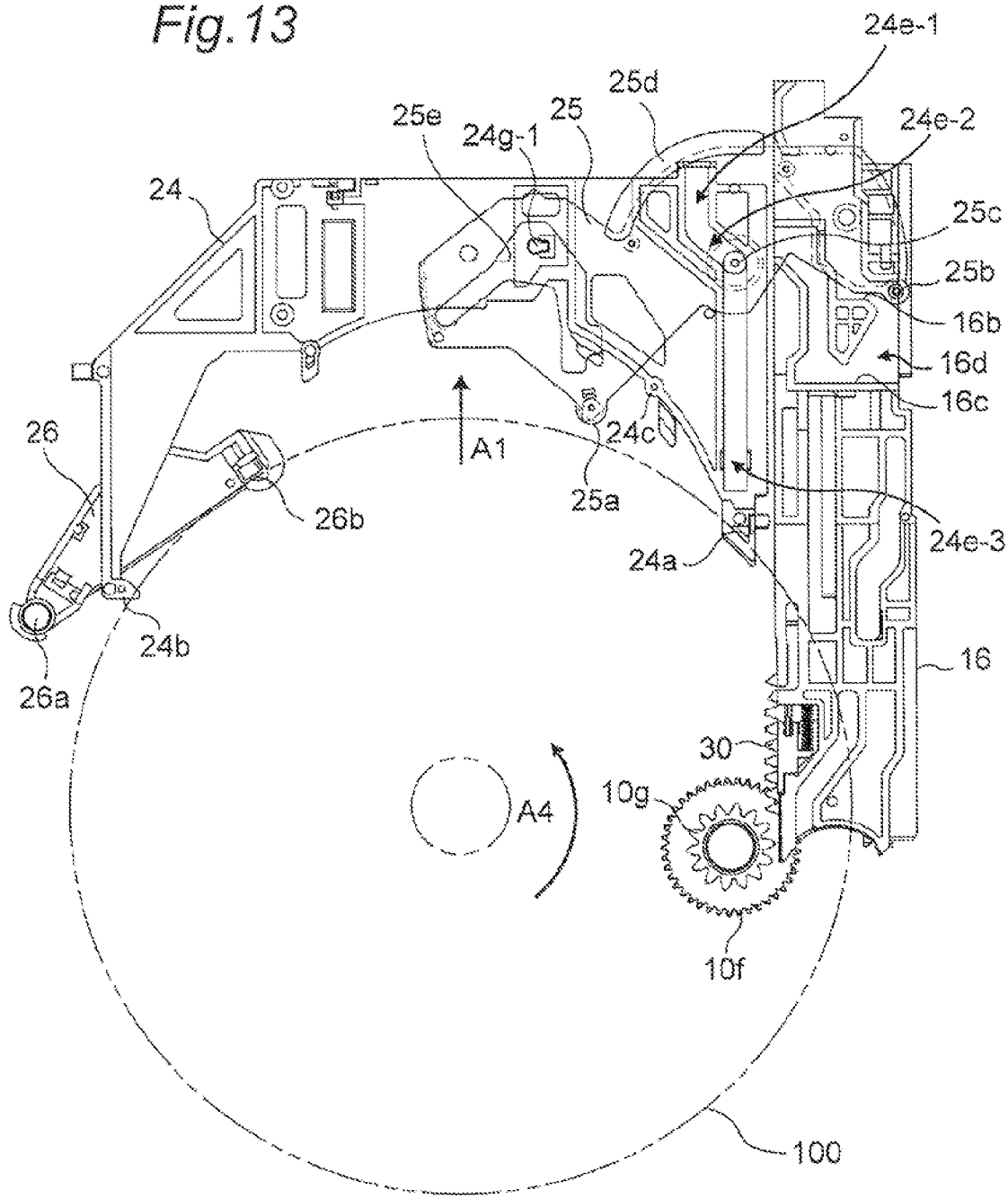
FIG. 13 is a top view showing a state that, from the state shown in FIG. 12, the trigger lever is pressed by the large-diameter disk and moved at right angle to the disk conveying direction.

When the large-diameter disk 100 is further conveyed in the arrow A1 direction from the state shown in FIG. 12, the large-diameter disk 100 moves the centering member 24 in the arrow A1 direction against the bias force of the spring 24h, and also rotates the guide lever 26 against the bias force in the arrow A12 direction. Thereby, the rotation shaft portion 25c of the trigger lever 25 is guided by the tilt cam portion 24e-2 after passing through the first straight cam portion 24e-1 of the guide cam 24e. At this time, since movement in the disk conveying direction is regulated by the axial hole 22g (refer to FIGS. 9 and 10), the rotation shaft portion 25c moves in the arrow A11 direction. That is, the entire trigger lever 25 moves in the arrow A11 direction (from a first position to a second position). By this movement in the arrow A11 direction, the rotation shaft portion 25c moves from the tilt cam portion 24e-2 to the second straight cam portion 24e-3 as shown in FIG. 13. At this time, the arc shape convex portion 25d of the trigger lever 25 is guided and moved by the concave portion 22h of the upper base 22 described above with reference to FIGS. 9 and 10.

It is noted that in the state shown in FIG. 13, the disk contact portion 25a of the trigger lever 25 is not yet contacted with the large-diameter disk 100. The slide cam pressing portion 25b is placed at the position 25b-2 away from the position 25b-1 at which the slide cam pressing portion is contacted with the first engagement portion 16b of the slide cam member 16 as shown in FIG. 11. The slide cam member 16 is not yet moved.

Figure 14:
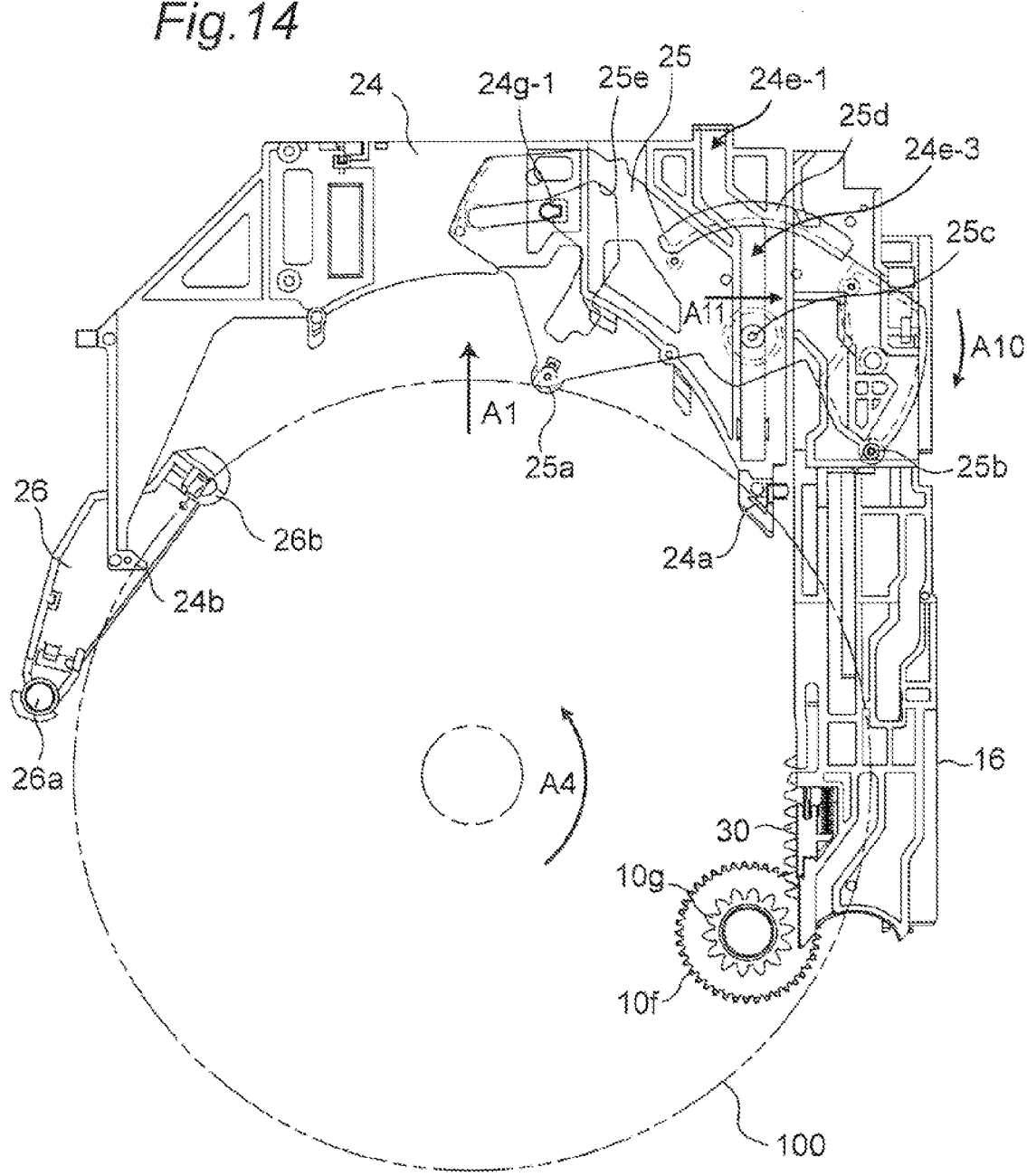
FIG. 14 is a top view showing a state that, from the state shown in FIG. 13, the trigger lever is further turned by being pressed by the large-diameter disk, and the slide cam pressing portion of the trigger lever is contacted with a second engagement portion of the slide cam member.

When the large-diameter disk 100 is further conveyed in the arrow A1 direction from the state, shown in FIG. 13, the large-diameter disk 100 is contacted with the disk contact portion 25a of the trigger lever 25 so as to press the trigger lever 25. At this time, since the rotation shaft portion 25c of the trigger lever 25 is engaged with the axial hole 22g (refer to FIGS. 9 and 10), the movement of the trigger lever 25 in the disk conveying direction is regulated. Meanwhile, the centering member 24 is pressed by the large-diameter disk 100 and moved in the arrow A1 direction. Thereby, the tilt cam portion 24e-2 moves so as to be brought away from the rotation shaft portion 25c of the trigger lever 25, and as shown in FIG. 14, the trigger lever 25 is rotated in the arrow A10 direction about the rotation shaft portion 25c. At this time, the rotation shaft portion 25c is placed in the second straight cam portion 24e-3 (second position), the movement in the arrow A11 direction and the opposite direction thereof is regulated, and the slide cam pressing portion 25b is rotated without being disturbed by the cam portion 16d of the slide cam member 16. Thereby, the slide cam pressing portion 25b moves to the position 25b-3 at which the slide cam pressing portion is contacted with the second engagement portion 16c of the slide cam member 16 as shown in FIG. 11.

Figure 15:
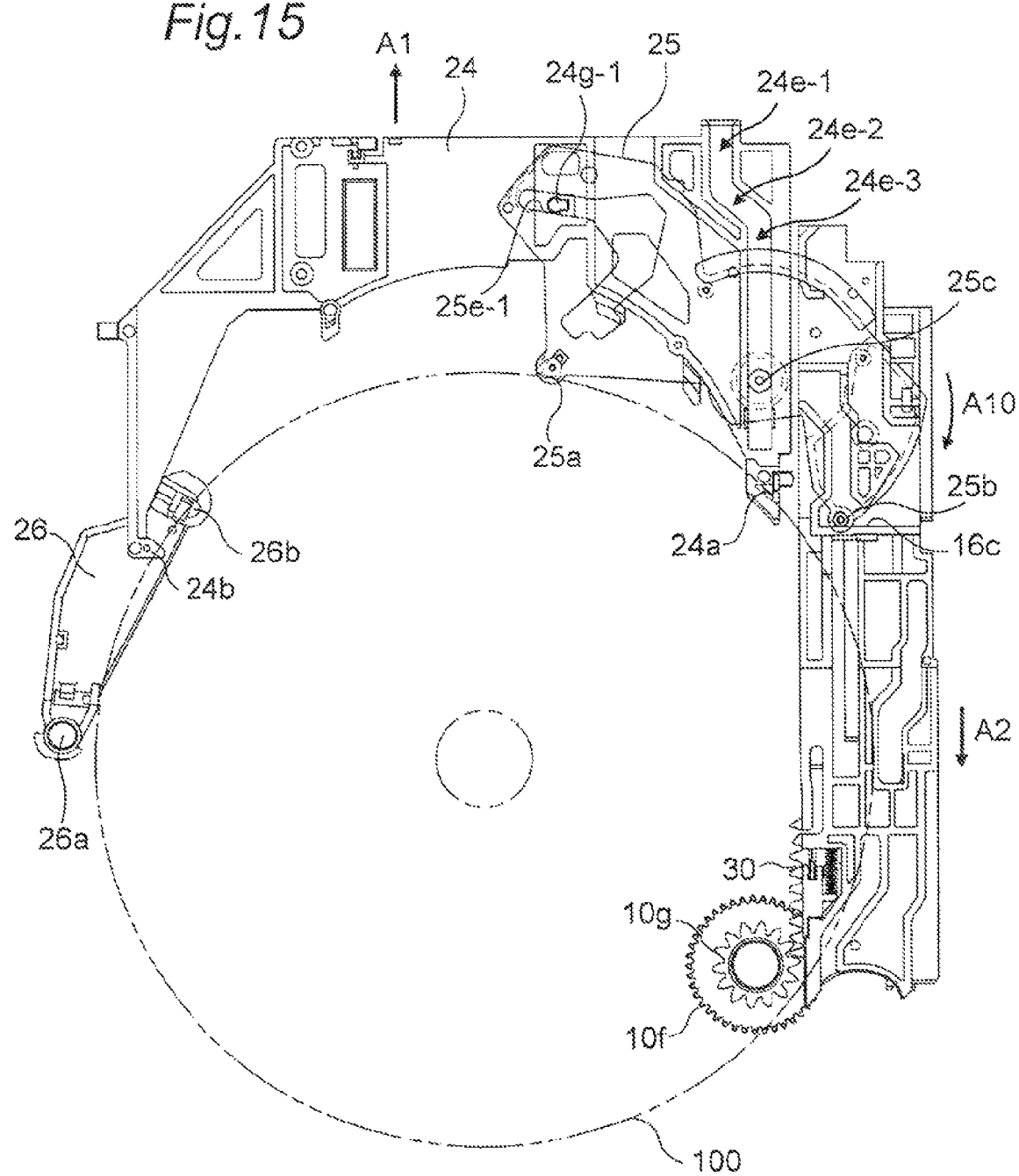
FIG. 15 is a top view showing a state that the large-diameter disk is already conveyed to the replayable position.

When the large-diameter disk 100 is further conveyed in the arrow A1 direction from the state shown in FIG. 14, the trigger lever 25 pressed by the large-diameter disk 100 is further rotated in the arrow A10 direction, and the slide cam pressing portion 25b presses the second engagement portion 16c of the slide cam member 16 in the arrow A2 direction. Thereby, the entire slide cam member 16 slides in the arrow A2 direction, and as shown in FIG. 15, the rack 30 of the slide cam member 16 and the pinion 10g are meshed with each other. Thereby, the conveyance operation of the large-diameter disk 100 is completed, and the installment operation thereof is started.

It is noted that in the state shown in FIG. 15, the slide cam pressing portion 25b is placed at the position 25b-4 at which the slide cam pressing portion is contacted with the second engagement portion 16c of the slide cam member 16 as shown in FIG. 11. In the state shown in FIG. 15, the large-diameter disk 100 is already conveyed to the replayable position.

Since the drive force of the motor 9 is transmitted via the gear row 10 and thus the pinion 10g is rotated in the state shown in FIG. 15, the meshed rack 30 is driven, and the slide cam member 16 further slides in the arrow A2 direction. In accordance with this sliding, the slide cam member 18 connected to the slide cam member 16 via the link arm 17 slides in the arrow A1 direction. By this sliding of the slide cam members 16, 18 in the opposite directions to each other, as described above, the installment operation of the large-diameter disk 100 onto the turntable 13 is performed. By the sliding of the slide cam member 16 in the arrow A2 direction, the second engagement portion 16c is brought away from the slide cam pressing portion 25b, and the slide cam pressing portion 25b is guided by the cam portion 16e and moved to the position 25b-5 shown in FIG. 11.

Figure 16:
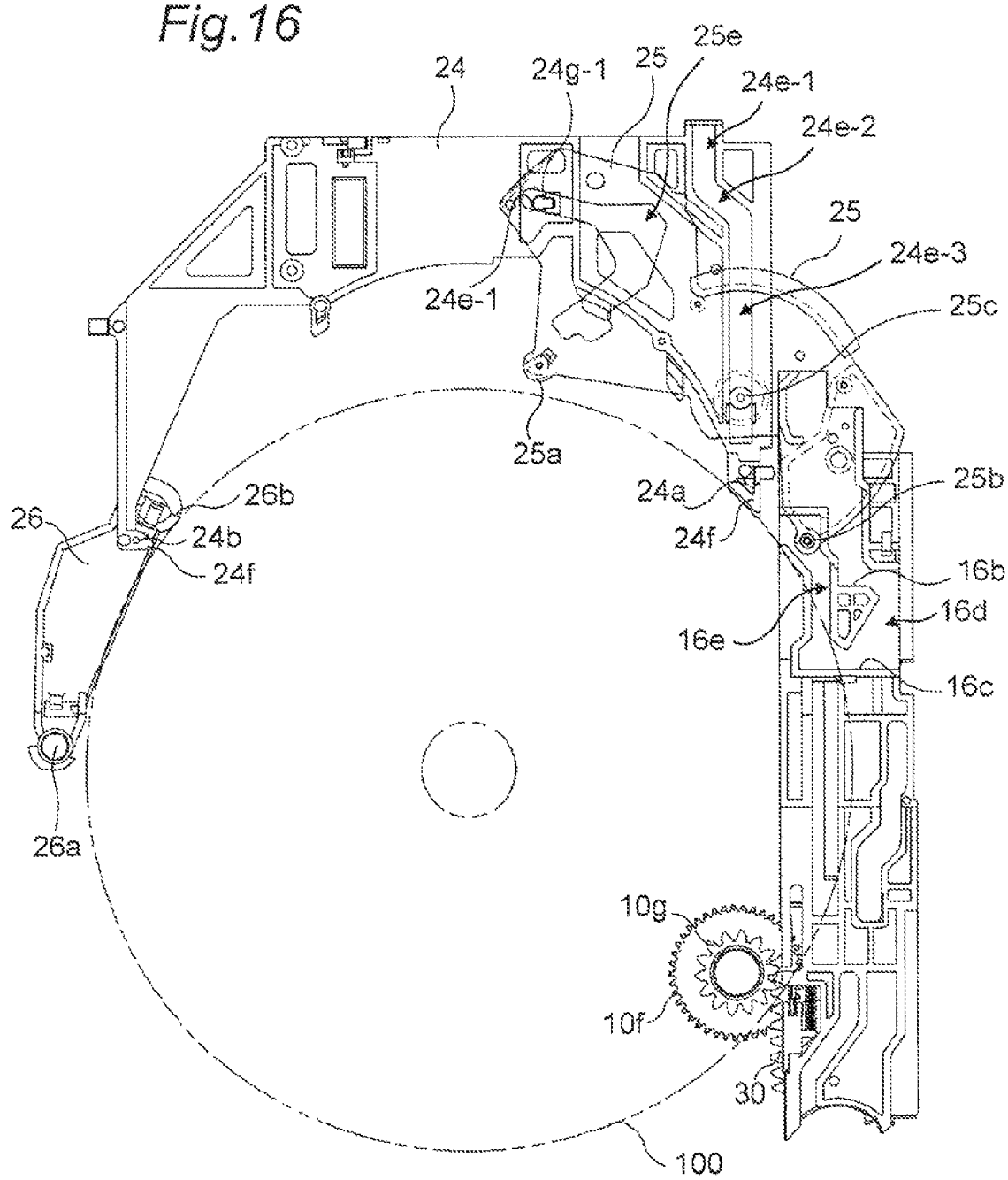
FIG. 16 is a top view showing a state that an installment operation of the large-diameter disk is completed.

When the slide cam member 16 further slides in the arrow A2 direction from the state that the slide cam pressing portion 25b is placed at the position 25b-5, the slide cam pressing portion 25b moves from the cam portion 16e to the position 25b-6 shown in FIG. 11 above the cam portion 16f via an tilt part. At this time, the trigger lever 25 is slightly rotated in the arrow A10 direction about the rotation shaft portion 25c. By this rotation, the guide 24g-1 of the centering member 24 engaged with the link groove 25e-1 of the trigger lever 25 is pressed, and the centering member 24 slides in the arrow A1 direction. Thereby, as shown in FIG. 16, the positioning contact portions 24a, 24b and the positioning guides 24f of the centering member 24, the disk contact portion 25a of the trigger lever 25, and the positioning guide 26b of the guide lever 26 are brought away from the large-diameter disk 100, and hence rotation of the large-diameter disk 100 is not disturbed.

As described above, the installment operation of the large-diameter disk 100 is completed.

Figure 17:
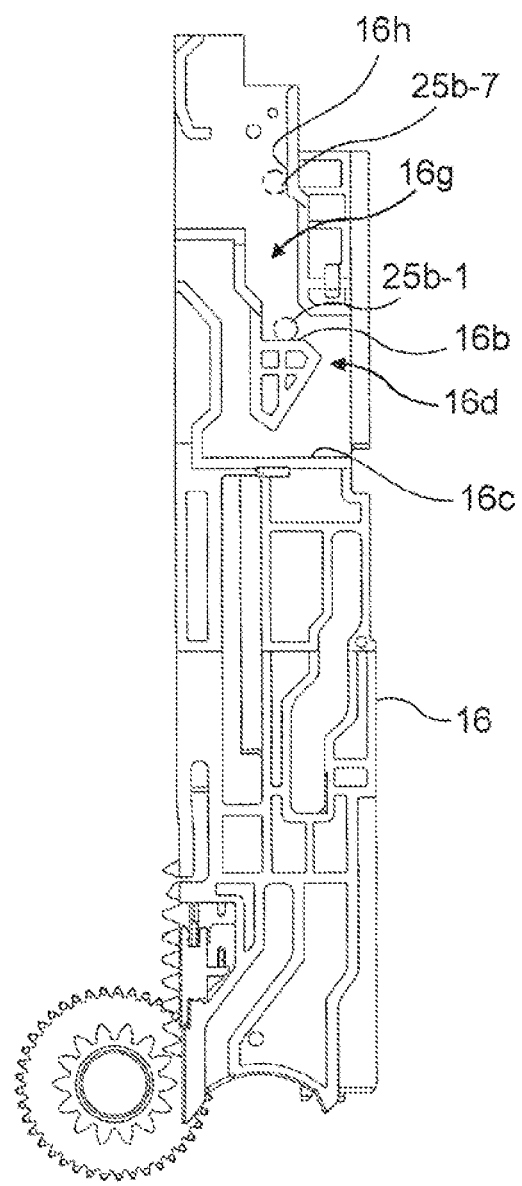
FIG. 17 is a top view showing a relative movement trajectory of the slide cam pressing portion of the trigger lever relative to the engagement portions formed in the slide cam member at the time of inserting a small-diameter disk.

Next, with reference to FIGS. 17 to 21, operations of the parts in the case where the small-diameter disk 200 is inserted into the casing 300 will be described. FIG. 17 is a top view showing a relative movement trajectory of the slide cam pressing portion 25b of the trigger lever 25 relative to the engagement portions provided to the slide cam member 16 at the time of inserting the small-diameter disk. FIGS. 18 to 21 are top views showing positional relationships among the slide cam member 16, the centering member 24, the trigger lever 25, and the guide lever 26 when the small-diameter disk 200 inserted into the casing 300 is conveyed to the replayable position. It is noted that also in these figures, part of the parts is transparently shown for convenience.

The slide cam member 16 is provided with cam portions 16g, 16h other than the first engagement portion 16b, the second engagement portion 16c, and the cam portions 16d to 16f described with reference to FIG. 11. The cam portion 16g is a part for moving the slide cam pressing portion 25b so as to bring the slide cam pressing portion away from the first engagement portion 16b when the small-diameter disk 200 is installed onto the turntable 13 after being conveyed to the replayable position. The cam portion 16h is a part for bringing the positioning contact portions 24c, 24d and the like of the centering member 24 away from the small-diameter disk 200. The positional relationships between the parts are changed as shown in FIGS. 18 to 21, so that the slide cam pressing portion 25b of the trigger lever 25 follows the trajectory of the positions 25b-1 to 25b-7.

Figure 18:
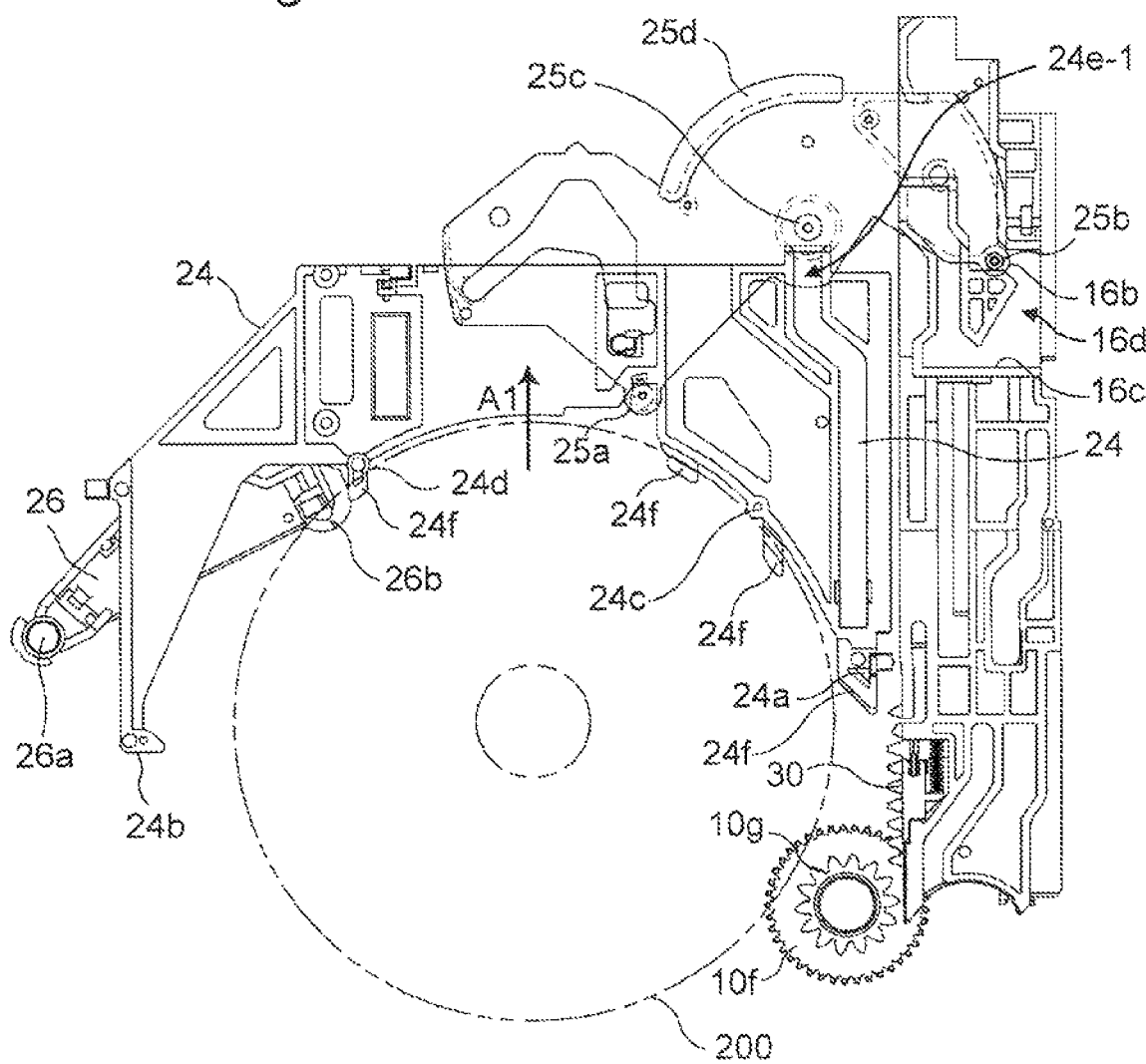
FIG. 18 is a top view showing a state that the small-diameter disk is contacted with the positioning contact portion of the centering member.

When the small-diameter disk 200 is inserted into the casing 300, firstly, the vicinity of the front end of the small-diameter disk 200 is contacted with the positioning guide 26b of the guide lever 26, so that the height in the thickness direction of the small-diameter disk 200 is determined. In this state, when the small-diameter disk 200 is further conveyed to the replayable position, the guide lever 26 is pressed by the small-diameter disk 200 and rotated about the rotation shaft 26a against the bias force of the torsion coil spring 24h, and as shown in FIG. 18, the small-diameter disk 200 is contacted with the positioning contact portions 24c, 24d of the centering member 24. The peripheral part of the small-diameter disk 200 is contacted with the positioning contact portions 24c, 24d, so that the small-diameter disk 200 is centered. That is, the center of the small-diameter disk 200 is positioned so as to be placed on the straight line parallel to the disk conveying direction in plan view, the straight line running through the center of the turntable.

It is noted that in the state shown in FIG. 18, the disk contact portion 25a of the trigger lever 25 is in an initial state in which the disk contact portion is not contacted with the small-diameter disk 200, and the slide cam pressing portion 25b of the trigger lever 25 is placed at the position 25b-1 at which the slide cam pressing portion is contacted with the first engagement portion 16b of the slide cam member 16 as shown in FIG. 17. In a state shown in FIG. 18, the rotation shaft portion 25c of the trigger lever 25 is not guided by the guide cam 24e of the centering member 24.

Figure 19:
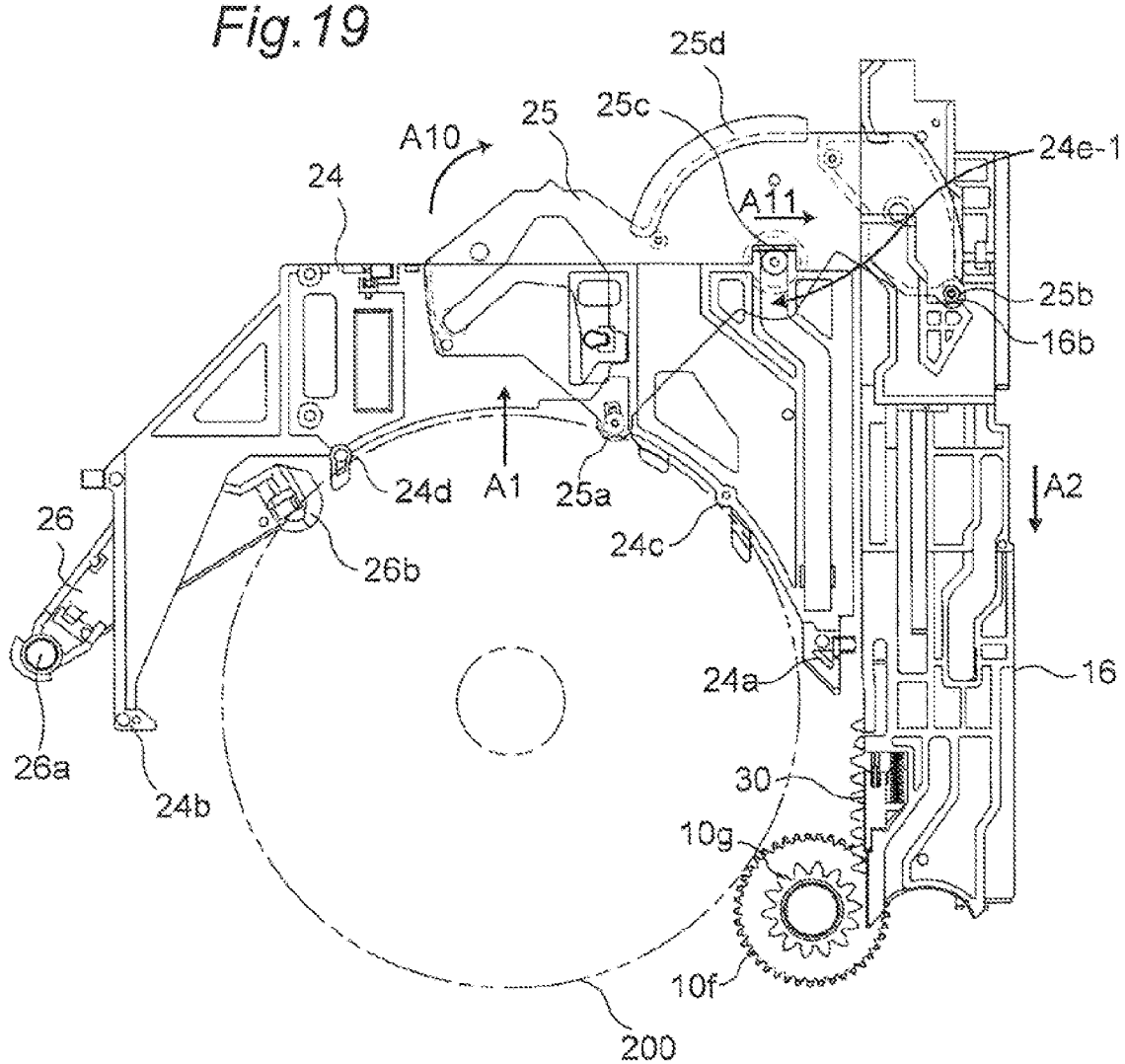
FIG. 19 is a top view showing a state that, from the state shown in FIG. 18, the centering member is pressed by the small-diameter disk and the small-diameter disk is contacted with an contact portion of the trigger lever.

When the small-diameter disk 200 is further conveyed in the arrow A1 direction from the state shown in FIG. 18, the small-diameter disk 200 moves the centering member 24 in the arrow A1 direction against the bias force of the spring 24h, and also moves the guide lever 26 in the arrow A1 direction. Thereby, as shown in FIG. 19, the rotation shaft portion 25c of the trigger lever 25 moves into the first straight cam portion 24e-1 of the guide cam 24e, and the small-diameter disk 200 is contacted with the disk contact portion 25a of the trigger lever 25. It is noted that at this time point, the rack 30 of the slide cam member 16 and the pinion 10g are not yet meshed with each other.

Figure 20:
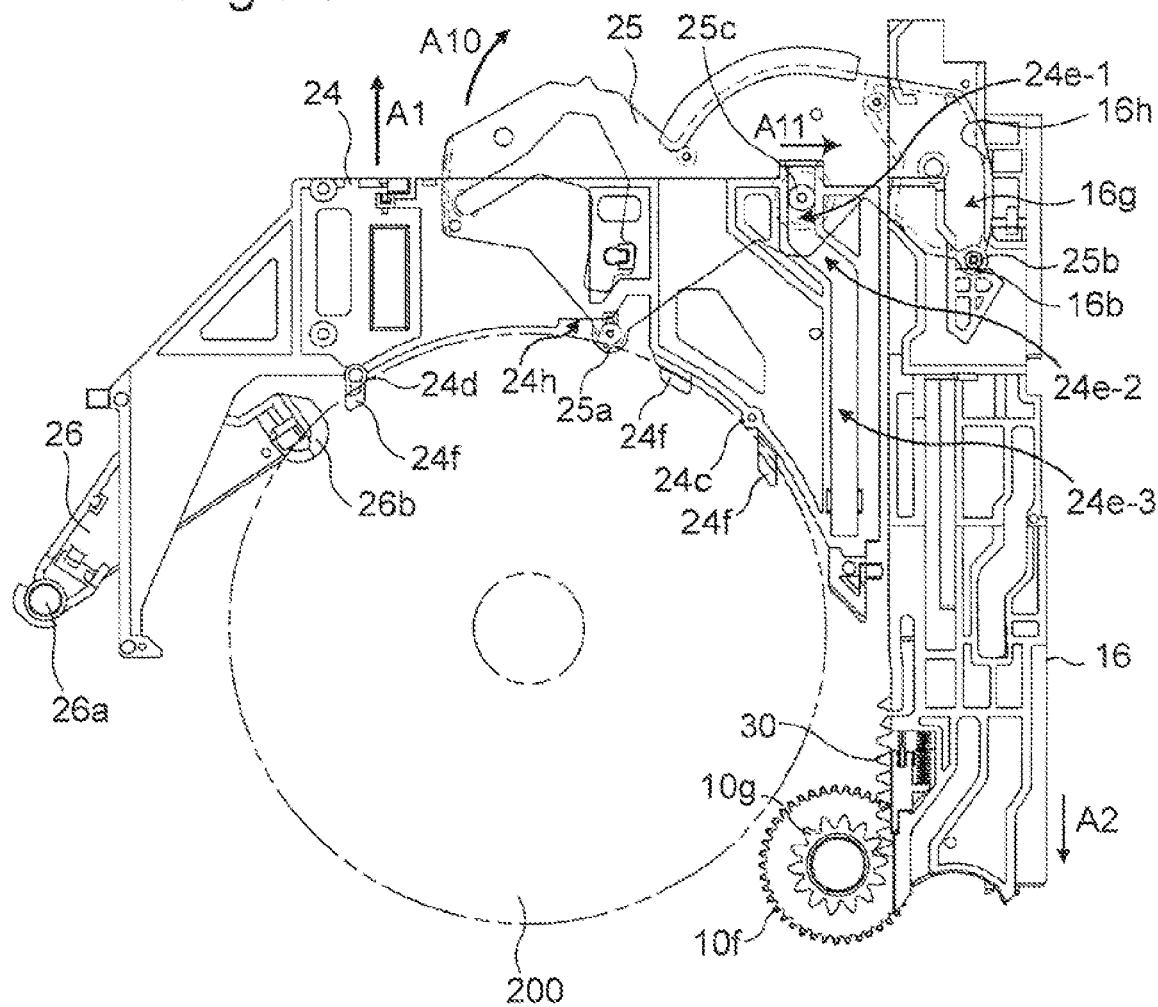
FIG. 20 is a top view showing a state that the small-diameter disk is already conveyed to the replayable position.

When the small-diameter disk 200 is further conveyed in the arrow A1 direction from the state shown in FIG. 19, the trigger lever 25 is pressed by the small-diameter disk 200 in the arrow A1 direction. At this time, since the rotation shaft portion 25c of the trigger lever 25 is engaged with the axial hole 22g (refer to FIGS. 9 and 10), the movement in the disk conveying direction is regulated. Moreover, since the rotation shaft portion is placed in the first straight cam portion 24e-1 (first position), the movement in the arrow A11 direction and the opposite direction thereof is regulated. Meanwhile, the centering member 24 is pressed by the small-diameter disk 200 and moved in the arrow A1 direction. Thereby, the trigger lever 25 pressed by the small-diameter disk 200 is rotated in the arrow A10 direction by the rotation shaft portion 25c. By this rotation of the trigger lever 25, the slide cam pressing portion 25b presses the first engagement portion 16b of the slide cam member 16 in the arrow A2 direction. Thereby, the entire slide cam member 16 slides in the arrow A2 direction, and as shown in FIG. 20, the rack 30 of the slide cam member 16 and the pinion 10g are meshed with each other. Thereby, the conveyance operation of the small-diameter disk 200 is completed, and the installment operation thereof is started. It is noted that in the state shown in FIG. 20, the small-diameter disk 200 is already conveyed to the replayable position.

Since the drive force of the motor 9 is transmitted via the gear row 10 and thus the pinion 10g is rotated in the state shown in FIG. 20, the meshed rack 30 is driven, and the slide cam member 16 further slides in the arrow A2 direction. In accordance with this sliding, the slide cam member 18 connected to the slide cam member 16 via the link arm 17 slides in the arrow A1 direction. By this sliding of the slide cam members 16, 18 in the opposite directions to each other, as described above, the installment operation of the small-diameter disk 200 onto the turntable 13 is performed. By the sliding of the slide cam member 16 in the arrow A2 direction, the first engagement portion 16b is brought away from the slide cam pressing portion 25b, and the slide cam pressing portion 25b is guided and moved by the cam portion 16g.

Figure 21:
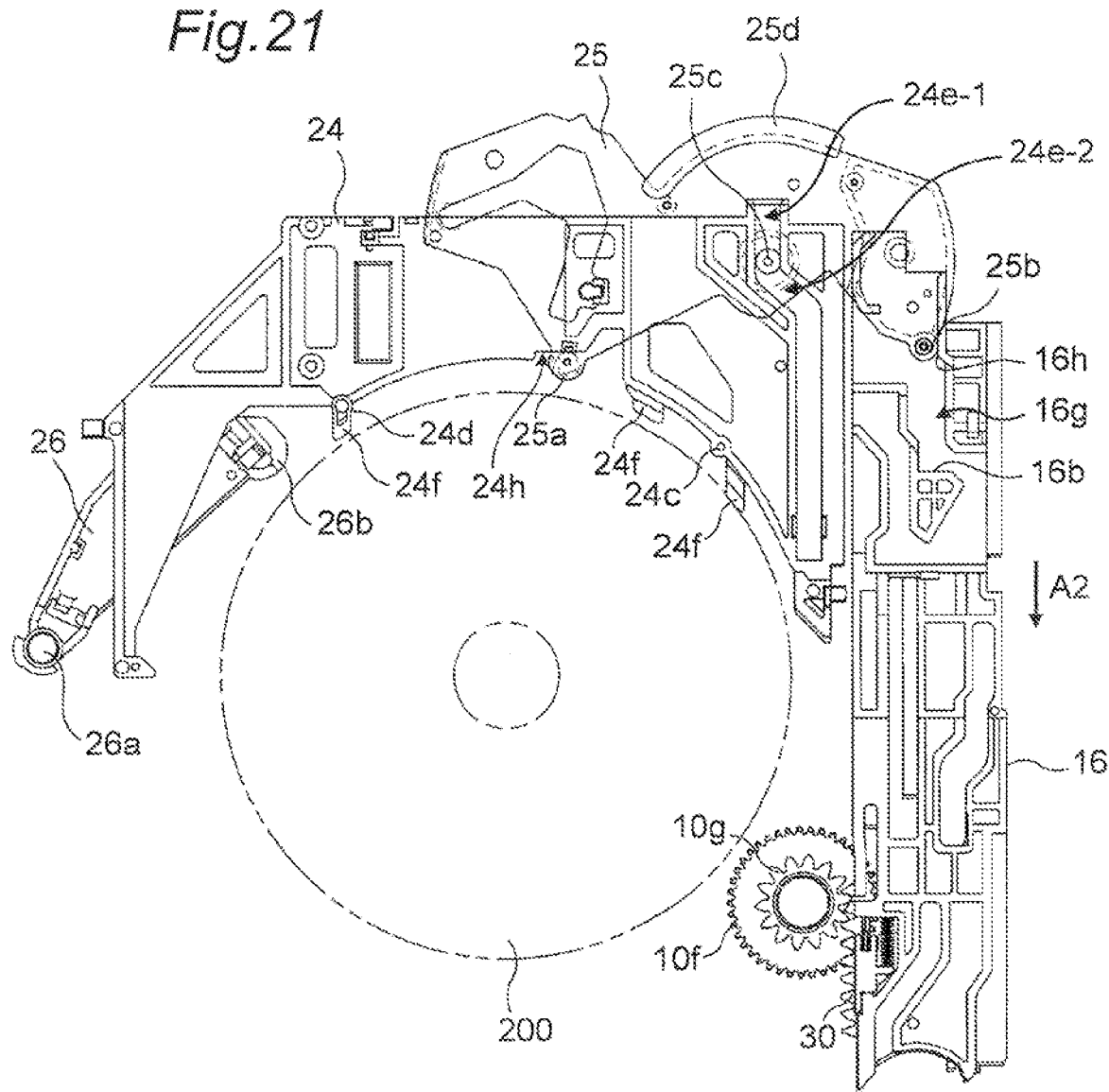
FIG. 21 is a top view showing a state that an installment operation of the small-diameter disk is completed.

When the slide cam member 16 further slides in the arrow A2 direction from the state that the slide cam pressing portion 25b is placed in the cam portion 16g, the slide cam pressing portion 25b moves from the cam portion 16g to the position 25b-7 shown in FIG. 17 above the cam portion 16h via an tilt part. At this time, the trigger lever 25 is slightly rotated in the arrow A10 direction about the rotation shaft portion 25c. By this rotation, the edge portion 24h of the centering member 24 contacted with the disk contact portion 25a of the trigger lever 25 is pressed by the disk contact portion 25a, and the centering member 24 slides in the arrow A1 direction. Thereby, as shown in FIG. 21, the positioning contact portions 24c, 24d and the positioning guides 24f of the centering member 24, the disk contact portion 25a of the trigger lever 25, and the positioning guide 26b of the guide lever 26 are brought away from the small-diameter disk 200, and hence rotation of the small-diameter disk 200 is not disturbed.

As described above, the installment operation of the small-diameter disk 200 is completed.

In the conveyance operation of the small-diameter disk 200, the distance between the position at which the disk is contacted with the positioning contact portions 24c, 24d of the centering member 24 and the replayable position to which the disk is conveyed is shorter than the distance in the conveyance operation of the large-diameter disk 100. Therefore, the rotation shaft portion 25c of the trigger lever 25 is not moved into the tilt cam portion 24e-2 of the guide cam 24e but moved only in the first straight cam portion 24e-1.

Figure 22:
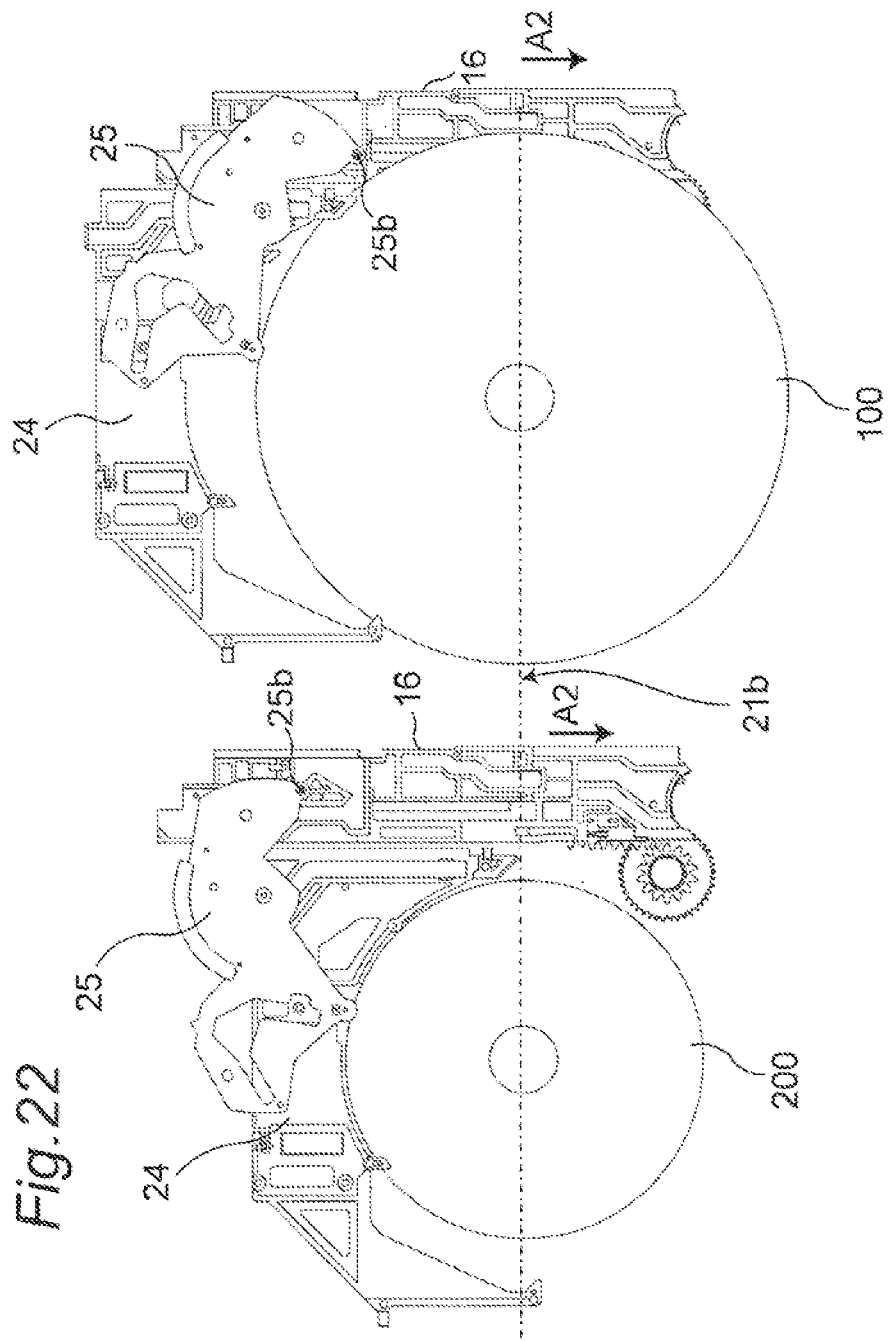
FIG. 22 is a view showing a positional relationship of the slide cam member, the centering member, and the trigger lever relative to the large-diameter disk conveyed to the replayable position, and a positional relationship of the slide cam member, the centering member, and the trigger lever relative to the small-diameter disk conveyed to the replayable position.

FIG. 22 is a view stowing a positional relationship of the slide cam member 16, the centering member 24, and the trigger lever 25 relative to the large-diameter disk 100 conveyed to the replayable position, and a positional relationship of the slide cam member 16, the centering member 24, and the trigger lever 25 relative to the small-diameter disk 200 conveyed to the replayable position. In FIG. 22, the center of the large-diameter disk 100 and the center of the small-diameter disk 200 are placed on a straight line 21b orthogonal to the disk conveying direction, the straight line running through the center of the turntable 13. As clear from FIG. 22, even in the case where any of the large-diameter disk 100 and the small-diameter disk 200 is inserted into the casing 300, the slide cam member 16 can be slid in the arrow A2 direction by the slide cam pressing portion 25b of the trigger lever 25.

Next, with reference to FIGS. 23 to 27, a configuration for raising and lowering the turntable 13 will be described in more detail.

Figure 23:
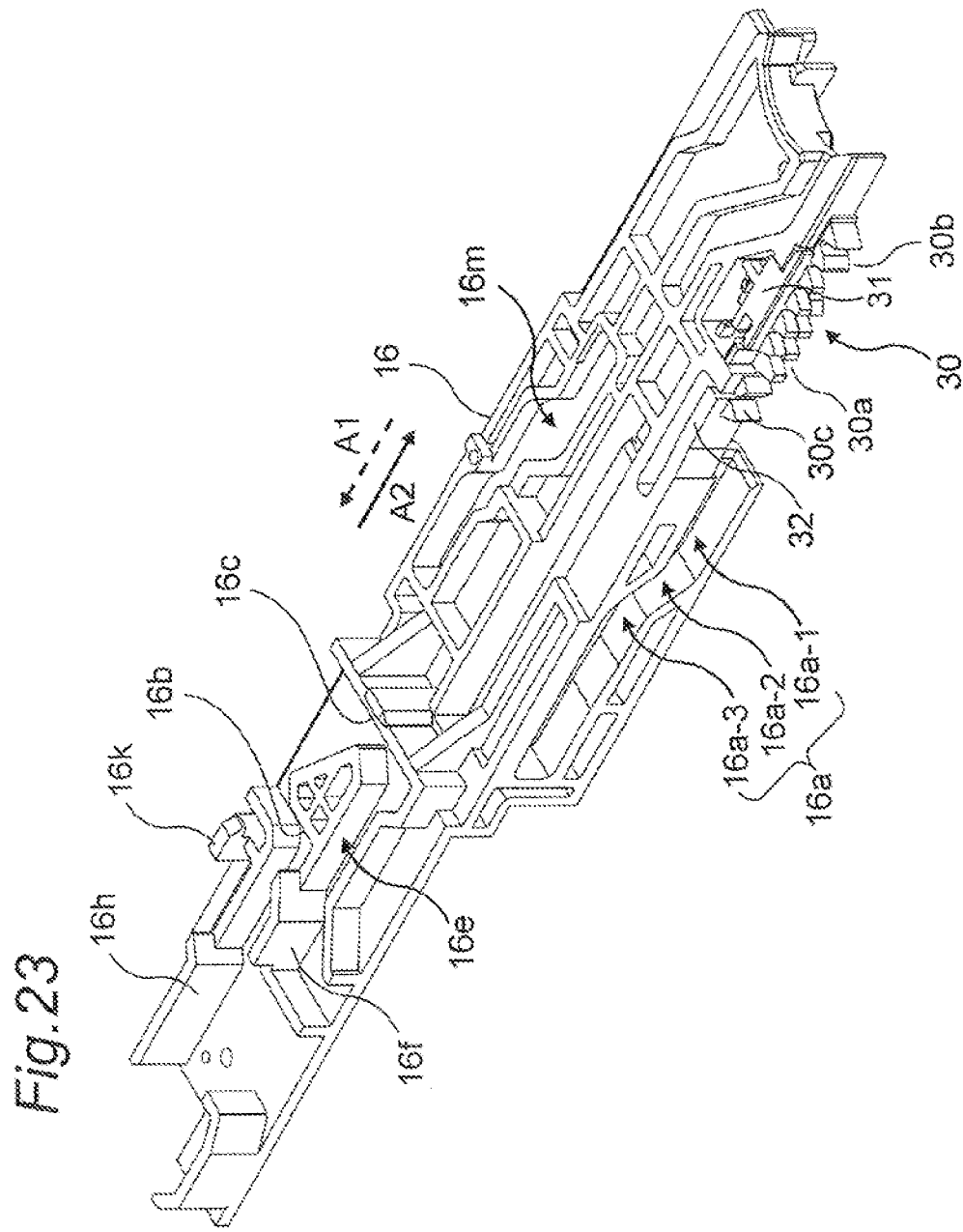
FIG. 23 is a perspective view of the slide cam member.

FIG. 23 is a perspective view of the slide cam member 16. As described above, the raising and lowering cam 16a to be engaged with the engagement pin 19c provided to the intermediate chassis 19 in order to raise and the lower the front part of the intermediate chassis 19 is formed in the slide cam member 16. This raising and lowering cam 16a is formed by a lower surface cam portion 16a-1, a tilt cam portion 16a-2, and a higher surface cam portion 16a-3. The lower surface cam portion 16a-1 is a part for retaining the front part of the intermediate chassis 19 in a state that the front part is lowered. The tilt cam portion 16a-2 is a part for raising and lowering the front part of the intermediate chassis 19. The higher surface cam portion 16a-3 is a part for retaining the front part of the intermediate chassis 19 in a state that the front part is raised.

As shown in FIG. 2, the raising and lowering cam 18a to be engaged with the engagement pin 19d of the intermediate chassis 19 is formed to the slide cam member 18. This raising and lowering cam 18a is formed by a lower surface cam portion, a tilt cam portion, and a higher surface cam portion similarly to the slide cam member 16. The cam portions of the raising and lowering cam 18a and the cam portions 16a-1 to 16a-3 of the raising and lowering cam 16a have the opposite tilt directions to each other.

Accordingly, the slide cam member 16 and the slide cam member 18 slide in the opposite directions to each other as described above in a state that the engagement pin 19c is engaged with the raising and lowering cam 16a and the engagement pin 19d is engaged with the raising and lowering cam 18a, so that the front part of the intermediate chassis 19 is raised or lowered. That is, the turntable 13 provided in the front part of the intermediate chassis 19 is raised by the sliding of the slide cam member 16 in the arrow direction A2 and lowered by the sliding of the slide cam member 16 in the arrow A1 direction.

Figure 24A:
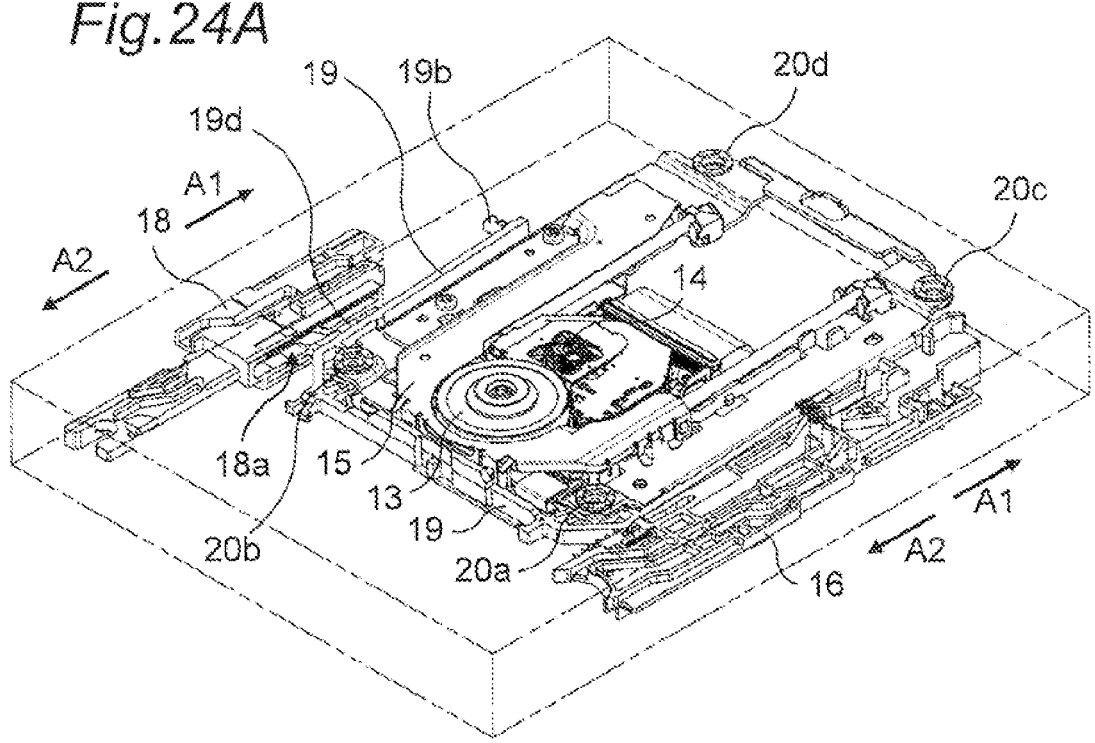
FIG. 24A is a perspective view showing a positional relationship between an intermediate chassis and a pair of slide cam members when a turntable is lowered.
Figure 24B:
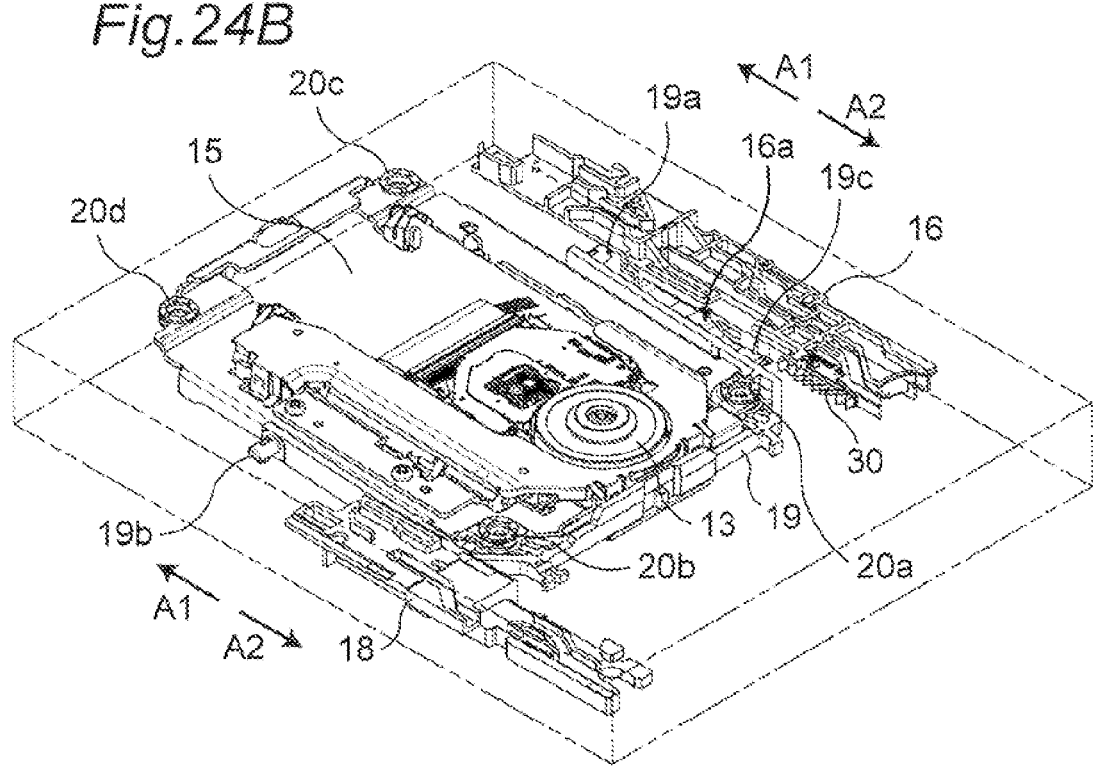
FIG. 24B is another perspective view showing a positional relationship between the intermediate chassis and the pair of slide cam members when the turntable is lowered.
Figure 25:
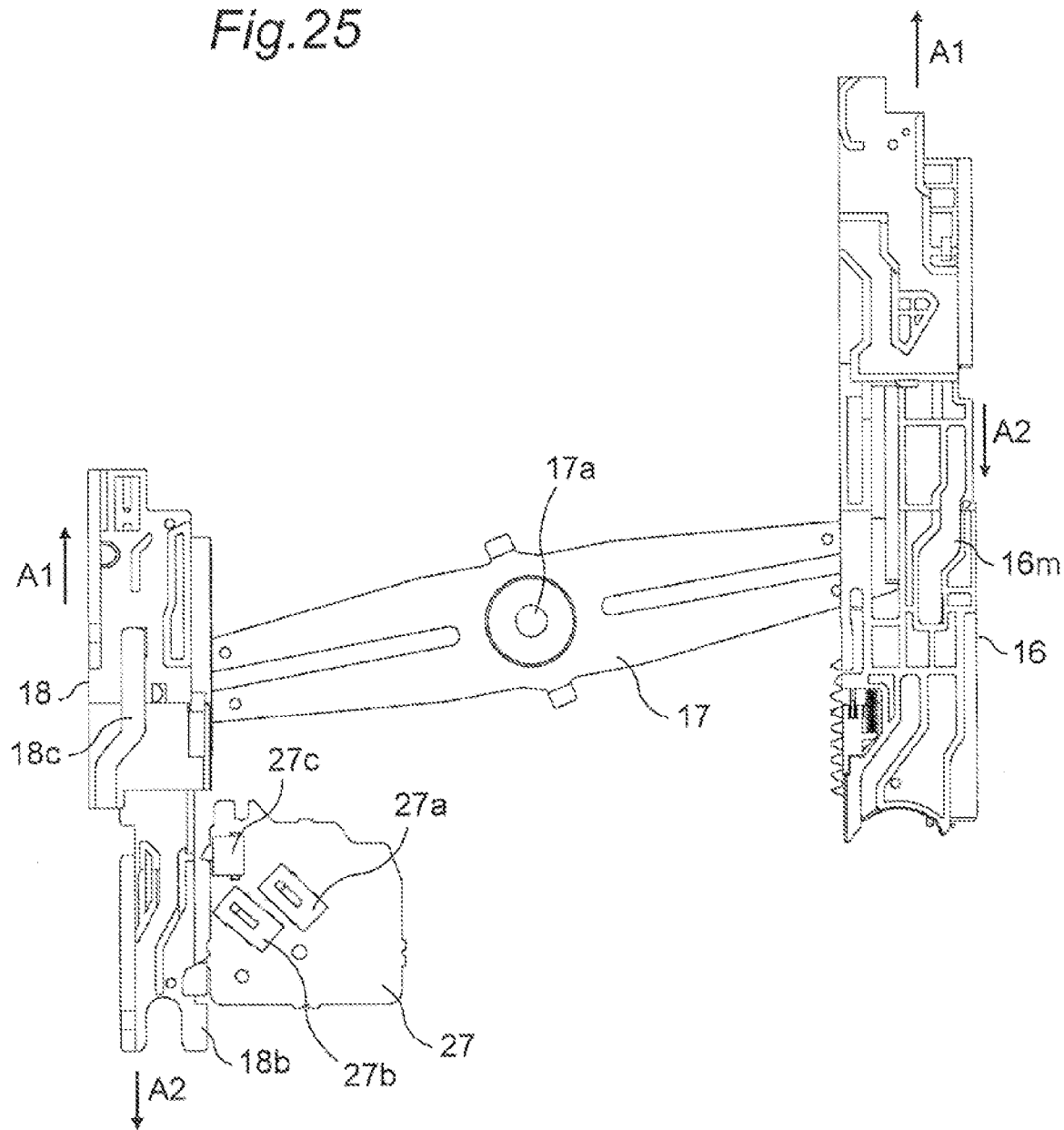
FIG. 25 is a top view showing a positional relationship between the pair of slide cam members and a link arm when the turntable is lowered.

FIGS. 24A and 24B are perspective views showing a positional relationship between the intermediate chassis 19 and the slide cam members 16, 18 when the turntable 13 is lowered (standby state that the disk is not inserted). FIG. 25 is a top view showing a positional relationship between the slide cam members 16, 18 and the link arm 17 when the turntable 13 is lowered. In this state, the slide cam member 16 is biased in the A1 direction by the spring 16j as described above with reference to FIG. 3. This slide cam member 16 is coupled to the slide cam member 18 via the link arm 17. The link arm 17 is provided rotatably about a rotation shaft 17a. Therefore, the slide cam member 18 is biased by the spring 16j in the arrow A2 direction opposite to that of the slide cam member 16. In this state, since the turntable 13 is lowered, the disk can be inserted.

As shown in FIG. 25, a protruding portion 18b capable of being contacted with the detection switch 27c is formed to the slide cam member 18. When the disk is conveyed to the replayable position and the slide cam member 18 slides in the arrow A1 direction, the protruding portion 18b is contacted with the detection switch 27c so as to operate the detection switch 27c.

It is noted that as described above, the state shown in FIGS. 24A, 24B, and 25 is continued until the disk is conveyed to the replayable position, the slide cam member 16 is pressed by the slide cam pressing portion 25b of the trigger lever 25, the rack 30 is meshed with the pinion 10g, and then the slide cam member 16 starts sliding in the arrow A2 direction. The slide cam member 16 slides in the arrow A2 direction and the slide cam member 18 slides in the arrow A1 direction, so that the engagement pins 19c, 19d of the intermediate chassis 19 move along the raising and lowering cam 16a and the raising and lowering cam 18a. Thereby, the front part of the intermediate chassis 19 is raised, the turntable 13 is raised, and the disk is nipped between the turntable 13 and the clamper 21. After that, the protruding portion 18b of the slide cam member 18 described above is contacted with the detection switch 27c, so that the drive of the motor 9 is stopped. Thereby, the disk is brought into an installment completion state.

Figure 26A:
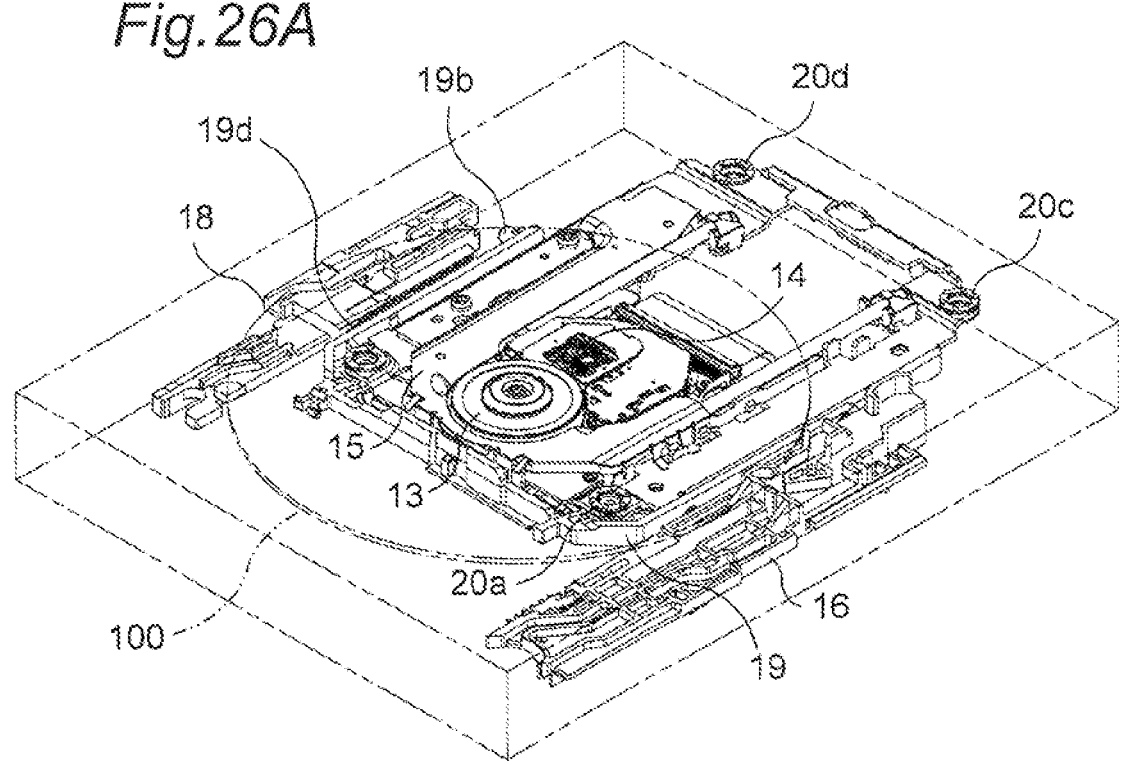
FIG. 26A is a perspective view showing a positional relationship between the intermediate chassis and the pair of slide cam members when the turntable is raised.
Figure 26B:
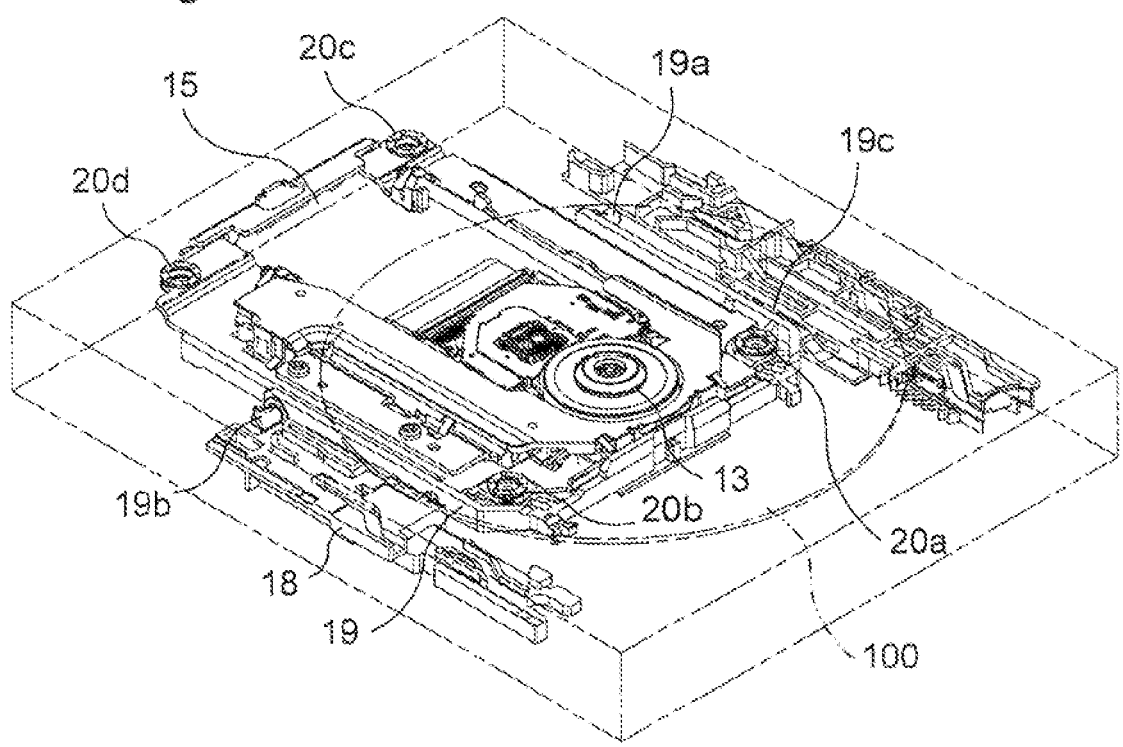
FIG. 26B is another perspective view showing a positional relationship between the intermediate chassis and the pair of slide cam members when the turntable is raised.
Figure 27:
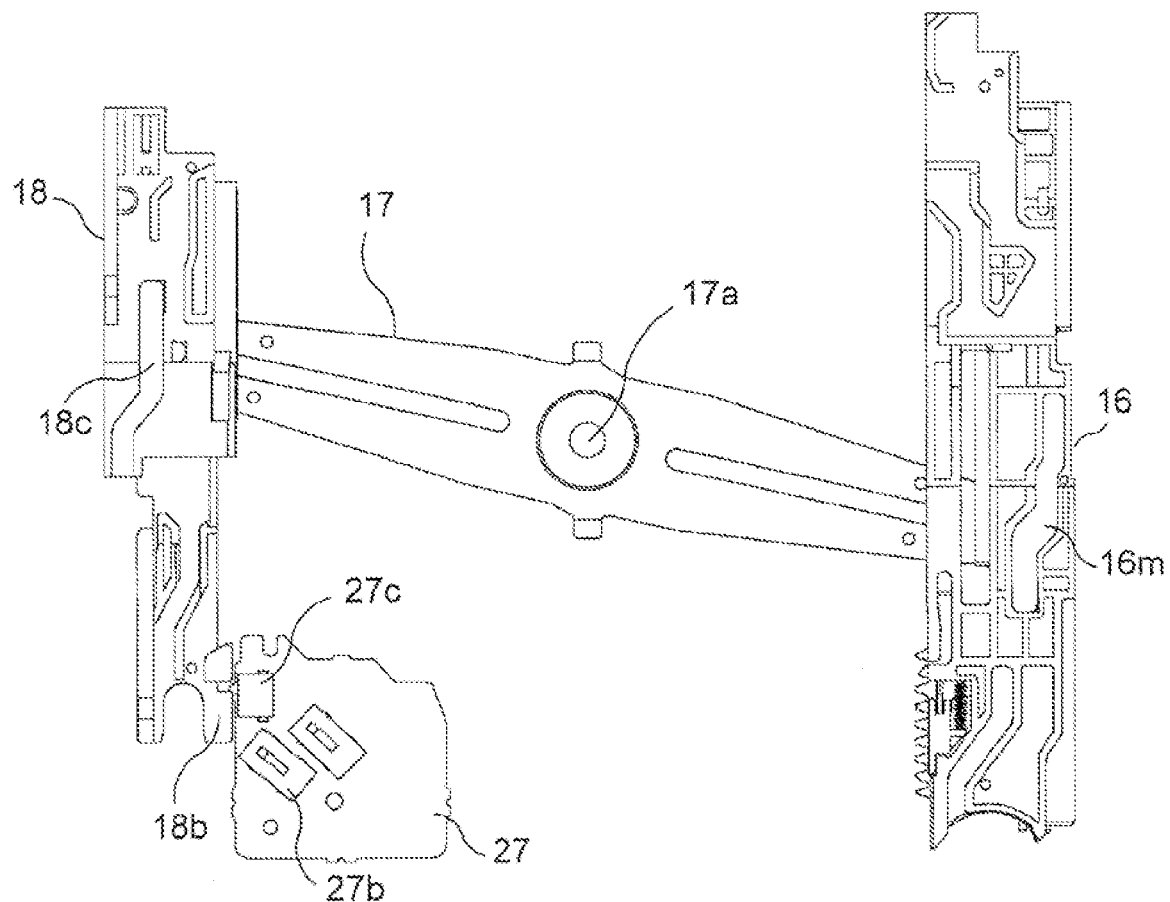
FIG. 27 is a top view showing a positional relationship between the pair of slide cam members and the link arm when the turntable is raised.

FIGS. 26A and 26B are perspective views showing a positional relationship between the intermediate chassis 19 and the slide cam members 16, 18 when the turntable 13 is raised (installment completion state of the disk: refer to FIG. 16 for the large-diameter disk 100, and refer to FIG. 21 for the small-diameter disk 200). FIG. 27 is a top view showing a positional relationship among the slide cam member 16, the slide cam member 18, and the link arm 17 when the turntable 13 is raised. It is noted that at this time, the rack 30 and pinion 10g remain being meshed with each other. This state is continued until the motor 9 is reversely driven by an ejecting operation for the disk ejection and the slide cam member 16 moves in the arrow A1 direction opposite to that of the disk conveyance.

It is noted that as shown in FIG. 23, an engagement portion 16k supporting the spring 16j for biasing the slide cam member 16 in the arrow A1 direction is formed in the slide cam member 16. A cam groove 16m for moving the clamper lifter 23a is formed on the upper surface of the slide cam member 16. Similarly, as shown in FIGS. 25 and 27, a cam groove 18c for moving the clamper lifter 23b is formed on the upper surface of the slide cam member 18.

Figure 28:
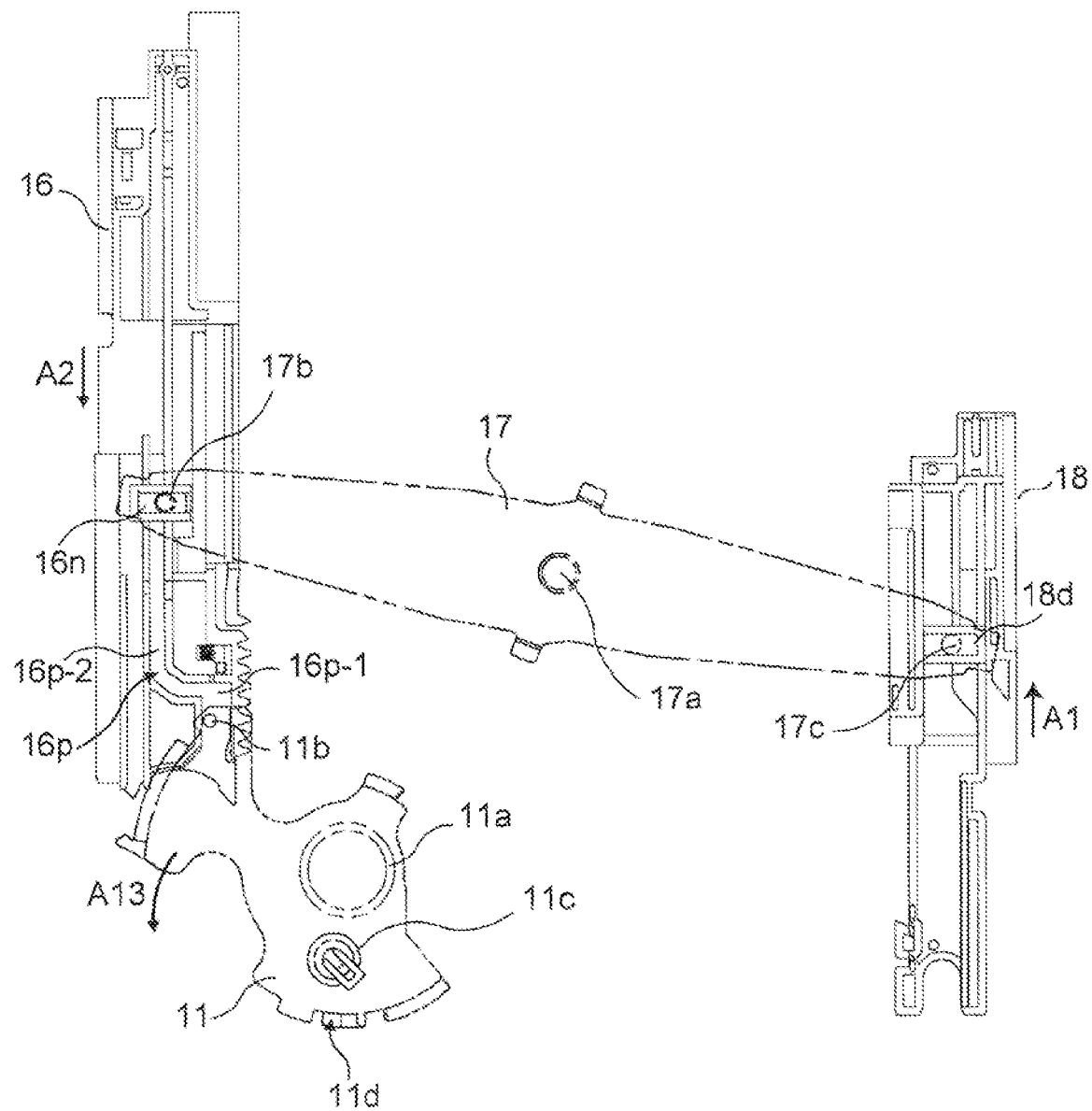
FIG. 28 is a bottom view showing a positional relationship among the pair of slide cam members, the link arm, and a clutch plate when the turntable is lowered.
Figure 29:
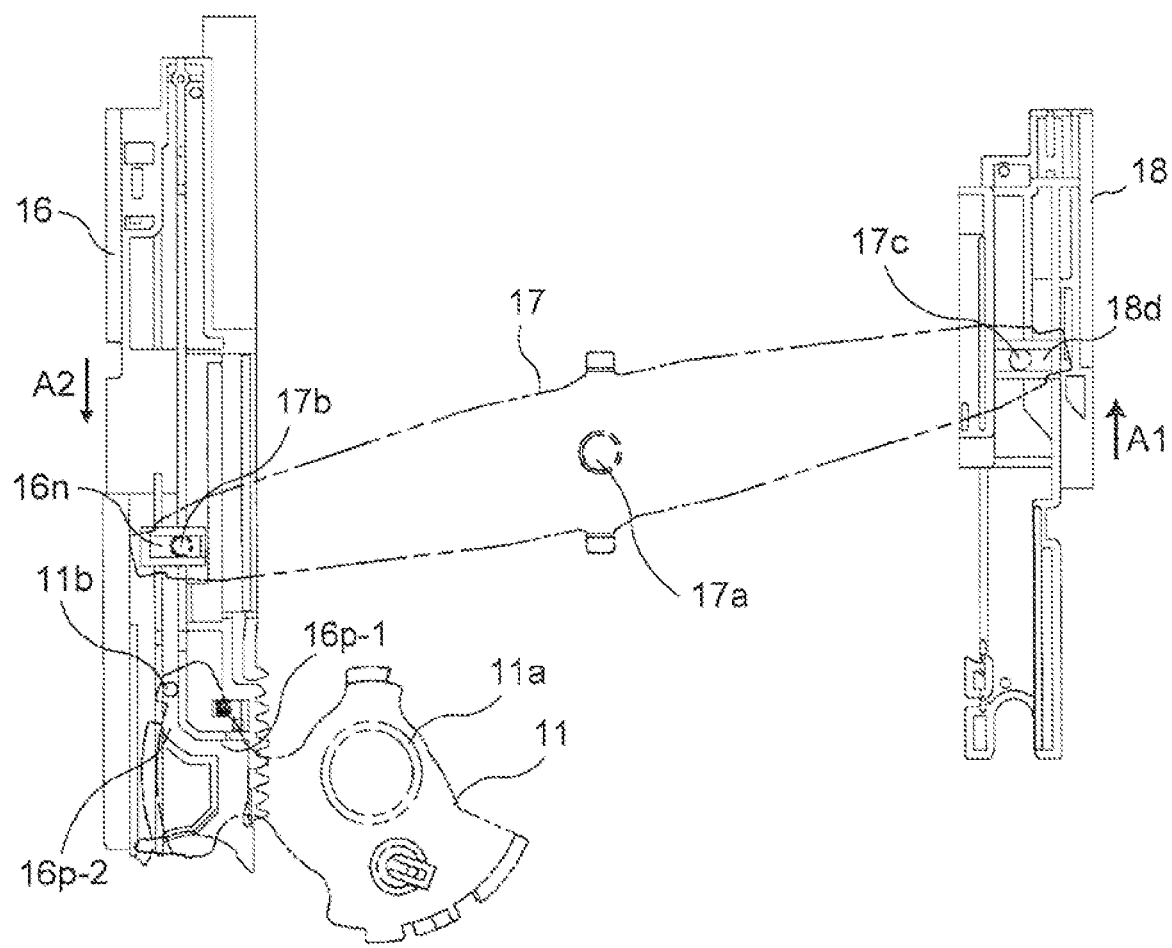
FIG. 29 is a bottom view showing a positional relationship among the pair of slide cam members, the link arm, and the clutch plate when the turntable is raised.

FIG. 28 is a bottom view showing a positional relationship among the slide cam members 16, 18, the link arm 17, and the clutch plate 11 when the turntable 13 is lowered. FIG. 29 is a bottom view showing a positional relationship among the slide cam members 16, 18, the link arm 17, and the clutch plate 11 when the turntable 13 is raised. As shown in these figures, engagement pins 17b, 17c are formed at both ends of the link arm 17. The engagement pin 17b is engaged with an engagement concave portion 16n formed in the slide cam member 16, and the engagement pin 17c is engaged with an engagement concave portion 18d formed in the slide cam member 18. Thereby, the link arm 17 couples the slide cam members 16, 18 so that these slide cam members are operated in association with each other. It is noted that the engagement pins 17b, 17c of the link arm 17 move while following an arc shape about the rotation shaft 17a, whereas the slide cam members 16, 18 move in a straight line in the arrow A1 or A2 direction. That is, in accordance with the rotation of the link arm 17, the distance between the rotation shaft 17a of the link arm 17 and the engagement concave portions 16n, 18d is changed. Therefore, the engagement concave portions 16n, 18d are formed into a groove shape elongated at right angle to the arrow A11 and A2 directions so that the rotation of the link arm 17 is not prevented by the change in the distance.

As shown in FIGS. 28 and 29, a cam 16p is formed on the lower surface of the slide cam member 16 so as to rotate the clutch plate 11 in association with the sliding of the slide cam member 16. This cam 16p is formed by a first cam portion 16p-1 and a second cam portion 16p-2. The first cam portion 16p-1 is formed and extended at right angle to the sliding direction (arrow A1 or A2 direction) of the slide cam member 16. The second cam portion 16p-2 is extended in the sliding direction of the slide cam member 16 and formed so as to be coupled to the first cam portion 16p-1.

Figure 30:
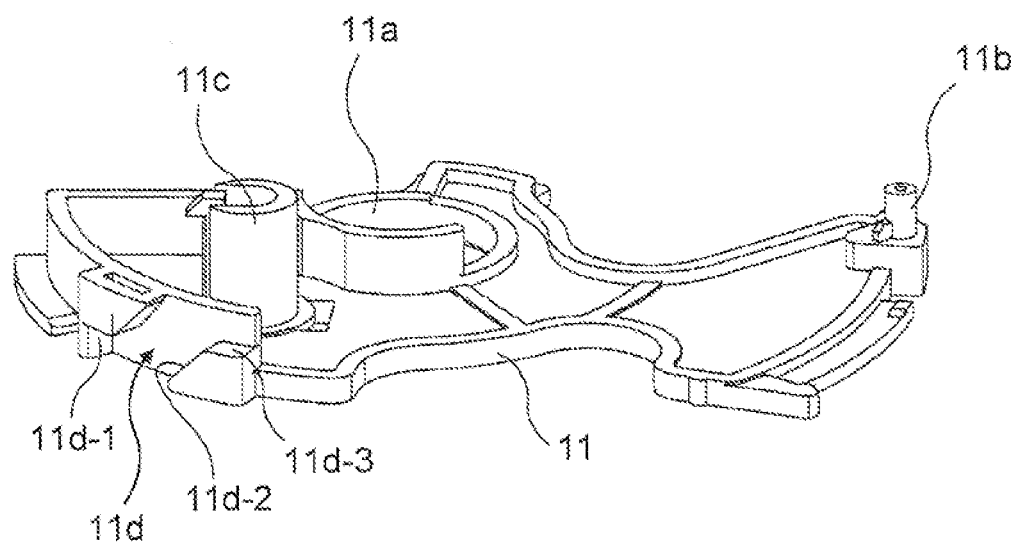
FIG. 30 is a perspective view of the clutch plate.

FIG. 30 is a perspective view of the clutch plate 11 seen from the upper side. The clutch plate 11 is provided with a bearing portion 11a rotatably supported on a shaft formed to the mechanical chassis 12, an engagement pin 11b to be engaged with the cam 16p of the slide cam member 16, a shaft portion 11c for rotatably supporting the gear 10c, and a cam 11d for raising and lowering a disk insertion blocking member 33. The clutch plate 11 is rotatable in a state that the bearing portion 11a is arranged coaxially with a rotation axis of the gear 10d for transmitting the drive force of the motor 9, and the gear 10c is rotatably supported by a periphery of the shaft portion 11c. The cam 11d has a lower surface cam portion 11d-1, a tilt cam portion 11d-2, and an upper surface cam portion 11d-3.

The slide cam member 16 slides in a state that the engagement pin 11b is engaged with the cam 16p of the slide cam member 16, so that the clutch plate 11 is rotated. That is, the slide cam member 16 slides in the arrow A2 direction from the state shown in FIG. 28, so that the engagement pin 11b is contacted with the first cam portion 16p-1. When the slide cam member 16 further slides in the arrow A2 direction from this state, the clutch plate 11 is rotated in an arrow A13 direction about the bearing portion 11a, and the engagement pin 11b moves from the first cam portion 16p-1 to the second cam portion 16p-2. Thereby, the rotation of the clutch plate 11 is stopped. When the slide cam member 16 further slides in the arrow A2 direction from this state, the engagement pin 11b is guided and moved by the second cam portion 16p-2. FIG. 29 shows a state that the disk installment operation described above is completed and the sliding of the slide cam member 16 is stopped. In this state, the engagement pin 11b is retained by the second cam portion 16p-2, and the rotation of the clutch plate 11 is regulated.

Next, with reference to FIGS. 31 to 33, an operation for switching the transmission route of the drive force of the motor 9 by rotating the clutch plate 11, that is, an operation for switching the disk conveyance operation and the disk installment operation will be described.

Figure 31:
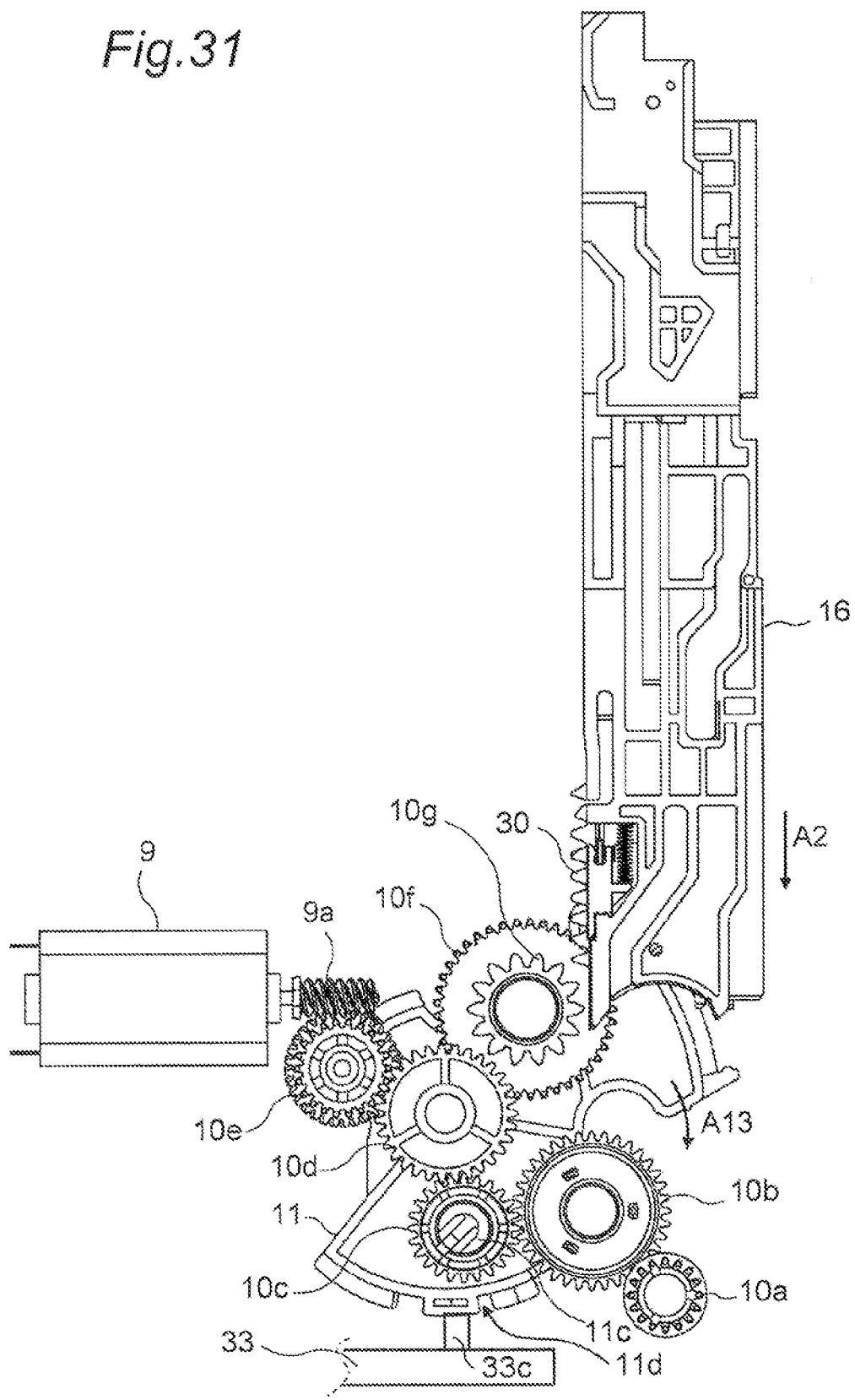
FIG. 31 is a top view showing a positional relationship of parts relating to the clutch plate before a disk conveyance operation.

FIG. 31 is a top view showing a positional relationship of the parts relating to the clutch plate before the disk conveyance operation. In the state shown in FIG. 31, the drive force of the motor 9 can be transmitted to the gear 10a via the worm gear 9a, the gear 10e, the gear 10d, the gear 10c, and the gear 10b. As described above with reference to FIGS. 2 and 7, the gear 10a can transmit the drive force of the motor 9 to the roller gears 6e, 6f integrated with the rubber rollers 6a, 6b via the gear row 8. Meanwhile, in this state, the gear 10f is meshed with the lower portion of the gear 10d so as to transmit the drive force. However, the pinion 10g integrated with the gear 10f is not meshed with the rack 30.

When the motor 9 is driven in the state shown in FIG. 31, the drive force of the motor 9 is transmitted to the roller gears 6e, 6f, so that the rubber rollers 6a, 6b are rotated. By this rotation of the rubber rollers 6a, 6b, the disk can be conveyed to the replayable position. At this time, the drive force of the motor 9 functions as disk conveying force. At this time, the drive force of the motor 9 is also transmitted to the pinion 10g and the pinion is rotated. However, the pinion is not yet meshed with the rack 30.

When the disk is conveyed in the arrow A1 direction to the replayable position, as described above, the slide cam member 16 slides in the arrow A2 direction. Thereby, the rack 30 and the pinion 10g are meshed with each other. At this time, since the drive force of the motor 9 is transmitted to the pinion 10g and the pinion is rotated, the slide cam member 16 further slides in the arrow A2 direction. By this sliding of the slide cam member 16, the clutch plate 11 is rotated in the arrow A13 direction as described above with reference to FIGS. 28 and 29. By this rotation, the gear 10c provided on the clutch plate 11 moves in the arrow A13 direction at the same time. Thereby, as shown in FIG. 32, meshing between the gear 10b provided on the mechanical chassis 12 and the gear 10c is released, so that the rotation of the rubber rollers 6a, 6b is stopped.

Figure 32:
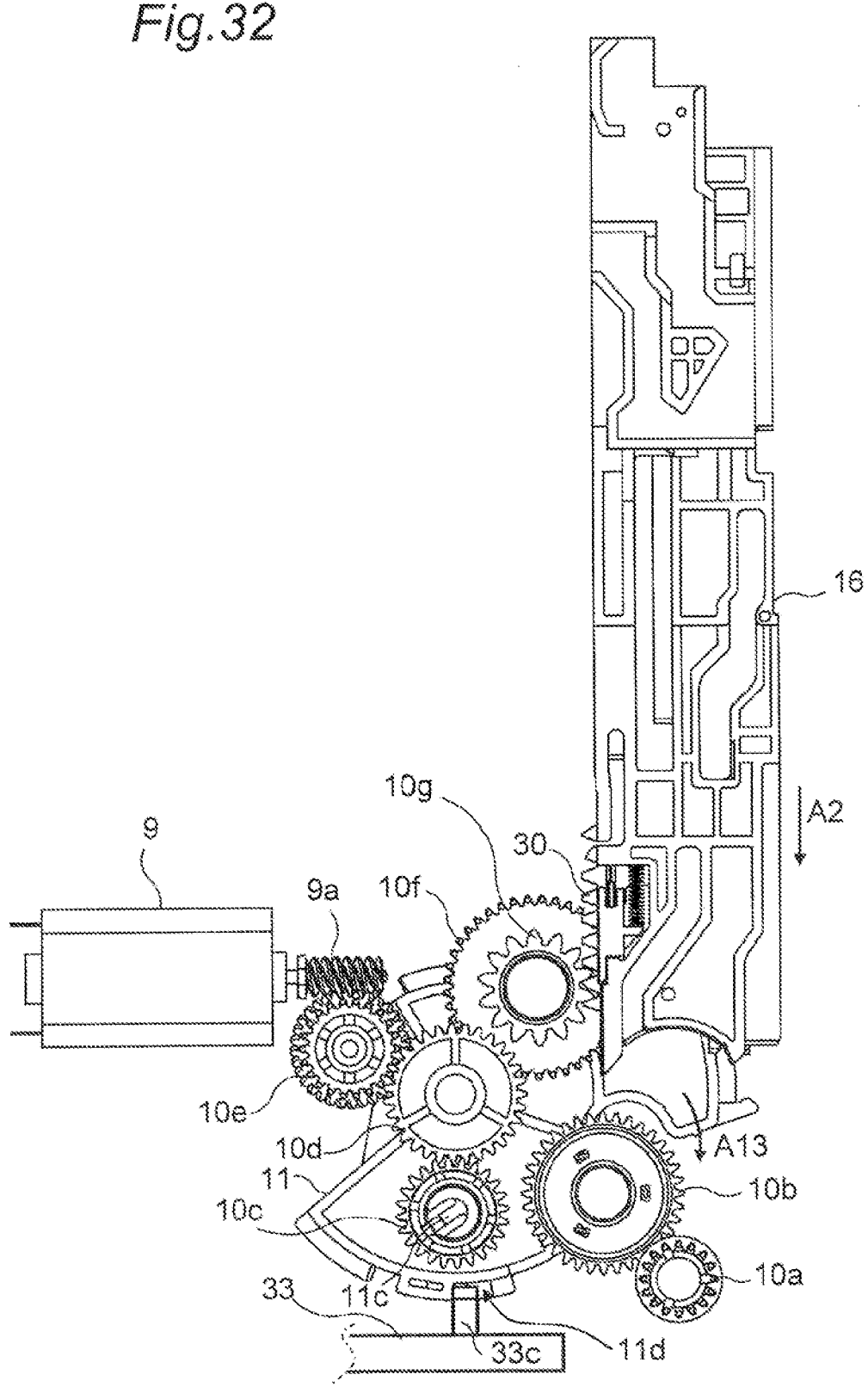
FIG. 32 is a top view showing a positional relationship of the parts relating to the clutch plate during a disk installment operation.

FIG. 32 is a top view showing a positional relationship of the parts relating to the clutch plate during the disk installment operation. At this time, the drive force of the motor 9 is transmitted only to the pinion 10g via the worm gear 9a, the gear 10e, the gear 10d, and the gear 10f. When the slide cam member 16 further slides in the A2 direction by the rotation of the pinion 10g meshed with the rack 30, as described above, the engagement pin 11b of the clutch plate 11 moves to the second cam portion 16p-2 of the cam 16p, so that the rotation of the clutch plate 11 is regulated. In the state that the engagement pin 11b is placed in the second cam portion 16p-2, further movement of the slide cam member 16 in the A2 direction is allowed. When the slide cam member 16 slides to the position shown in FIG. 29, the drive of the motor 9 is stopped. In this process of rotating the clutch plate 11 from this first cam portion 16p-1 to the second cam portion 16p-2, the disk is installed onto the turntable 13 and is brought into the installment completion state shown in FIG. 33.

Figure 33:
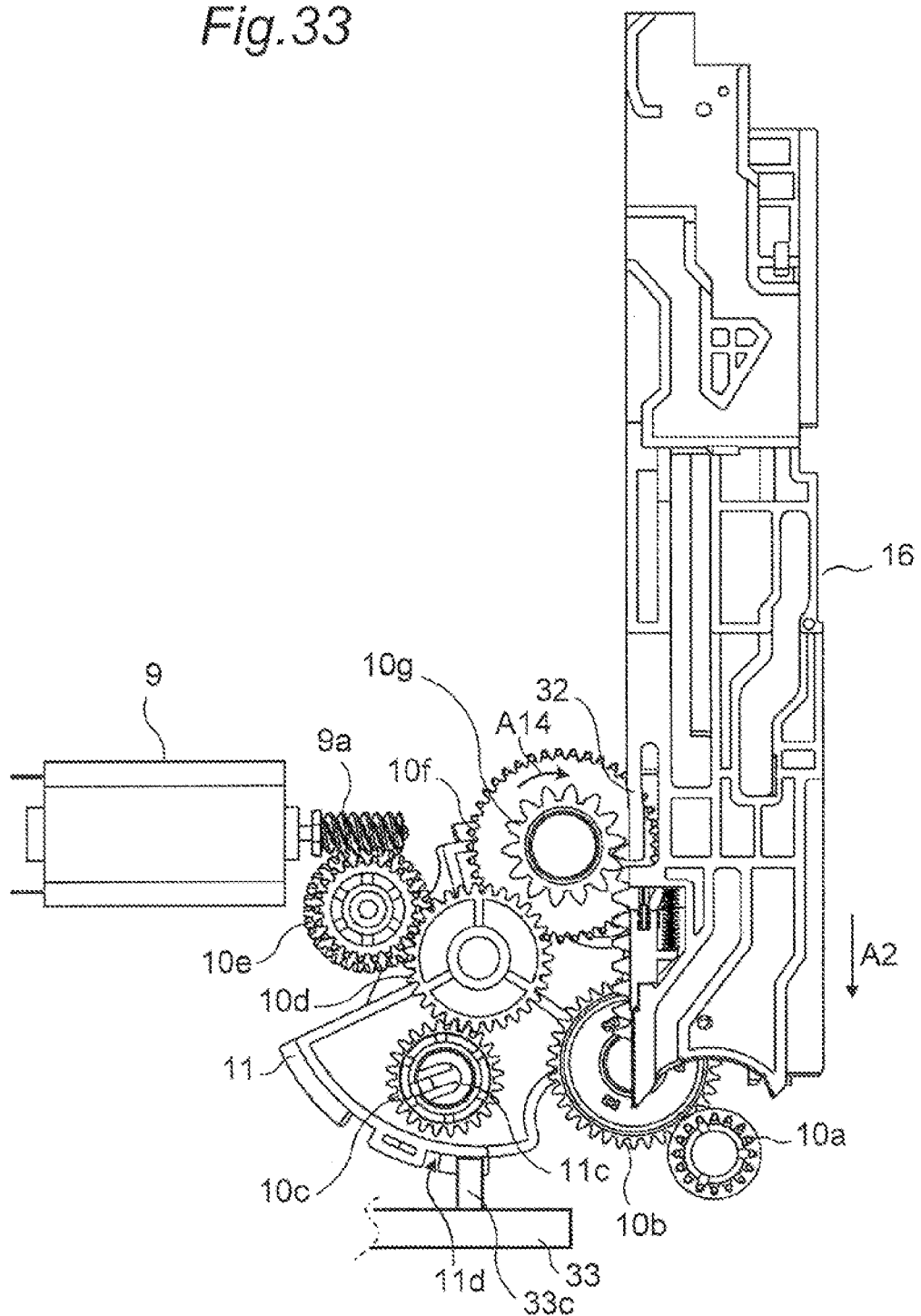
FIG. 33 is a top view showing a positional relationship of the parts relating to the clutch plate after completion of the disk installment operation.

FIGS. 33, 26, and 27 show a state after completion of the same disk installment operation. In this state, meshing between the pinion 10g and the rack 30 is retained. This state is maintained until the motor 9 is reversely driven for the disk ejection and the drive force in the opposite direction to that of the conveyance of the disk is transmitted to the rack 30. It is noted that the clutch plate 11 shown in FIG. 33 is slightly rotated in the arrow A13 direction in comparison to the state of FIG. 32.

Figure 34A:
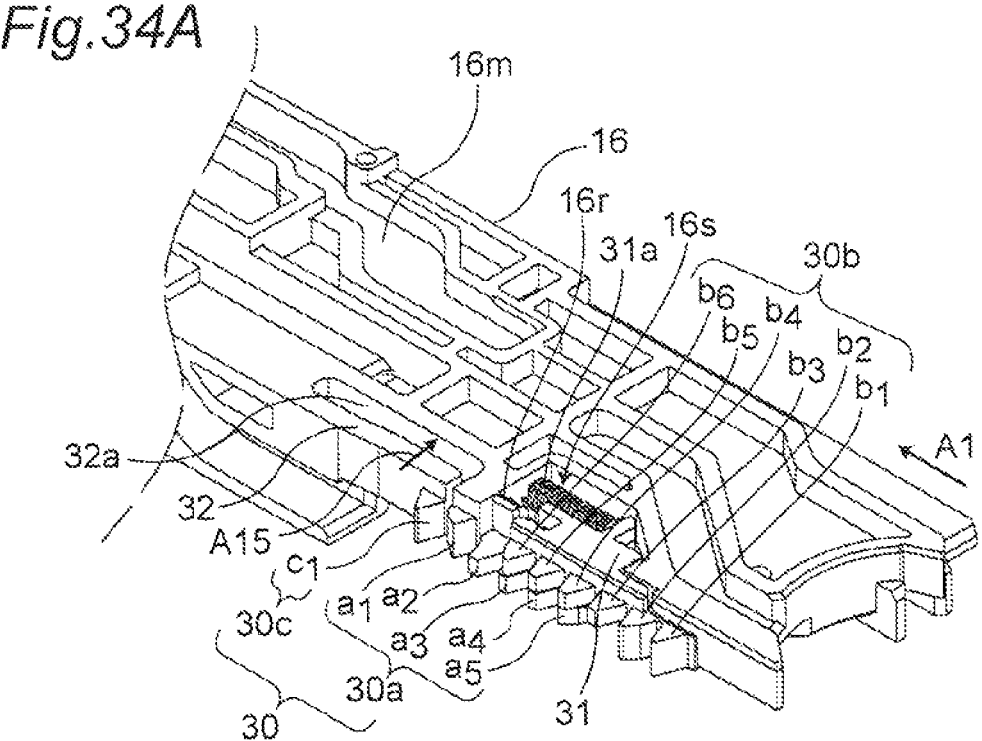
FIG. 34A is a perspective view of a configuration of a rack and a buffer rack of the slide cam member, showing a state that an auxiliary rack body in which the buffer rack is formed is biased by a spring.
Figure 34B:
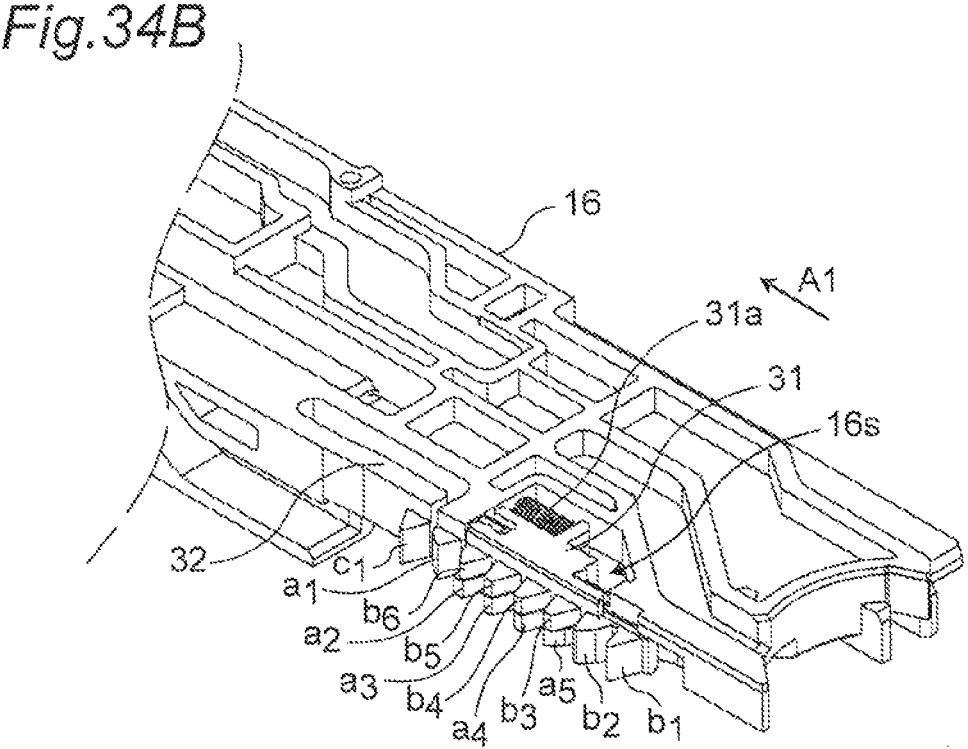
FIG. 34B is a perspective view of the configuration of the rack and the buffer rack of the slide cam member, showing a state that the auxiliary rack body in which the buffer rack is formed moves against bias force of the spring.

Next, with reference to FIGS. 34A and 34B, a configuration of the rack 30 will be described in detail. FIGS. 34A and 34B are perspective views showing the configuration of the rack 30. The rack 30 is formed by a main body rack 30a integrated with the slide cam member 16, a buffer rack 30b formed in an auxiliary rack body 31, and an elastic rack 30c formed in an elastic arm 32. The main body rack 30a, the buffer rack 30b, and the elastic rack 30c have functions different from each other at the time of transmitting the drive force of the motor 9 from the pinion 10g. The main body rack 30a, the buffer rack 30b, and the elastic rack 30c are formed so that arrangement pitches of teeth thereof are the same as each other.

The main body rack 30a is integrated with a main body of the slide cam member 16. The main body rack 30a is a major part for transmitting the drive force of the motor 9 to the slide cam member 16. The main body rack 30a is provided with rack teeth a1 to a5. The rack teeth a2 to a5 are formed so that the width in the thickness direction is smaller than (e.g. ½ of) the rack tooth a1 placed on the most upstream side in the arrow A2 direction (first rack tooth to be meshed with the tooth of the pinion 10g at the time of performing the ejection from the state that the disk is installed in FIG. 33). As shown in FIGS. 34A and 34B, the rack teeth a2 to a5 are formed on the rather lower side. The rack tooth a1 and the rack tooth a5 arranged at both ends among the rack teeth a1 to a5 are formed into a steep mountain shape on top of which no flat part is formed. Thereby, at the beginning of meshing between the pinion 10g and the rack 30, top parts of the teeth provided in the pinion and the rack are contacted with each other, and reactive force thereof prevents disturbance of the rotation of the pinion 10g.

In the vicinity of the main body rack 30a, a rib portion 16r is provided so as to be extended in the disk conveying direction (A1 or A2 direction). The auxiliary rack body 31 is slidably fitted to this rib portion 16r. The auxiliary rack body 31 is biased in the arrow A2 direction by a spring 31a serving as one example of an elastic member provided in a space 16s formed in the slide cam member 16. The buffer rack 30b described above is formed in this auxiliary rack body 31, and the buffer rack 30b is provided with rack teeth b1 to b6. The rack teeth b3 to b6 are formed so that the width in the thickness direction is smaller than (e.g. ½ of) the rack tooth b1 and the rack tooth b2 placed on the downstream side in the arrow A2 direction. As shown in FIGS. 34A and 34B, the rack teeth b3 to b6 are formed on the rather upper side. The rack tooth b1 and the rack tooth b6 arranged at both ends among the rack teeth b1 to b6 are formed into a steep mountain shape on top of which no flat part is formed. Thereby, at the beginning of meshing between the pinion 10g and the rack 30, the top parts of the teeth provided in the pinion and the rack are contacted with each other, and the reactive force thereof prevents the disturbance of the rotation of the pinion 10g.

When the auxiliary rack body 31 is biased in the arrow A2 direction by the spring 31a as shown in FIG. 34A, the rack teeth b4 to b6 and the rack teeth a3 to a5 are arranged so as to face each other in the thickness direction of the rack 30. That is, in this case, the rack tooth b4 and the rack tooth a5, the rack tooth b5 and the rack tooth a4, and the rack tooth b6 and the rack tooth a3 are respectively overlapped with each other, so that three rack teeth having the substantially same size as the rack teeth a1, b1, b2 are formed. In other words, the thickness of the rack teeth a1, b1, b2 is formed to be, for example, the sum of the thickness of the rack tooth b4 and the thickness of the rack tooth a5. In the state that the auxiliary rack body 31 moves in the arrow A1 direction against bias force of the spring 31a and contacted with an end of the rib portion 16r as shown in FIG. 34B, the rack teeth b3 to b6 and the rack teeth a2 to a5 are arranged so as to face each other in the thickness direction of the rack 30. That is, in this case, the rack tooth b3 and the rack tooth a5, the rack tooth b4 and the rack tooth a4, the rack tooth b5 and the rack tooth a3, and the rack tooth b6 and the rack tooth a2 are respectively overlapped with each other, so that four rack teeth having the substantially same size as the rack tooth a1, b1, or b2 are formed. That is, the spring 31a is elastically deformed, so that the auxiliary rack body 31 in which the buffer rack 30b is formed is moved by one pitch for the rack teeth of the main body rack 30a.

The elastic rack 30c is provided to the elastic arm 32 formed to the slide cam member 16. The elastic arm 32 is deformable in the direction in which the elastic arm is brought away from the pinion 10g. The elastic rack 30c is provided with a rack tooth c1 serving as the tooth on the most upstream side in the arrow A2 direction of the rack 30. The rack tooth c1 is formed into a steep mountain shape on top of which no flat part is formed similarly to the rack tooth a1 of the main body rack 30a. Thereby, at the beginning of meshing between the pinion 10g and the rack 30, the top parts of the teeth provided in the pinion and the rack are contacted with each other, and the reactive force thereof prevents the disturbance of the rotation of the pinion 10g.

In a case of driving due to a time lag from a stop command of the motor 9 to be stopped at the time point of disk installment completion to actual stoppage, or in a case of driving without stopping the motor 9 due to some troubles or the like, when the rotation force is transmitted to the pinion 10g, the rack tooth c1 functions to release the meshing between the pinion 10g and the rack 30. For example, when the pinion 10g is further rotated in an arrow A14 direction in the state of the disk installment completion as shown in FIG. 33, the elastic arm 32 is deformed toward a space 32a shown in FIG. 34A, that is, in an arrow A15 direction so that the top part of the tooth of the pinion 10g and the top part of the rack tooth c1 are contacted with each other. Thereby, the meshing between the tooth of the pinion 10g and the rack tooth c1 is released. When the pinion 10g is further rotated in the arrow A14 direction from this state, the tooth of the pinion 10g and the rack tooth c1 are meshed with each other. This state that the meshing between the tooth of the pinion 10g and the rack tooth c1 is released and the state that the tooth of the pinion and the rack tooth are meshed with each other are alternately repeated until the rotation of the pinion 10g is stopped. With this configuration, when drive stoppage of the motor 9 is not normally performed and an excessive load is applied to the meshing part between the pinion 10g and the rack 30, effectively prevented is an accident such as breakage of the worm gear 9a, the gear row 10, or the rack 30 to which the drive force of the motor 9 is transmitted.

It is noted that a buffer portion for absorbing and reducing shock caused due to a speed difference or the like at the beginning of meshing between the pinion 10g and the rack 30 is formed by the auxiliary rack body 31 slidably formed to the slide cam member 16, the spring 31a for biasing the auxiliary rack body 31 in one direction, and the buffer rack 30b formed in the auxiliary rack body 31 in the first embodiment. It is noted that the buffer portion of the present invention is not limited to the above described configuration, needless to say.

Next, with reference to FIGS. 35 to 37, effects such as prevention of the breakage of the parts by the auxiliary rack body 31, the spring 31a, and the buffer rack 30b will be described further in detail.

Figure 35:
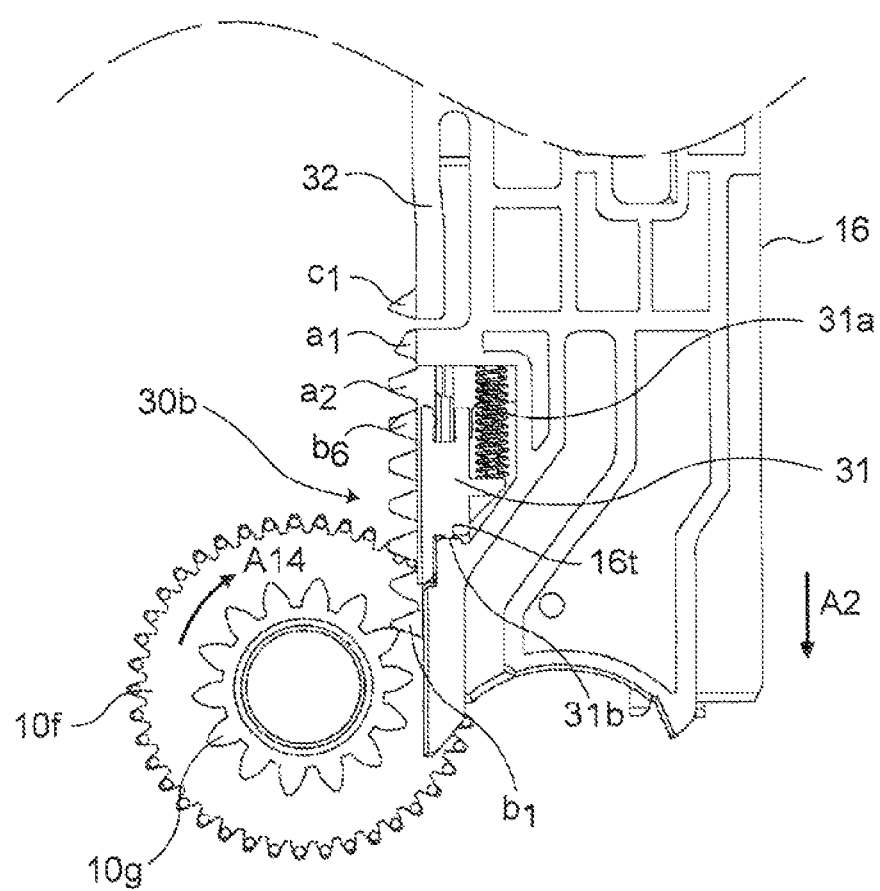
FIG. 35 is a top view showing a state at an instant when the slide cam member slides, and a rack tooth of the buffer rack is contacted with a tooth of a pinion.

FIG. 35 is a top view showing a state at an instant when the slide cam member 16 slides in the arrow A2 direction and the rack tooth b1 of the buffer rack 30b is contacted with the tooth of the pinion 10g. In the state shown in FIG. 35, similarly to the state shown in FIG. 34A, the buffer rack 30b is biased in the arrow A2 direction by the spring 31a. In this state, the slide cam member 16 slides in the arrow A2 direction, and the pinion 10g is rotated in the arrow A14 direction, so that the rack 30 and the pinion 10g are meshed with each other. However, in a case where there is a difference between a sliding speed of the slide cam member 16 and a rotation speed of the pinion 10g, a case where a meshing relation between top lands and bottom lands of the teeth between the pinion 10g and the rack 30 is not smooth, or the like, the meshing between the rack 30 and the pinion 10g in particular is sometimes not favorably begun. In this case, there is caused the accident such as the breakage of the pinion 10g or the rack 30.

Meanwhile, in the first embodiment, the rack tooth to be meshed first with the tooth of the pinion 10g is the rack tooth b1 of the buffer rack 30b, so that the auxiliary rack body 31 in which the buffer rack 30b is formed can move in the arrow A1 direction against the bias force of the spring 31a. Thereby, at the beginning of meshing between the pinion 10g and the rack 30, the shock caused due to the speed difference between the pinion and the rack or the like can be absorbed and reduced, so that the accident such as the breakage of the pinion 10g or the rack 30 can be prevented.

Figure 36:
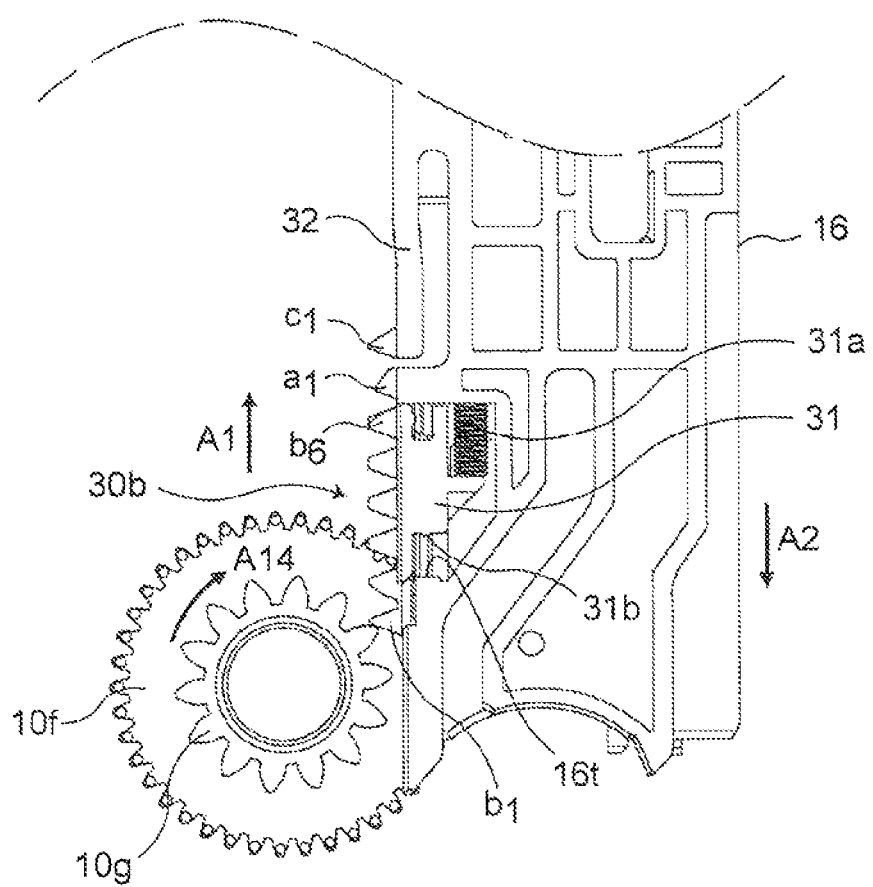
FIG. 36 is a top view showing a state at an instant when the auxiliary rack body moves against the bias force of the spring so that collision between the rack tooth of the buffer rack and the tooth of the pinion is absorbed.

FIG. 36 is a top view showing a state at an instant when the auxiliary rack body 31 moves in the arrow A2 direction against the bias force of the spring 31a, so that collision between the rack tooth b1 of the buffer rack 30b and the tooth of the pinion 10g is absorbed, in a case where the moving speed of the slide cam member 16 is faster than the rotation speed of the pinion 10g. As shown in FIG. 36, a contact surface 31b of the auxiliary rack body 31 is placed away from a level difference portion 16t forming the rib portion 16r of the slide cam member 16. At this time, the rack 30 is in the state shown in FIG. 34B. Since the pinion 10g is rotated by the drive of the motor 9 in this state, the tooth of the pinion 10g and the rack tooth b1 of the buffer rack 30b are meshed with each other at a next step, so that the auxiliary rack body 31 moves in the arrow A2 direction. Thereby, the contact surface 31b of the auxiliary rack body 31 is contacted with the level difference portion 16t of the slide cam member 16. Such an contact state is shown in FIG. 37.

Figure 37:
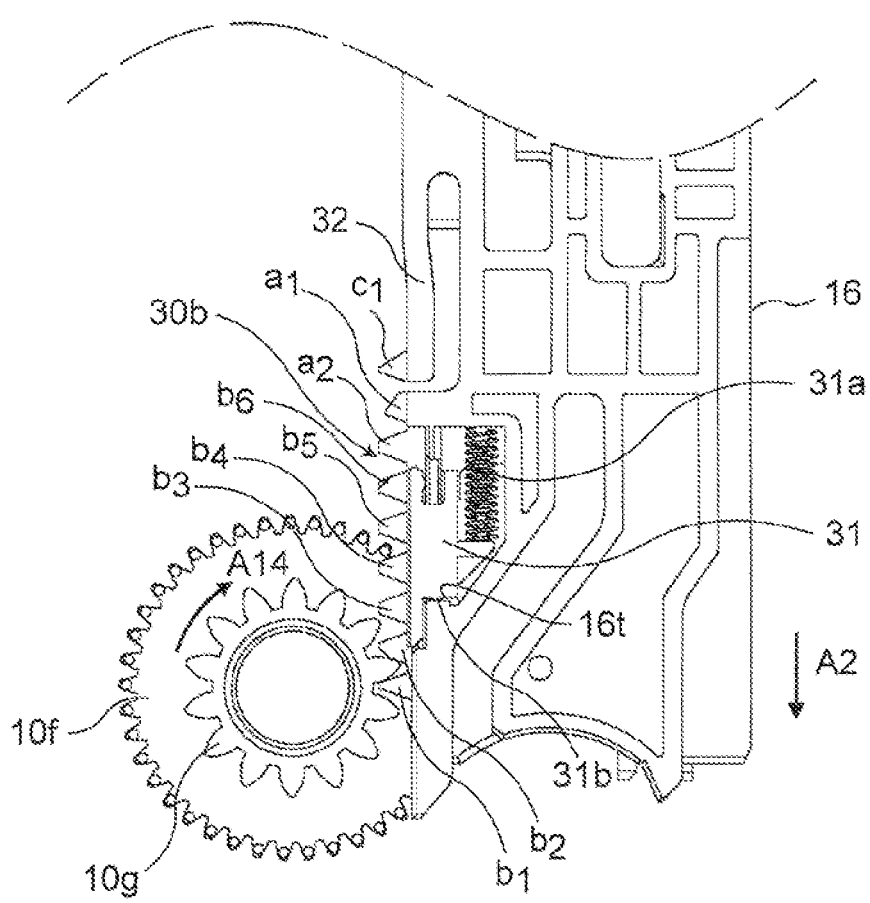
FIG. 37 is a top view showing a state at an instant when the rack teeth of the buffer rack are meshed with the teeth of the pinion and the slide cam member starts sliding.

FIG. 37 is a top view showing a state at an instant when the rack teeth of the buffer rack 30b are meshed with the teeth of the pinion 10g and the slide cam member 16 starts sliding by the drive of this pinion 10g. In the state shown in FIG. 37, the teeth of the pinion 10g are meshed with the rack tooth b1 and the rack tooth b2 of the buffer rack 30. When the pinion 10g is rotated in this state, due to the contact of the contact surface 31b of the auxiliary rack body 31 with the level difference portion 16t, the buffer rack 30b moves in the arrow A2 direction integrally with the slide cam member 16.

In a fixed period of transition from the state shown in FIG. 31 to the state shown in FIG. 32, the slide cam member 16 receives at the same time both rotation force of the trigger lever 25 rotated by being pressed by the disk and rotation force of the pinion 10g. In this period, the slide cam member 16 moves in the arrow A2 direction at a faster speed between a sliding speed due to the rotation force of the trigger lever 25 and a sliding speed due to the rotation force of the pinion 10g. In the above described period, the pinion 10g is meshed only with the buffer rack 30b of the auxiliary rack body 31. That is, the auxiliary rack body 31 is moved in the arrow A2 direction only due to the rotation force of the pinion 10g. Therefore, in a case where the sliding speed of the slide cam member 16 due to the rotation force of the trigger lever 25 is faster than the sliding speed of the slide cam member 16 due to the rotation force of the pinion 10g, a speed difference is caused between the moving speed of the slide cam member 16 and the moving speed of the auxiliary rack body 31 meshed with the pinion 10g. In a case where the auxiliary rack body 31 cannot move relatively to the slide cam member 16, an excessive load is applied to the meshing part between the pinion 10g and the rack 30 due to the speed difference, and there is a fear that the meshing part is broken. Even when the meshing part is not broken, the reactive force acting in the opposite direction of the sliding direction of the slide cam member 16 is transmitted to the disk via the slide cam member 16 and the trigger lever 25, so that the conveyance operation of the disk is disturbed. In this case, a load may be applied to the driving motor 9 or the rubber roller 6a for conveying the disk may spin around and thus the rubber roller 6a is worn.

Meanwhile, in the first embodiment, the auxiliary rack body 31 can move in the arrow A1 direction against the bias force of the spring 31a, so as to suppress that an excessive load is applied to the meshing cart between the pinion 10g and the rack 30 due to the speed difference. A load applied to the motor 9 serving as the drive source can be reduced, and spinning-around of the rubber roller 6a for conveying the disk can be suppressed. Thus, wear of the rubber roller 6a can be reduced.

It is noted that in the above description, the spring 31a is elastically deformed, so that the buffer rack 30b is moved by one pitch for the rack teeth of the main body rack 30a. However, the present invention is not limited to this configuration. The auxiliary rack body 31 may slide at an integral-multiple of a stroke of the arrangement pitch for the rack teeth of the main body rack 30a. Also with this configuration, the shock caused at the beginning of meshing between the pinion 10g and the rack 30 can be effectively reduced.

Figure 38A:
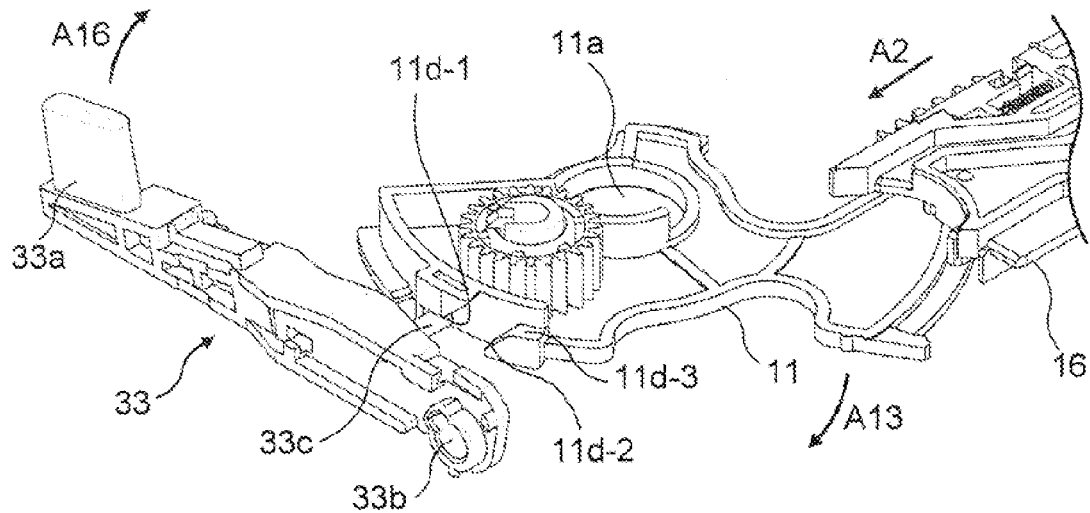
FIG. 38A is a perspective view showing a positional relationship between a disk insertion blocking member and the clutch plate when the disk insertion blocking member is lowered.
Figure 38B:
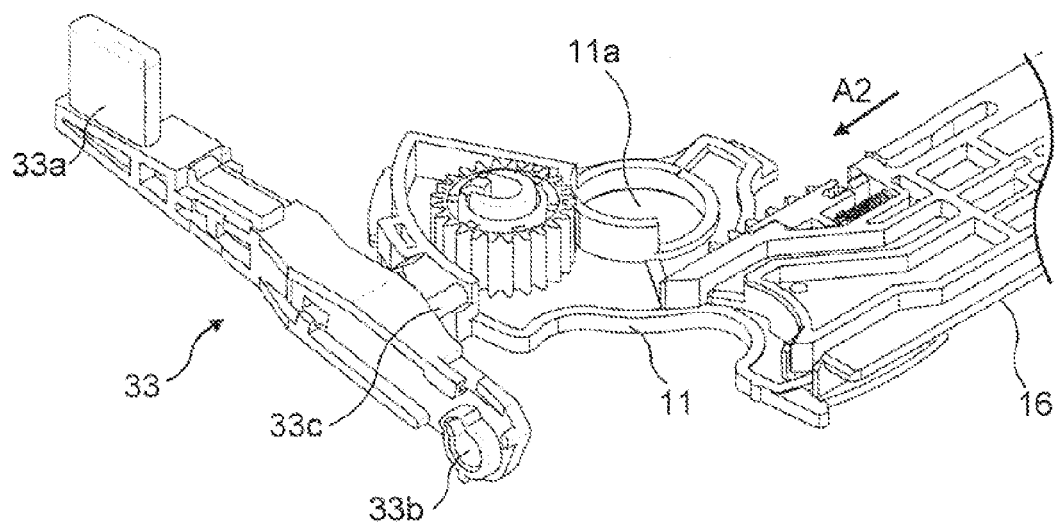
FIG. 38B is a perspective view showing a positional relationship between the disk insertion blocking member and the clutch plate when the disk insertion blocking member is raised.

Next, with reference to FIGS. 38A and 38B, a relationship between the clutch plate 11 and the disk insertion blocking member 33 will be described. FIG. 38A is a perspective view showing a positional relationship between the disk insertion blocking member 33 and the clutch plate 11 when the disk insertion blocking member 33 is lowered. FIG. 38B is a perspective view showing a positional relationship between the disk insertion blocking member 33 and the clutch plate 11 when the disk insertion blocking member 33 is raised.

As clear from FIGS. 2 and 3, the disk insertion blocking member 33 is arranged in the vicinity of the opening portion 1a for the disk insertion and ejection. As shown in FIGS. 38A and 38B, the disk insertion blocking member 33 is provided with a blocking piece 33a for blocking the insertion of the disk at a front end thereof. The disk insertion blocking member 33 is provided with a rotation shaft 33b at the other end and attached so as to be rotatable about the rotation shaft 33b. The disk insertion blocking member 33 is provided with an engagement pin 33c to be engaged with the cam 11d of the clutch plate 11. As described with reference to FIG. 30, the cam 11d of the clutch plate 11 has the lower surface cam portion 11d-1, the tilt cam portion 11d-2, and the upper surface cam portion 11d-3.

In a state that the disk is not installed onto the turntable 13, the blocking piece 33a of the disk insertion blocking member 33 is lowered as shown in FIG. 38A. When the slide cam member 16 slides in the arrow A2 direction from the state shown in FIG. 38A and the clutch plate 11 is rotated in the arrow A13 direction, the engagement pin 33c is guided by the cam 11d, so that the disk insertion blocking member 33 is rotated in the arrow A16 direction about the rotation shaft 33b. FIG. 38B shows a state that the engagement pin 33c of the disk insertion blocking member 33 moves from the lower surface cam portion 11d-1 to the upper surface cam portion 11d-3 through the tilt cam portion 11d-2.

Timing of the state change of the disk insertion blocking member 33 from the state shown in FIG. 38A to the state shown in FIG. 38B is influenced by a rotating operation of the clutch plate 11 by the sliding of the slide cam member 16 described above with reference to FIGS. 31 to 33. The state of the engagement pin 33c is changed by the cam 11d as shown in FIGS. 31 to 33. FIG. 38B shows the state that the disk is installed onto the turntable 13. In the state that the disk insertion blocking member 33 is raised as shown in FIG. 38B, the disk insertion blocking member blocks insertion of another disk from the opening portion 1a into the casing 300.

With the disk device according to the first embodiment, the auxiliary rack body 31, the spring 31a, and the buffer rack 30b are provided to serve as the buffer portion. Thus, the shock caused at the beginning of meshing between the pinion 10g and the rack 30 can be reduced. Accordingly, at the time of consecutively performing the disk installment operation after the disk conveyance operation, damage to the parts such as the pinion 10g and the rack 30 can be prohibited.

With the disk device according to the first embodiment, the clutch plate 11 is provided as a transmission route switching portion. Thus, when the slide cam member 16 is moved by the trigger lever 25, the transmission route of the drive force of the motor 9 can be more reliably switched from the disk conveyance mechanism to the disk installment mechanism.

With the disk device according to the first embodiment, the thickness of the rack tooth b1, b2 of the buffer rack 30b to be meshed first with the teeth of the pinion 10g is equal to the sum of the thickness of each of the rack teeth b3 to b6 other than the rack teeth b1, b2 and the thickness of each of the teeth a2 to a5 of the pinion 10g. With this configuration, each of the rack teeth b3 to b6 and each of the teeth a2 to a5 of the pinion 10g are overlapped with each other so as to form one large rack tooth. Thus, the drive force of the motor 9 can be smoothly transmitted to the slide cam member 16.

Second Embodiment

Figure 39:
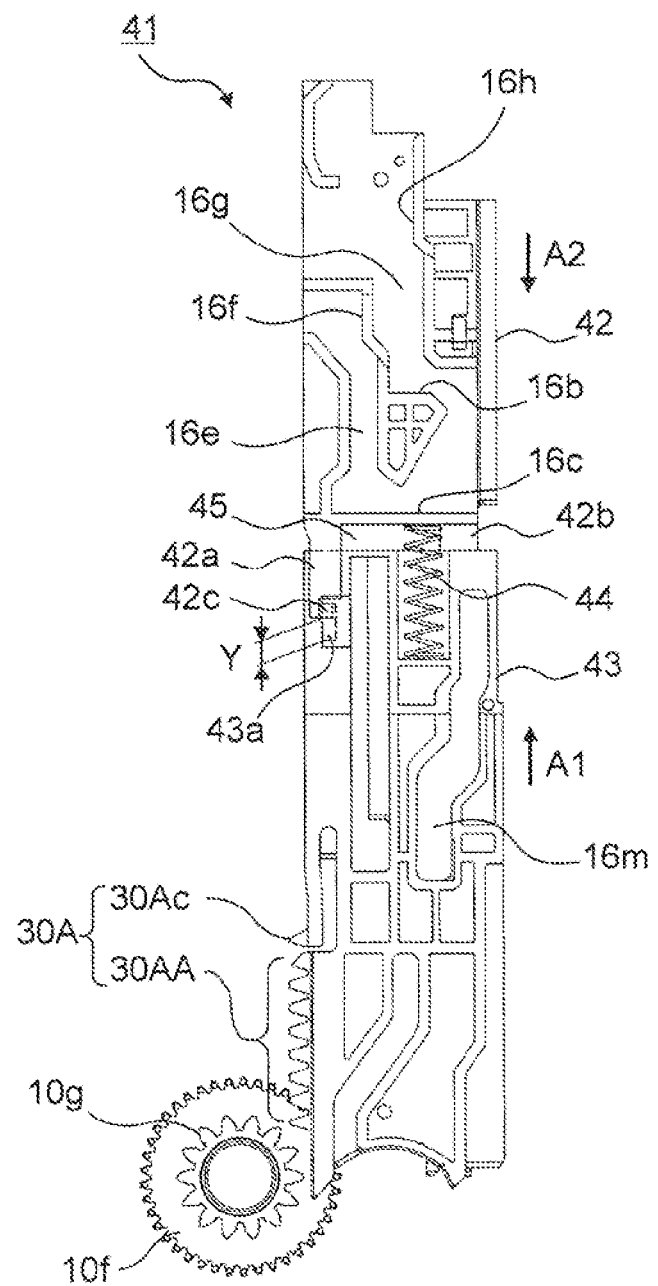
FIG. 39 is a top view of a slide cam member of a disk device according to a second embodiment of the present invention.

A disk device according to a second embodiment of the present invention will be described with reference to FIG. 39. FIG. 39 is a top view of a slide cam member of the disk device according to the second embodiment of the present invention. Different points of the disk device according to the second embodiment from the disk device according to the first embodiment are as follows.

The disk device of the second embodiment has a slide cam member 41 and a spring 44 serving as one example of the elastic member in place of the slide cam member 16, the auxiliary rack body 31, the spring 31a, and the buffer rack 30b. The slide cam member 41 has a first slide cam body 42 to be directly pressed by the slide cam pressing portion 25b of the trigger lever 25, and a second slide cam body 43 in which a rack 30A to be meshed with the pinion 10g is formed. Guides 42a, 42b protruding toward the second slide cam body 43 are formed to the first slide cam body 42. A projection 42c is formed at a front end of the guide 42a. A guide groove 43a capable of being engaged with the projection 42c of the guide 42a is formed in the second slide cam body 43. The projection 42c is engaged with the guide groove 43a, so that the first slide cam body 42 and the second slide cam body 43 are fitted movably relative to each other within a range of a length Y of the guide groove 43a. The spring 44 is placed between the first slide cam body 42 and the second slide cam body 43. The spring 44 biases the first slide cam body 42 and the second slide cam body 43 in the directions in which the slide cam bodies are brought away from each other. Thereby, a gap 45 is formed between the first slide cam body 42 and the second slide cam body 43.

The rack 30A of the second slide cam body 43 has a main body rack 30Aa, and an elastic rack 30Ac. The main body rack 30Aa is integrated with a main body of the second slide cam body 43. Rack teeth of the main body rack 30Aa are formed so as to have the substantially same size. The elastic rack 30Ac is formed similarly to the elastic rack 30c of the first embodiment.

It is noted that except for the parts described above, the slide cam member 41 has the same configuration as the slide cam member 16. That is, the parts 16a to 16p such as the cam groove 16m are formed in either the first slide cam body 42 or the second slide cam body 43.

Next, an operation of the slide cam member 41 formed as above will be described.

The trigger lever 25 is rotated by being pressed by the disk conveyed to the replayable position, so that the slide cam pressing portion 25b of the trigger lever 25 presses the first engagement portion 16b or the second engagement portion 16c provided to the first slide cam body 42. Thereby, the first slide cam body 42 moves in the arrow A2 direction. This movement force of the first slide cam body 42 is transmitted to the second slide cam body 43 via the spring 44. In a state that the main body rack 30Aa of the second slide cam body 43 is not meshed with the pinion 10g as shown in FIG. 39, the first slide cam body 42 and the second slide cam body 43 are substantially integrally moved in the arrow A2 direction while maintaining the gap 45.

After that, when the first slide cam body 42 and the second slide cam body 43 are further moved in the arrow A2 direction, the main body rack 30Aa of the second slide cam body 43 is contacted with the pinion 10g. However, in a case where the moving speed of the first slide cam body 42 transmitted from the trigger lever 25 is larger than the moving speed of the second slide cam body 43 transmitted from the pinion 10g, the reactive force is generated in the arrow A1 direction in the second slide cam body 43. When this reactive force exceeds bias force of the spring 44, the spring 44 is compressed, so that the second slide cam body 43 is relatively moved toward the first slide cam body 42 in the arrow A1 direction so as to decrease the gap 45. That is, a part on the side of the second slide body 43 relative to the spring 44 is relatively moved toward the first slide cam body 42 in the opposite direction to the moving direction of the first slide cam body 42. By this relative movement of the second slide cam body 43, the shock caused due to the speed difference at the beginning of meshing between the pinion 10g and the rack 30A is absorbed and reduced. That is, the spring 44 functions as the buffer portion for reducing the shock caused at the beginning of meshing between the pinion 10g and the rack 30A.

It is noted that when the main body rack 30Aa of the second slide cam body 43 is not meshed with the pinion 10g, the main body rack moves in the arrow A1 direction. By this movement, when the main body rack 30Aa and the pinion 10g are meshed with each other, the second slide cam body 43 moves in the arrow A2 direction integrally with the first slide cam body 42.

Although the present invention has been fully described in connection with the preferred embodiments thereof with reference to the accompanying drawings, it is to be noted that various changes and modifications are apparent to those skilled in the art. Such changes and modifications are to be understood as included within the scope of claims of the present invention as defined by the appended claims unless they depart therefrom.

The disclosure of Japanese Patent Application No. 2010-078337 filed on Mar. 30, 2010 including specification, drawing and claims are incorporated herein by reference in its entirety.

The disk device according to the present invention is capable of prohibiting the breakage of the parts such as the drive gear at the time of consecutively performing the disk conveyance operation and the disk installment operation. Thus, the present invention is particularly useful to a disk device provided with a slot-in loading mechanism for loading a disk-shape recording medium such as a CD and a DVD into the device without using a tray.

The invention claimed is:

1. A disk device comprising:
  a disk conveyance mechanism which conveys a disk to a replayable position;
  a disk installment mechanism which installs the disk conveyed to the replayable position onto a turntable so as to bring the disk into a replayable clamping state;
  a drive source which generates drive force driving the disk conveyance mechanism and the disk installment mechanism; and
  a transmission route switching mechanism which switches a transmission route of the drive force so that the drive force generated by the drive source is transmitted to the disk conveyance mechanism or the disk installment mechanism, wherein
  the disk installment mechanism has:
  a drive gear rotated by transmitting the drive force generated by the drive source;
  a slide cam member having a rack to be meshed with the drive gear, the slide cam member being moved by rotating the drive gear in a state that the drive gear and the rack are meshed with each other; and
  a buffer portion which is able to relatively move the rack at least starting to mesh with the drive gear in an opposite direction with respect to a moving direction of the slide cam member moved by conveyance of the disk, when the disk is conveyed to the replayable position by the disk conveyance mechanism and the slide cam member moves so that the drive gear and the rack are meshed with each other.

2. The disk device according to claim 1, further comprising:
  a trigger member rotated by being contacted with and pressed by the disk conveyed by the disk conveyance mechanism, the trigger member moving the slide cam member so that the drive gear and the rack are meshed with each other by rotation of the trigger member, wherein the transmission route switching mechanism switches the transmission route of the drive force from a state that the drive force of the drive source is transmitted to the disk conveyance mechanism to a state that the drive force is transmitted to the disk installment mechanism, when the slide cam member is moved by the trigger member.

3. The disk device according to claim 2, wherein
the slide cam member includes a first slide cam portion to be pressed by the trigger member, and a second slide cam portion in which the rack is formed,
both the first and second slide cam portions are coupled by the buffer portion, and
the buffer portion is able to relatively move the second slide cam portion in an opposite direction to a moving direction of the first slide cam portion moved by conveyance of the disk at beginning of meshing between the rack of the second slide cam portion and the drive gear.

4. The disk device according to claim 3, wherein the buffer portion is formed by an elastic member.

5. The disk device according to claim 1, wherein
the buffer portion has:
an auxiliary rack body slidably provided to the slide cam member;
a buffer rack provided to the auxiliary rack body so as to form the rack with a main body rack provided to the slide cam member; and
an elastic member which biases the auxiliary rack body so that a rack tooth to be meshed first with a tooth of the drive gear is a rack tooth of the buffer rack, and
when the slide cam member moves so that the drive gear and the buffer rack are meshed with each other, the auxiliary rack body slides in the opposite direction to the moving direction of the slide cam member against bias force of the elastic member, so that a speed difference caused at beginning of meshing between the drive gear and the buffer rack is absorbed and shock is reduced.

6. The disk device according to claim 5, wherein
the buffer rack is formed so that a thickness of the rack tooth to be meshed first with the tooth of the drive gear is a sum of a thickness of a rack tooth other than the rack tooth to be meshed first and a thickness of a rack tooth formed to the main body rack facing the rack tooth other than the rack tooth to be meshed first.

7. The disk device according to claim 6, wherein
the auxiliary rack body slides by an integral-multiple of a stroke of an arrangement pitch for the teeth of the rack.

* * * * *